US010663284B2

(12) United States Patent
Ferrari et al.

(10) Patent No.: US 10,663,284 B2
(45) Date of Patent: May 26, 2020

(54) MULTI-MODE PORTABLE COORDINATE MEASURING MACHINE

(71) Applicant: Hexagon Metrology, Inc., North Kingstown, RI (US)

(72) Inventors: Paul Ferrari, Carlsbad, CA (US); Hyun Kwon Jung, Oceanside, CA (US)

(73) Assignee: Hexagon Metrology, Inc., North Kingstown, RI (US)

( * ) Notice: Subject to any disclaimer, the term of this patent is extended or adjusted under 35 U.S.C. 154(b) by 54 days.

(21) Appl. No.: 16/028,237

(22) Filed: Jul. 5, 2018

(65) Prior Publication Data

US 2019/0033055 A1   Jan. 31, 2019

Related U.S. Application Data

(63) Continuation of application No. 14/857,503, filed on Sep. 17, 2015, now Pat. No. 10,036,627.

(60) Provisional application No. 62/052,846, filed on Sep. 19, 2014, provisional application No. 62/059,693, filed on Oct. 3, 2014.

(51) Int. Cl.
*G01B 5/008* (2006.01)
*G01B 11/00* (2006.01)
*G01B 21/04* (2006.01)

(52) U.S. Cl.
CPC ............ *G01B 11/005* (2013.01); *G01B 5/008* (2013.01); *G01B 11/007* (2013.01); *G01B 21/04* (2013.01); *G01B 21/047* (2013.01)

(58) Field of Classification Search
CPC ............................ G01B 11/005; G01B 11/007
USPC ............................................................ 33/503
See application file for complete search history.

(56) References Cited

U.S. PATENT DOCUMENTS

| 5,006,721 A | 4/1991 | Evans |
| 5,251,127 A | 10/1993 | Raab |
| 5,305,203 A | 4/1994 | Raab |

(Continued)

FOREIGN PATENT DOCUMENTS

| DE | 10 2006 018558 | 10/2007 |
| GB | 2 311 862 | 10/2007 |

(Continued)

OTHER PUBLICATIONS

Chinese Office Action dated Dec. 7, 2018, for Chinese Patent Application No. 201580049948.9, with English translation, 21 pages.

(Continued)

*Primary Examiner* — George B Bennett
(74) *Attorney, Agent, or Firm* — Knobbe, Martens, Olson & Bear, LLP

(57) ABSTRACT

A multi-mode coordinate measuring machine system can be configured to measure coordinates in a variety of ways with a certain set of components. For example, an articulated arm coordinate measuring machine can measure coordinates on an object using a contact probe or a non-contact measuring device mounted on the articulated arm. Then, a user can remove the non-contact measuring device from the articulated arm coordinate measuring machine, and take additional measurements of the object that can be aligned with measurements taken by the articulated arm and devices attached thereto.

21 Claims, 43 Drawing Sheets

(56) References Cited

U.S. PATENT DOCUMENTS

| | | |
|---|---|---|
| 5,402,582 A | 4/1995 | Raab |
| 5,408,754 A | 4/1995 | Raab |
| 5,412,880 A | 5/1995 | Raab |
| 5,424,835 A | 6/1995 | Cosnard et al. |
| 5,510,977 A | 4/1996 | Raab |
| 5,530,549 A | 6/1996 | Brown |
| 5,611,147 A | 3/1997 | Raab |
| 5,748,767 A | 5/1998 | Raab |
| 5,768,792 A | 6/1998 | Raab |
| 5,794,356 A | 8/1998 | Raab |
| 5,917,181 A | 6/1999 | Yoshizumi et al. |
| 5,926,782 A | 7/1999 | Raab |
| 5,956,857 A | 9/1999 | Raab |
| 5,957,837 A | 9/1999 | Raab |
| 5,978,748 A | 11/1999 | Raab |
| 6,012,332 A | 1/2000 | Schafer |
| 6,029,522 A | 2/2000 | Schafer |
| 6,078,846 A | 6/2000 | Greer et al. |
| 6,092,418 A | 7/2000 | Schafer |
| 6,092,419 A | 7/2000 | Dixon |
| 6,128,081 A | 10/2000 | White |
| 6,131,299 A | 10/2000 | Raab et al. |
| 6,151,789 A | 11/2000 | Raab |
| 6,166,811 A | 12/2000 | Long et al. |
| 6,180,939 B1 | 1/2001 | Markey, Jr. et al. |
| 6,219,928 B1 | 4/2001 | Raab et al. |
| 6,253,458 B1 | 7/2001 | Raab et al. |
| 6,256,038 B1 | 7/2001 | Krishnamurthy |
| 6,256,039 B1 | 7/2001 | Krishnamurthy |
| 6,271,856 B1 | 8/2001 | Krishnamurthy |
| 6,276,209 B1 | 8/2001 | Schafer |
| 6,279,246 B1 | 8/2001 | van den Bossche |
| 6,295,907 B1 | 10/2001 | Schafer |
| 6,298,569 B1 | 10/2001 | Raab et al. |
| 6,366,831 B1 | 4/2002 | Raab |
| 6,367,330 B1 | 4/2002 | Schafer |
| 6,413,212 B1 | 7/2002 | Raab |
| 6,457,363 B1 | 10/2002 | Schafer |
| 6,460,004 B2 | 10/2002 | Greer et al. |
| 6,467,352 B2 | 10/2002 | Schafer |
| 6,481,289 B2 | 11/2002 | Dixon |
| 6,535,794 B1 | 3/2003 | Raab |
| 6,593,587 B2 | 7/2003 | Pease |
| 6,606,539 B2 | 8/2003 | Raab et al. |
| 6,612,044 B2 | 9/2003 | Raab et al. |
| 6,661,820 B1 | 12/2003 | Camilleri et al. |
| 6,684,705 B1 | 2/2004 | Schafer |
| 6,717,166 B2 | 4/2004 | Pease |
| 6,769,307 B1 | 8/2004 | Dixon |
| 6,796,048 B2 | 9/2004 | Steffey et al. |
| 6,820,346 B2 | 11/2004 | Raab et al. |
| 6,858,857 B2 | 2/2005 | Pease |
| 6,858,858 B2 | 2/2005 | Pease |
| 6,868,359 B2 | 3/2005 | Raab |
| 6,879,933 B2 | 4/2005 | Steffey et al. |
| 6,892,465 B2 | 5/2005 | Raab et al. |
| 6,904,691 B2 | 6/2005 | Raab et al. |
| 6,920,697 B2 | 7/2005 | Raab et al. |
| 6,925,722 B2 | 8/2005 | Raab et al. |
| 6,935,036 B2 | 8/2005 | Raab et al. |
| 6,944,564 B2 | 9/2005 | De Jonge et al. |
| 6,952,882 B2 | 10/2005 | Raab et al. |
| 6,957,496 B2 | 10/2005 | Raab et al. |
| 6,964,113 B2 | 11/2005 | Bridges et al. |
| 6,973,734 B2 | 12/2005 | Raab et al. |
| 6,984,236 B2 | 1/2006 | Raab |
| 6,988,322 B2 | 1/2006 | Raab et al. |
| 6,996,912 B2 | 2/2006 | Raab et al. |
| 7,006,084 B1 | 2/2006 | Buss et al. |
| 7,017,275 B2 | 3/2006 | Raab et al. |
| 7,024,032 B2 | 4/2006 | Kidd et al. |
| 7,032,321 B2 | 4/2006 | Raab et al. |
| 7,043,847 B2 | 5/2006 | Raab et al. |
| 7,051,450 B2 | 5/2006 | Raab et al. |
| 7,069,664 B2 | 7/2006 | Raab et al. |
| 7,073,271 B2 | 7/2006 | Raab et al. |
| 7,113,878 B1 | 9/2006 | Loferer et al. |
| 7,145,162 B2 | 12/2006 | Cheng et al. |
| 7,174,651 B2 | 2/2007 | Raab et al. |
| 7,193,690 B2 | 3/2007 | Ossig et al. |
| 7,248,374 B2 | 7/2007 | Bridges |
| 7,268,892 B2 | 9/2007 | Van Den Bossche |
| 7,269,910 B2 | 9/2007 | Raab et al. |
| 7,280,226 B2 | 10/2007 | Van Den Bossche |
| 7,296,364 B2 | 11/2007 | Seitz et al. |
| 7,296,979 B2 | 11/2007 | Raab et al. |
| 7,299,145 B2 | 11/2007 | De Jonge et al. |
| 7,313,264 B2 | 12/2007 | Crampton |
| 7,372,581 B2 | 5/2008 | Raab et al. |
| 7,384,308 B2 | 6/2008 | Boehnlein et al. |
| 7,395,606 B2 | 7/2008 | Crampton |
| 7,428,061 B2 | 9/2008 | Coppenolle et al. |
| 7,431,619 B2 | 10/2008 | Boehnlein et al. |
| 7,519,493 B2 | 4/2009 | Atwell et al. |
| 7,552,543 B2 | 6/2009 | Tomelleri |
| 7,576,847 B2 | 8/2009 | Bridges |
| 7,581,988 B2 | 9/2009 | Boehnlein et al. |
| 7,584,534 B2 | 9/2009 | Pease et al. |
| 7,591,078 B2 | 9/2009 | Crampton |
| 7,604,207 B2 | 10/2009 | Hasloecher et al. |
| 7,624,510 B2 | 12/2009 | Ferrari |
| 7,701,559 B2 | 4/2010 | Bridges et al. |
| 7,712,468 B2 | 5/2010 | Hargadon |
| 7,733,544 B2 | 6/2010 | Becker et al. |
| 7,735,234 B2 | 6/2010 | Briggs et al. |
| 7,758,495 B2 | 7/2010 | Pease et al. |
| 7,765,707 B2 | 8/2010 | Tomelleri |
| 8,117,668 B2 | 2/2012 | Crampton et al. |
| 8,145,446 B2 | 3/2012 | Atwell et al. |
| 8,533,967 B2 | 9/2013 | Bailey et al. |
| 8,572,858 B2 | 11/2013 | Raab et al. |
| 8,661,700 B2 | 3/2014 | Briggs et al. |
| 8,763,266 B2 | 7/2014 | Barber et al. |
| 8,832,954 B2 | 9/2014 | Atwell et al. |
| 8,970,823 B2 | 3/2015 | Heidemann et al. |
| 9,115,986 B2 | 8/2015 | Heidemann et al. |
| 9,188,430 B2 * | 11/2015 | Atwell ................. G01B 11/24 |
| 10,036,627 B2 * | 7/2018 | Ferrari ................. G01B 5/008 |
| 2008/0127501 A1 | 6/2008 | Eaton et al. |
| 2009/0010740 A1 * | 1/2009 | Ferrari ................. G01B 21/047 |
| | | 414/225.01 |
| 2009/0013547 A1 | 1/2009 | Ferrari et al. |
| 2009/0013548 A1 | 1/2009 | Ferrari |
| 2010/0095542 A1 | 4/2010 | Ferrari |
| 2011/0178765 A1 | 7/2011 | Atwell et al. |
| 2012/0222324 A1 | 9/2012 | Raab et al. |
| 2012/0260512 A1 | 10/2012 | Kretschmer et al. |
| 2013/0016190 A1 | 1/2013 | Bridges et al. |
| 2013/0016338 A1 | 1/2013 | Bridges et al. |
| 2013/0016362 A1 | 1/2013 | Gong et al. |
| 2013/0222816 A1 | 8/2013 | Briggs et al. |
| 2013/0293684 A1 | 11/2013 | Becker et al. |
| 2013/0331986 A1 | 12/2013 | Tait et al. |
| 2014/0028805 A1 | 1/2014 | Tohme |
| 2014/0168370 A1 | 6/2014 | Heidemann et al. |
| 2014/0168379 A1 | 6/2014 | Heidemann et al. |
| 2014/0168380 A1 | 6/2014 | Heidemann et al. |
| 2014/0192187 A1 | 7/2014 | Atwell et al. |
| 2014/0226145 A1 | 8/2014 | Steffey et al. |
| 2014/0259714 A1 | 9/2014 | Atwell et al. |
| 2014/0260627 A1 | 9/2014 | Ferrari et al. |
| 2014/0267619 A1 | 9/2014 | Bridges |
| 2014/0267620 A1 | 9/2014 | Bridges |
| 2014/0267623 A1 | 9/2014 | Tohme et al. |
| 2014/0267629 A1 | 9/2014 | Tohme et al. |
| 2014/0268093 A1 | 9/2014 | Tohme et al. |
| 2014/0268108 A1 | 9/2014 | Grau |
| 2014/0268178 A1 | 9/2014 | Atwell et al. |
| 2015/0015700 A1 | 1/2015 | Becker et al. |
| 2015/0015701 A1 | 1/2015 | Yu |
| 2015/0054946 A1 | 2/2015 | Zhang |
| 2015/0070468 A1 | 3/2015 | Pfeffer |
| 2015/0130906 A1 | 5/2015 | Bridges et al. |
| 2015/0143707 A1 | 5/2015 | Goto |

(56) References Cited

U.S. PATENT DOCUMENTS

| | | |
|---|---|---|
| 2015/0159987 A1 | 6/2015 | Abe |
| 2015/0192406 A9 | 7/2015 | Bridges |
| 2015/0192407 A9 | 7/2015 | Tohme et al. |
| 2015/0229907 A1 | 8/2015 | Bridges et al. |
| 2015/0241204 A1 | 8/2015 | Steffey et al. |
| 2015/0330761 A1 | 11/2015 | Gong |
| 2015/0362305 A1 | 12/2015 | Ferrari et al. |
| 2016/0097629 A1 | 4/2016 | York et al. |
| 2016/0171776 A1* | 6/2016 | Bridges ................ G01B 11/005 348/47 |
| 2019/0154429 A1* | 5/2019 | Heymer ................ G01B 11/26 |

FOREIGN PATENT DOCUMENTS

| | | |
|---|---|---|
| JP | 2003/021133 | 1/2003 |
| JP | 2003/175484 | 6/2003 |
| WO | WO 90/08939 | 8/1990 |
| WO | WO 2004/096502 | 11/2004 |
| WO | WO 2005/100908 | 10/2005 |
| WO | WO 2013/184340 | 12/2013 |

OTHER PUBLICATIONS

International Search Report and Written Opinion dated Dec. 2, 2015, in International Application No. PCT/US2105/050803.

* cited by examiner

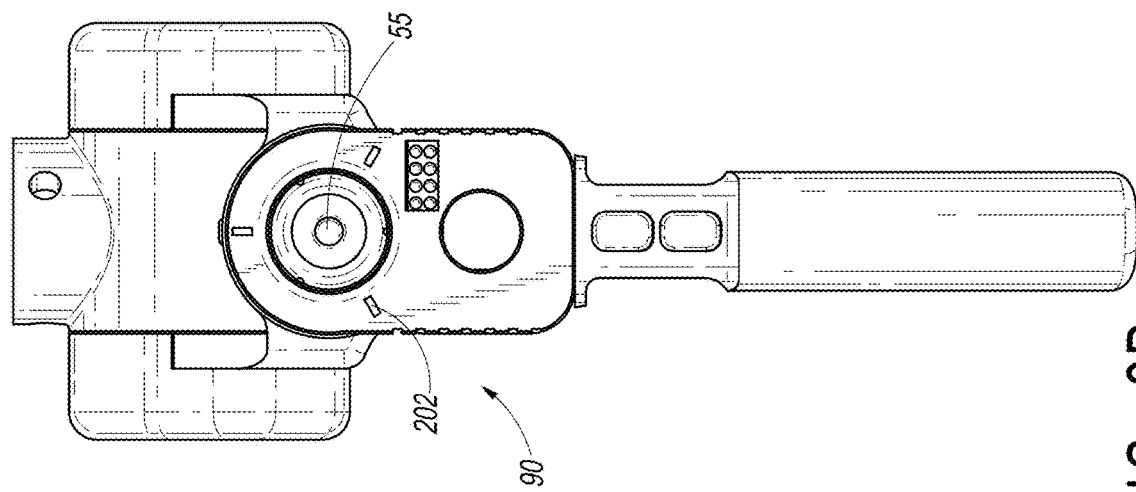
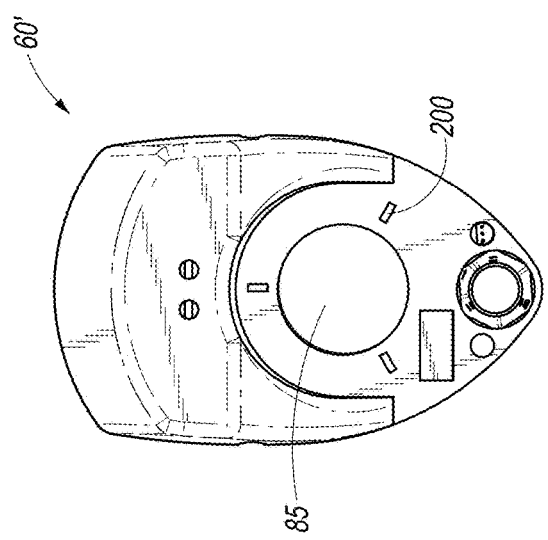
FIG. 8B
FIG. 8A

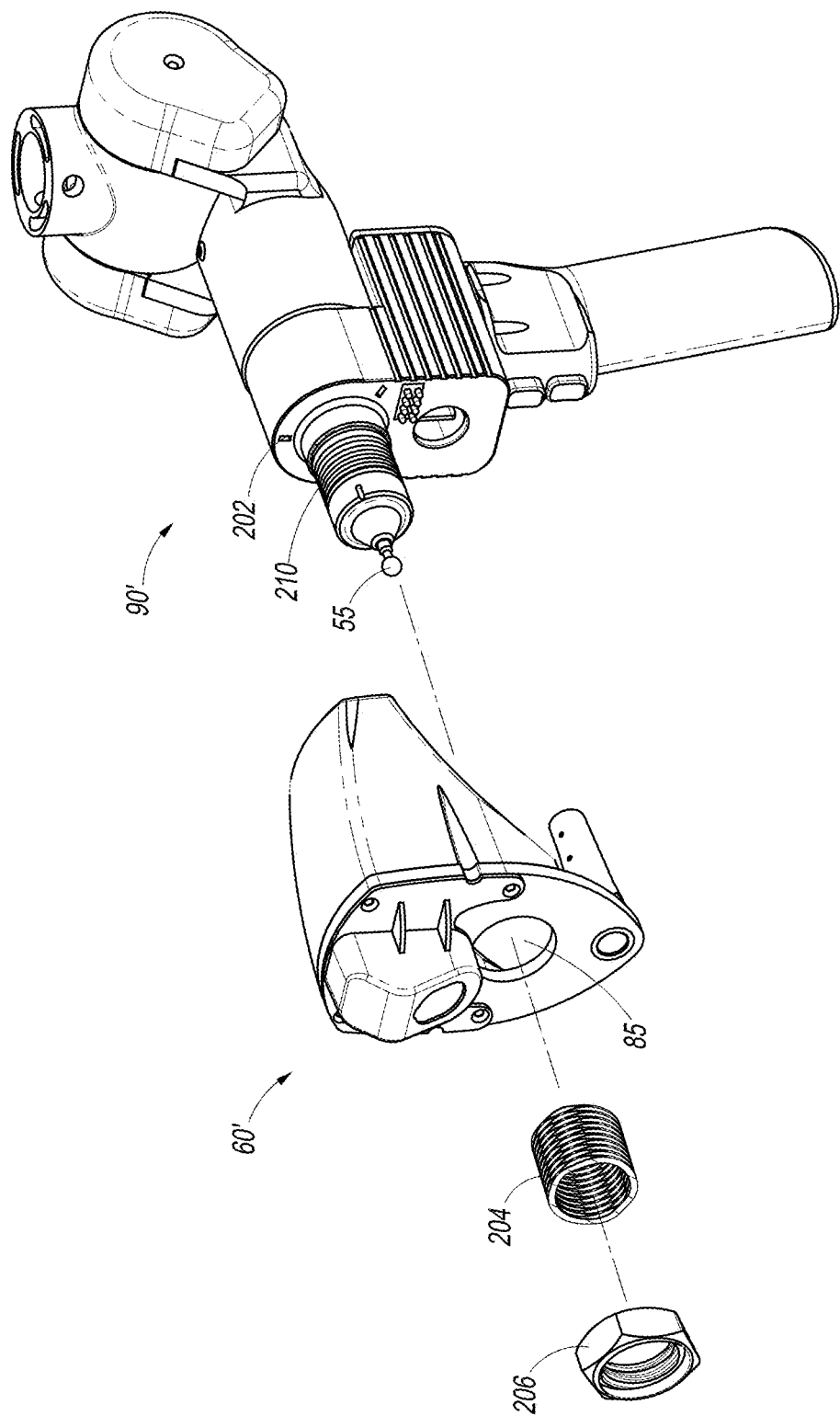

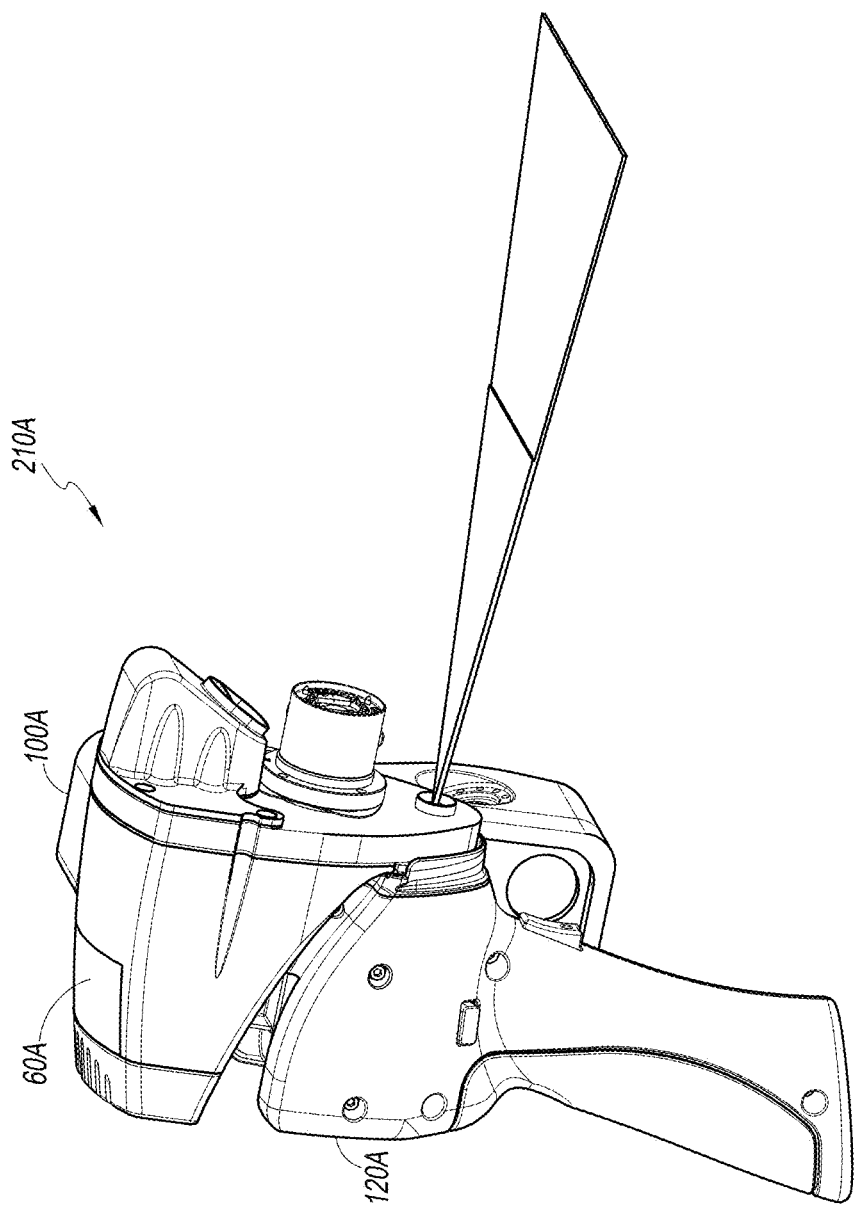

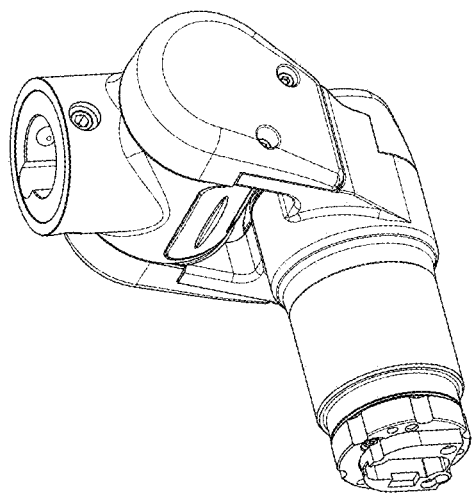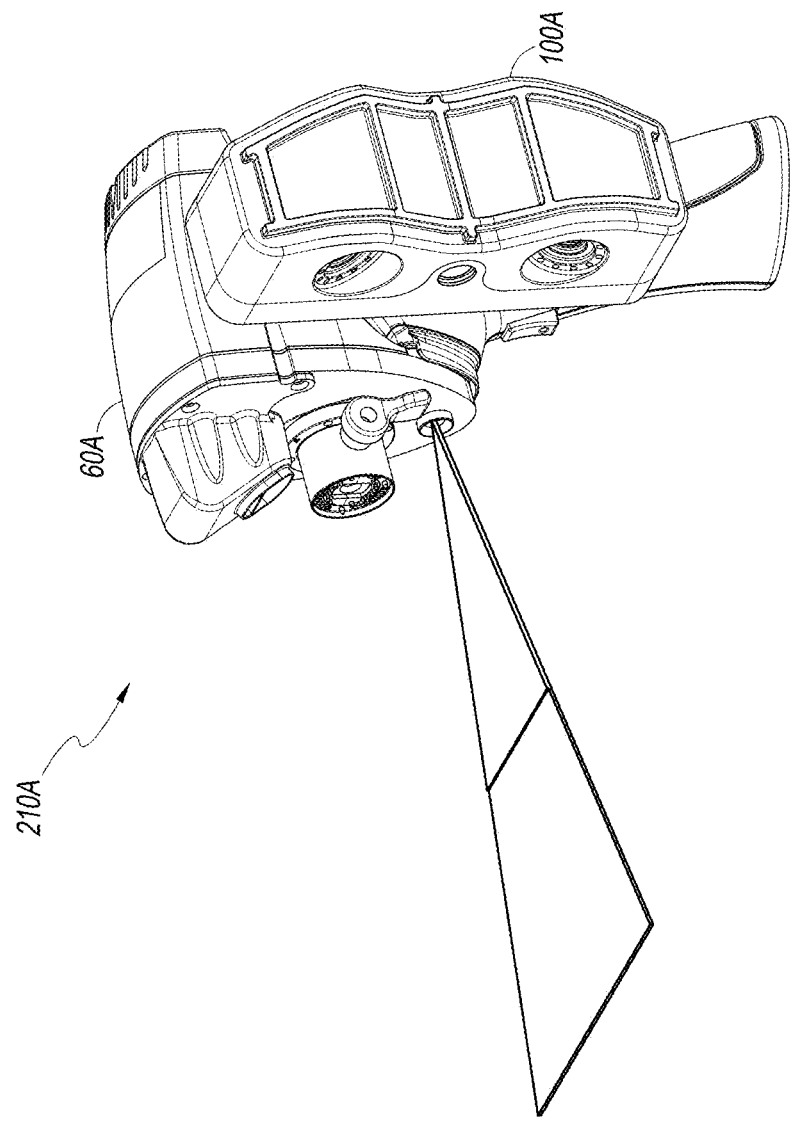
FIG. 16D

MULTI-MODE PORTABLE COORDINATE MEASURING MACHINE

PRIORITY INFORMATION

This application is a continuation of U.S. patent application Ser. No. 14/857,503, filed Sep. 17, 2015 and titled "MULTI-MODE PORTABLE COORDINATE MEASURING MACHINE," now issued as U.S. Pat. No. 10,036,627, the disclosure of which is hereby incorporated by reference in its entirety herein. U.S. patent application Ser. No. 14/857,503 claims the benefit under 35 U.S.C. § 119(e) to U.S. Provisional Patent Application Ser. Nos. 62/052,846, filed 19 Sep. 2014 and entitled MULTI-MODE PORTABLE COORDINATE MEASURING MACHINE; and 62/059,693, filed 3 Oct. 2014 and entitled MULTI-MODE PORTABLE COORDINATE MEASURING MACHINE, the entirety of each hereby expressly incorporated by reference herein.

BACKGROUND

Field

The present invention relates to coordinate measuring machines with multiple modes of operation.

Description of the Related Art

Rectilinear measuring systems, also referred to as coordinate measuring machines (CMMs) and articulated arm measuring machines, are used to generate highly accurate geometry information. In general, these instruments capture the structural characteristics of an object for use in quality control, electronic rendering and/or duplication. One example of a conventional apparatus used for coordinate data acquisition is a portable coordinate measuring machine (PCMM), which is a portable device capable of taking highly accurate measurements within a measuring sphere of the device. Such devices often include a probe mounted on an end of an arm that includes a plurality of transfer members connected together by joints. The end of the arm opposite the probe is typically coupled to a moveable base. Typically, the joints are broken down into singular rotational degrees of freedom, each of which is measured using a dedicated rotational transducer. During a measurement, the probe of the arm is moved manually by an operator to various points in the measurement sphere. At each point, the position of each of the joints must be determined at a given instant in time. Accordingly, each transducer outputs an electrical signal that varies according to the movement of the joint in that degree of freedom. Typically, the probe also generates a signal. These position signals and the probe signal are transferred through the arm to a recorder/analyzer. The position signals are then used to determine the position of the probe within the measurement sphere. See e.g., U.S. Pat. Nos. 5,829,148 and 7,174,651, which are incorporated herein by reference in their entireties. The measured position of the end of the arm can be accurate to a distance no greater than approximately 1 mm, or more preferably 0.5 mm or 0.1 mm. In further embodiments, the measured positions can be accurate to a distance no greater than 0.01 mm.

Increasingly, PCMM's are used in combination with an optical or laser scanner. In such applications the optical or laser scanner typically includes an optics system, a laser or light source, sensors and electronics that are all housed in one box. The laser scanner box is then, in turn, coupled to the probe end of the PCMM and to a side of the probe. The various locations that existed for mounting the laser scanning box include positioning the box on top of the probe, forward and below the axis of the probe, and/or off to the side of the probe. In this manner, 2-dimensional and/or 3-dimensional data could be gathered with the laser scanner and combined with the position signals generated by the PCMM. See e.g., U.S. Pat. No. 7,246,030.

While such PCMM and laser scanner combinations have been useful. As mentioned above, the purpose of PCMM's is to take highly accurate measurements. Accordingly, there is a continuing need to improve the accuracy of such devices.

SUMMARY

In one embodiment a coordinate measuring machine system can include an articulated arm, a contact probe, and one or more non-contact measuring devices. The articulated arm can include a plurality of transfer members and a plurality of articulation members connecting at least two transfer members to each other. The articulated arm can also include a base at a proximal end and a mounting portion at a distal end. The contact probe can be mounted to the mounting portion, such that the articulated arm can measure a position contacted by the contact probe. The one or more non-contact measuring devices can be configured to be mounted to the mounting portion such that the articulated arm can measure a plurality of positions simultaneously with the one or more non-contact measuring devices. Further, the one or more non-contact measuring devices can be configured to be removed from the mounting portion and measure a plurality of positions simultaneously while not mounted to an articulated arm coordinate measuring machine.

In a further embodiment, a method of measuring an object can be provided. The object can be measured with a measuring device mounted on an articulated arm coordinate measuring machine. The measuring device can then be removed from the articulated arm coordinate measuring machine. Next, the measuring device can measure an object while not mounted on the articulated arm coordinate measuring machine.

BRIEF DESCRIPTION OF THE DRAWINGS

Further objects, features and advantages of the invention will become apparent from the following detailed description taken in conjunction with the accompanying figures showing illustrative embodiments of the invention, in which:

FIG. 8A is a back view of the non-contact coordinate detection device of FIG. 8;

FIG. 8B is a front view of the main body of the coordinate acquisition member of FIG. 8;

FIG. 9 is a front exploded perspective view of the coordinate acquisition member of FIG. 8.

FIG. 16A is a side view of a portable measuring unit.

FIG. 16D is a perspective view of the portable measuring unit of FIG. 16A exploded from a last axis of a CMM arm.

DETAILED DESCRIPTION OF CERTAIN PREFERRED EMBODIMENTS

Figure 1:
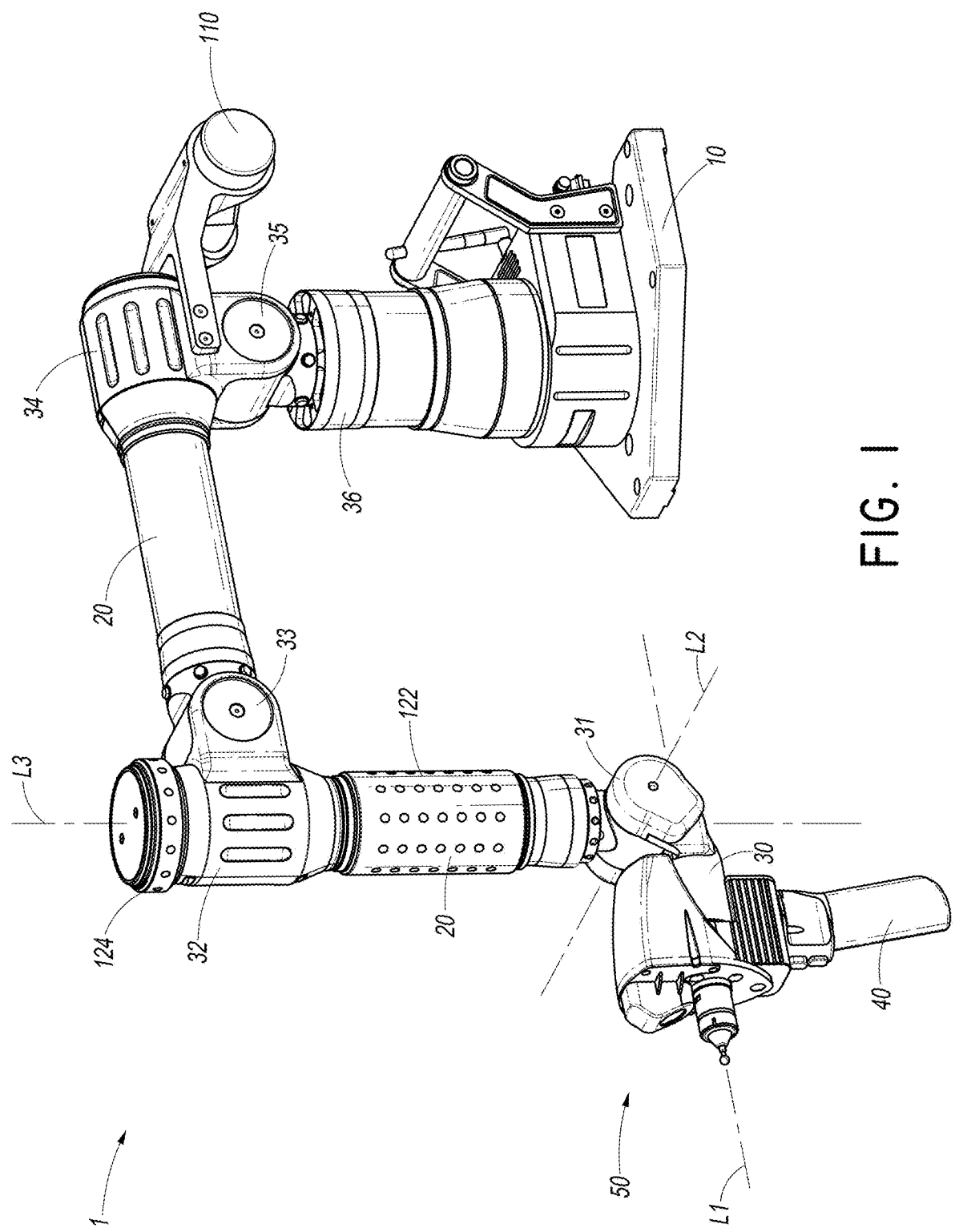
FIG. 1 is a perspective view of an embodiment CMM arm with a laser scanner.
Figure 1A:
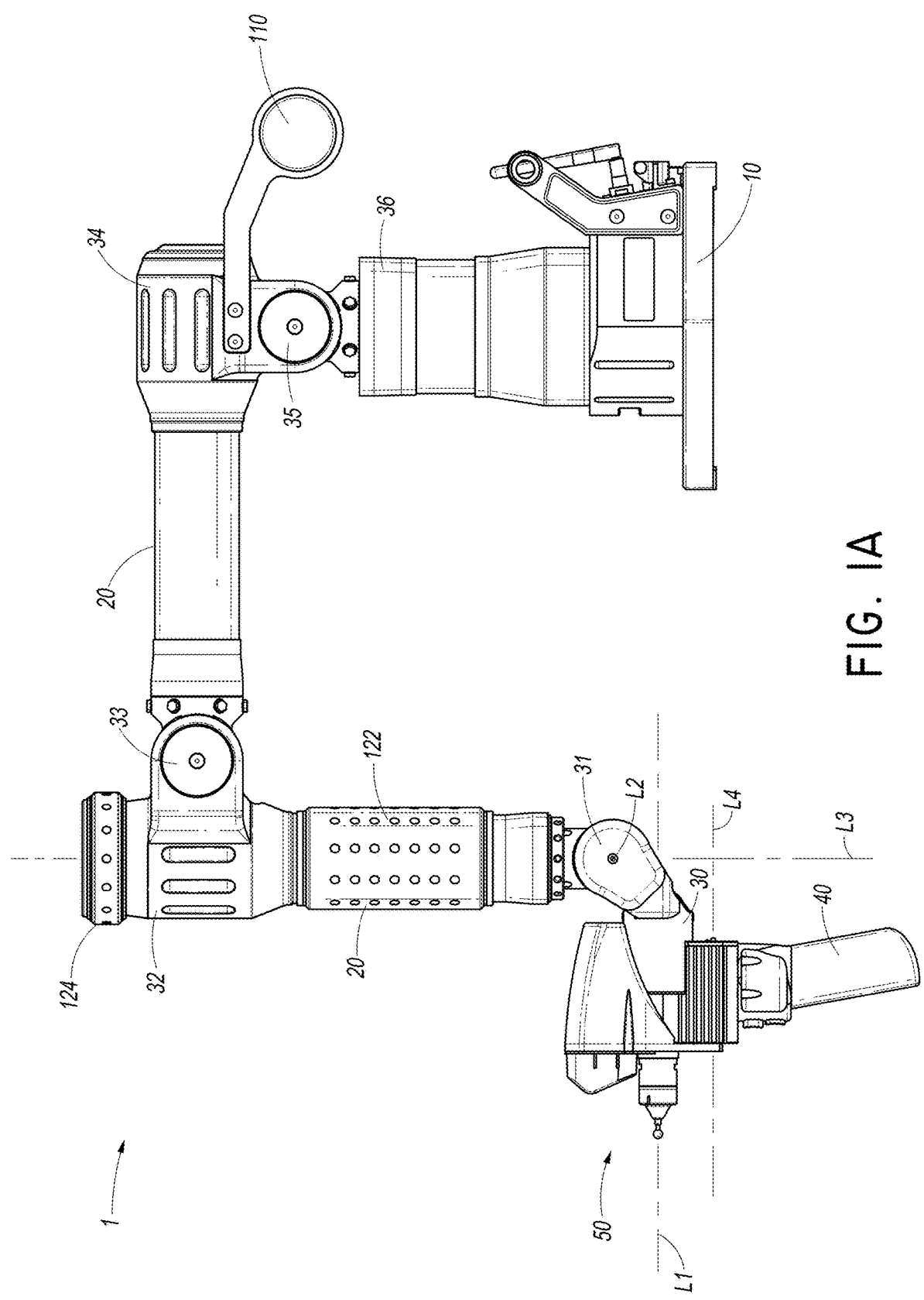
FIG. 1A is a side view of the CMM arm of FIG. 1.
Figure 1B:
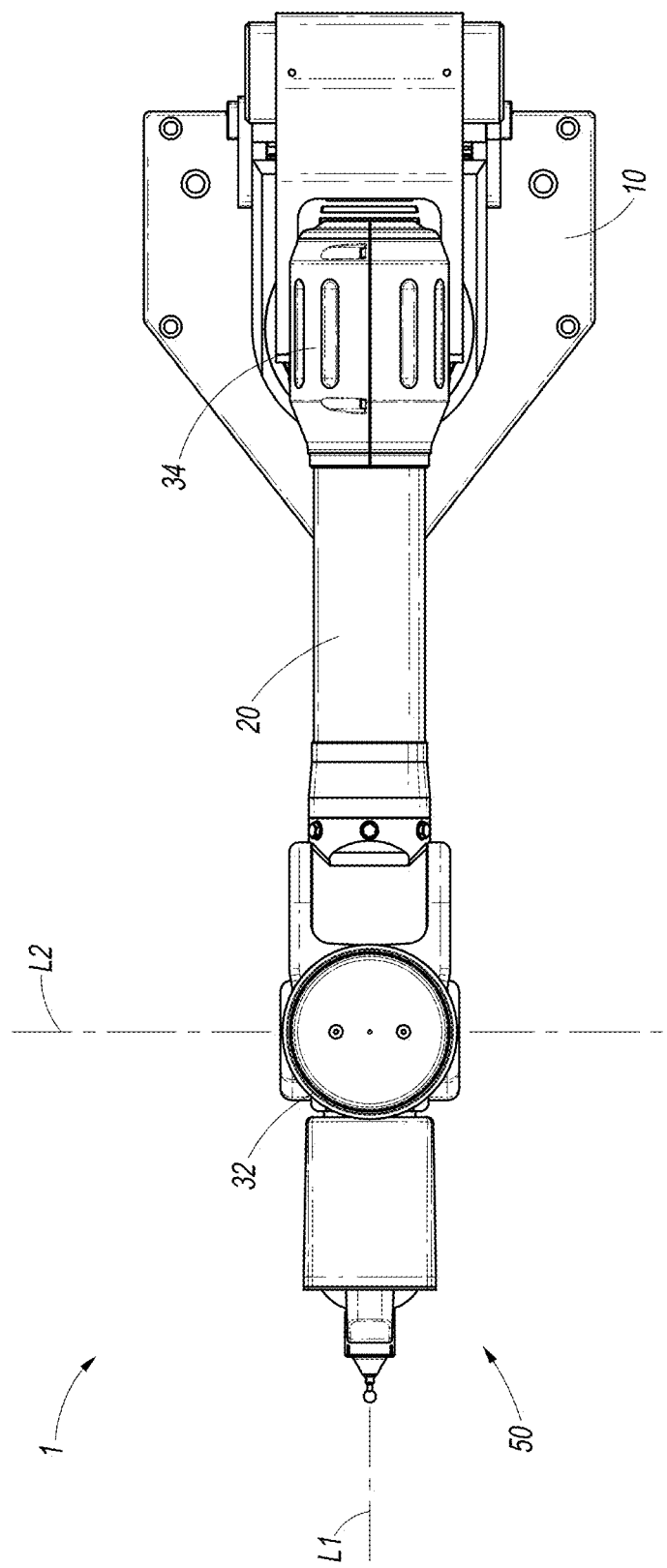
FIG. 1B is a top view of the CMM arm of FIG. 1.

FIGS. 1-1B illustrate one embodiment of a portable coordinate measuring machine (PCMM) 1 in accordance with the illustrated embodiment. In the illustrated embodiment, the PCMM 1 comprises a base 10, a plurality of rigid transfer members 20, a coordinate acquisition member 50 and a plurality of articulation members 30-36 connecting the rigid transfer members 20 to one another. Each articulation member 30-36 is configured to impart one or more rotational and/or angular degrees of freedom. Through the various articulation members 30-36, the PCMM 1 can be aligned in various spatial orientations thereby allowing fine positioning and orientating of the coordinate acquisition member 50 in three dimensional space.

The position of the rigid transfer members 20 and the coordinate acquisition member 50 may be adjusted using manual, robotic, semi-robotic and/or any other adjustment method. In one embodiment, the PCMM 1, through the various articulation members 30, is provided with seven rotary axes of movement. It will be appreciated, however, that there is no strict limitation to the number of axes of movement that may be used, and fewer or additional axes of movement may be incorporated into the PCMM design.

In the embodiment PCMM 1 illustrated in FIG. 1, the articulation members 30-36 can be divided into two functional groupings based on their operation, namely: 1) those articulation members 30, 32, 34, 36 which allow the swiveling motion associated with a specific transfer member (hereinafter, "swiveling joints"), and 2) those articulation members 31, 33, 35 which allow a change in the relative angle formed between two adjacent members or between the coordinate acquisition member 30 and its adjacent member (hereinafter, "hinge joints"). While the illustrated embodiment includes four swiveling joints and three hinge joints positioned as to create seven axes of movement, it is contemplated that in other embodiments, the number of and location of hinge joints and swiveling joints can be varied to achieve different movement characteristics in a PCMM. For example, a substantially similar device with six axes of movement could simply lack the swivel joint 30 between the coordinate acquisition member 50 and the adjacent articulation member 20. In still other embodiments, the swiveling joints and hinge joints can be combined and/or used in different combinations.

Figure 2:
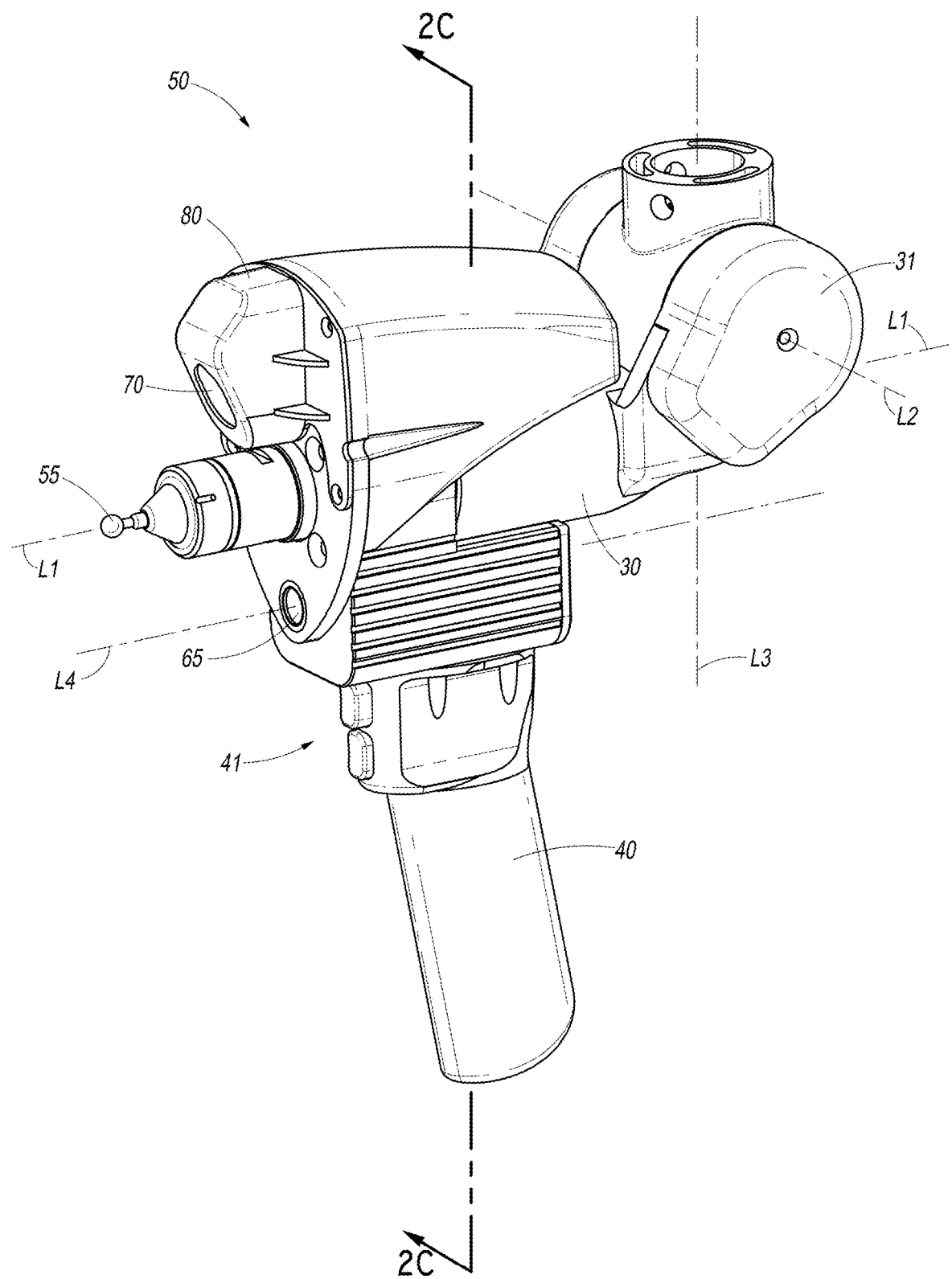
FIG. 2 is a perspective view of a coordinate acquisition member of the CMM arm of FIG. 1.
Figure 2A:
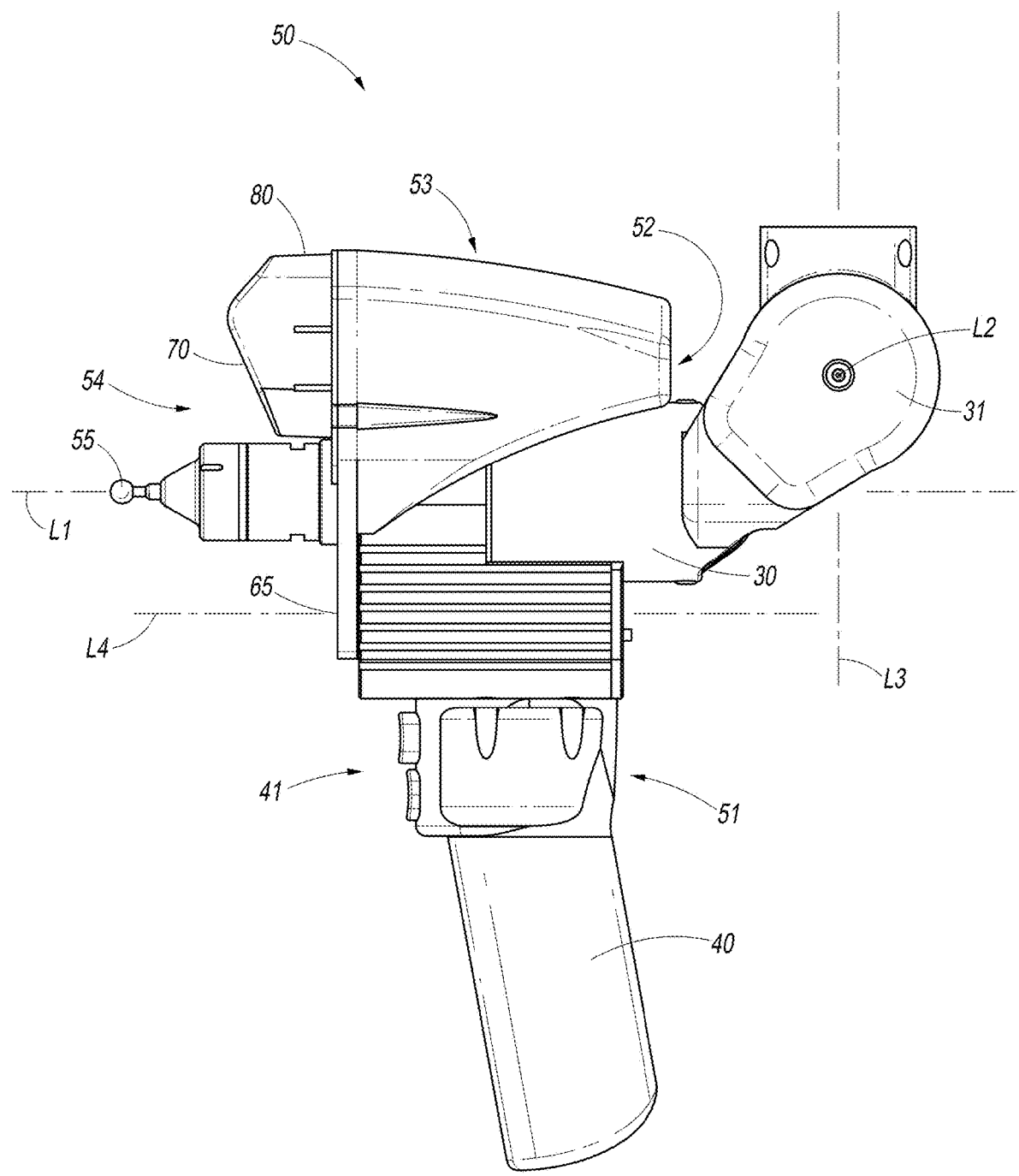
FIG. 2A is a side view of the coordinate acquisition member of FIG. 2.
Figure 2B:
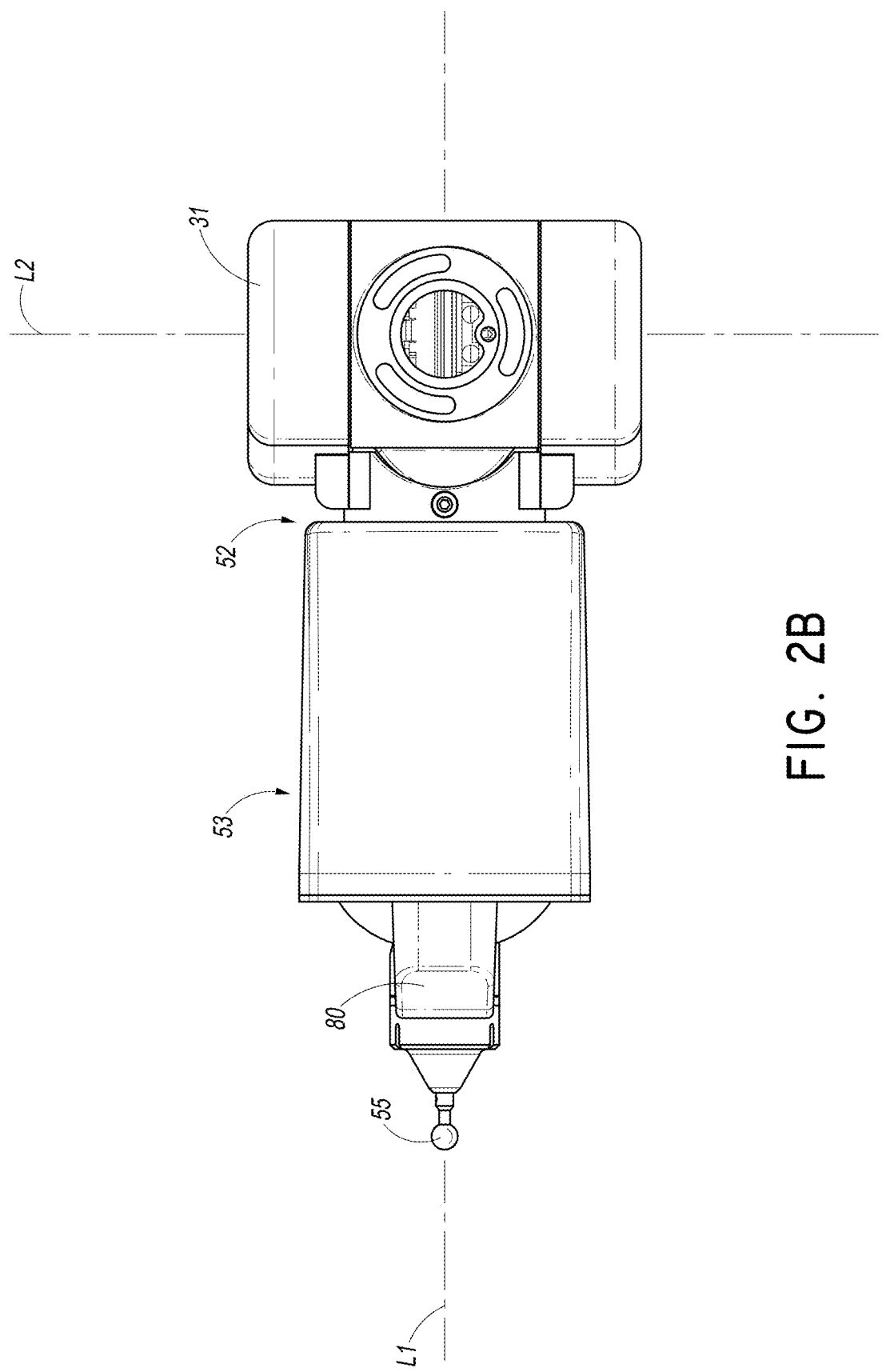
FIG. 2B is a top view of the coordinate acquisition member of FIG. 2.
Figure 3:
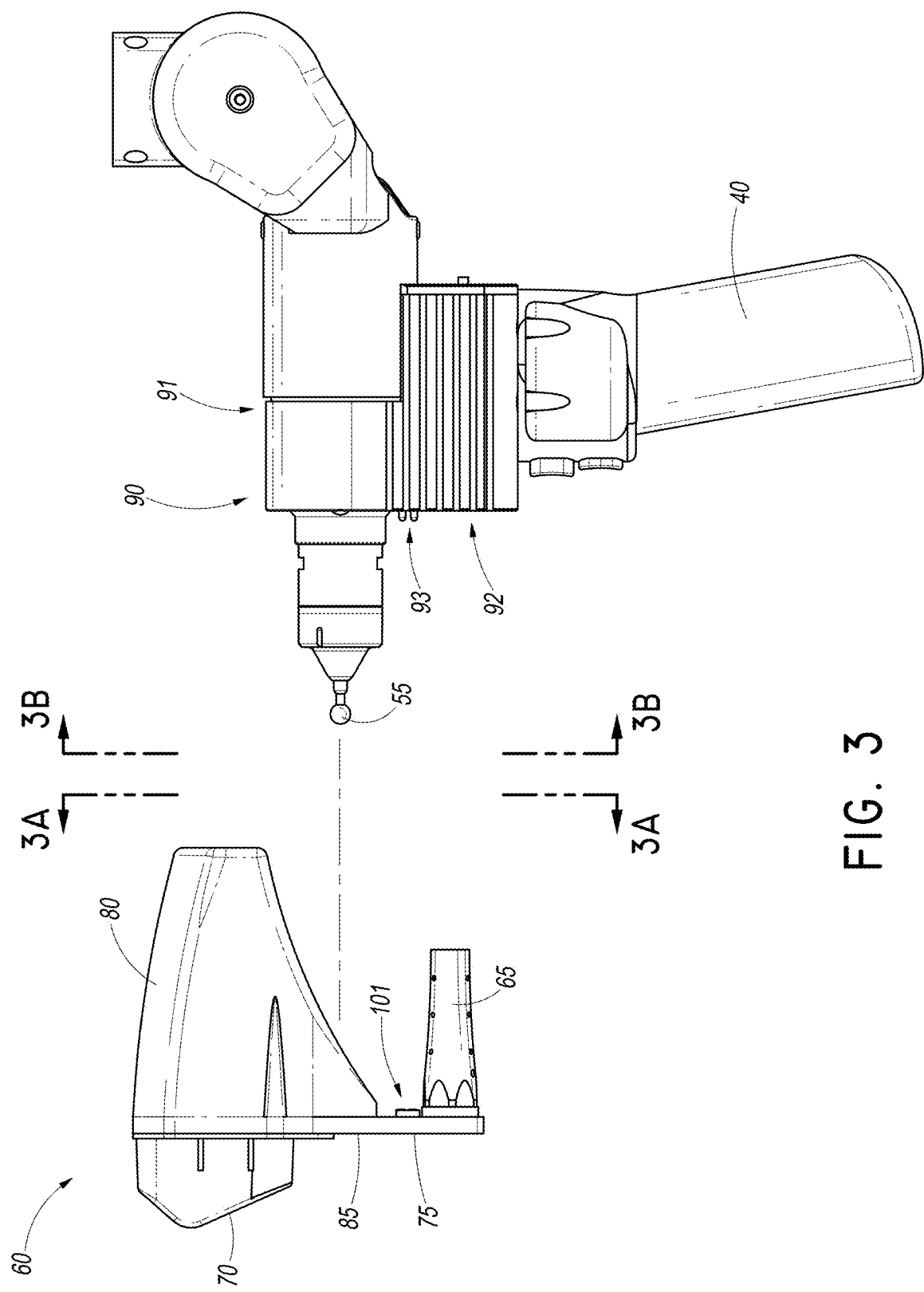
FIG. 3 is an exploded side view of the coordinate acquisition member of FIG. 2.

In various embodiments, the coordinate acquisition member 50 comprises a contact sensitive member or probe 55 (depicted as a hard probe) configured to engage the surfaces of a selected object and generate coordinate data on the basis of probe contact, as depicted in FIGS. 2-3. In the illustrated embodiment, the coordinate acquisition member 50 also comprises a non-contact scanning and detection component that does not necessarily require direct contact with the selected object to acquire geometry data. As depicted, the non-contact scanning device comprises a non-contact coordinate detection device 60 (shown as a laser coordinate detection device/laser scanner) that may be used to obtain geometry data without direct object contact. It will be appreciated that various coordinate acquisition member configurations including: a contact-sensitive probe, a non-contact scanning device, a laser-scanning device, a probe that uses a strain gauge for contact detection, a probe that uses a pressure sensor for contact detection, a device that uses an infrared beam for positioning, and a probe configured to be electrostatically-responsive may be used for the purposes of coordinate acquisition. Further, in some embodiments, a coordinate acquisition member 50 can include one, two, three, or more than three coordinate acquisition mechanisms.

With particular reference to FIG. 3, in various embodiments of the PCMM 1, the various devices which may be used for coordinate acquisition, such as the laser coordinate detection device 60, may be configured to be manually disconnected and reconnected from the PCMM 1 such that an operator can change coordinate acquisition devices without specialized tools. Thus, an operator can quickly and easily remove one coordinate acquisition device and replace it with another coordinate acquisition device. Such a connection may comprise any quick disconnect or manual disconnect device. This rapid connection capability of a coordinate acquisition device can be particularly advantageous in a PCMM 1 that can be used for a wide variety of measuring techniques (e.g. measurements requiring physical contact of the coordinate acquisition member with a surface followed by measurements requiring only optical contact of the coordinate acquisition member) in a relatively short period of time. Although, as depicted, only the laser coordinate detection device 60 is removed, in some embodiments the contact sensitive member 55 can also be removed and replaced in a similar manner.

In the embodiment of FIG. 2, the coordinate acquisition member 30 also comprises buttons 41, which are configured to be accessible by an operator. By pressing one or more of the buttons 41 singly, multiply, or in a preset sequence, the operator can input various commands to the PCMM 1. In some embodiments the buttons 41 can be used to indicate that a coordinate reading is ready to be recorded. In other embodiments the buttons 41 can be used to indicate that the location being measured is a home position and that other positions should be measured relative to the home position. In other embodiments the buttons 41 may be used to record points using the contact sensitive member 55, record points using the non-contact coordinate detection device 60, or to switch between the two devices. In other embodiments, the buttons 41 can be programmable to meet an operator's specific needs. The location of the buttons 41 on the coordinate acquisition member 50 can be advantageous in that an operator need not access the base 10 or a computer in order to activate various functions of the PCMM 1 while using the coordinate acquisition member 50. This positioning may be particularly advantageous in embodiments of PCMM having transfer members 20 that are particularly long, thus placing the base 10 out of reach for an operator of the coordinate acquisition member 50 in most positions. In some embodiments of the PCMM 1, any number of operator input buttons (e.g., more or fewer than the two illustrated), can be provided. Advantageously, as depicted the buttons 61 are placed on the handle 40 in a trigger position, but in other embodiments it may be desirable to place buttons in other positions on the coordinate acquisition member 50 or anywhere on the PCMM 1. Other embodiments of PCMM can include other operator input devices positioned on the PCMM or the coordinate acquisition member 50, such as switches, rotary dials, or touch pads in place of, or in addition to operator input buttons.

With particular reference to FIG. 1, in some embodiments, the base 10 can be coupled to a work surface through a magnetic mount, a vacuum mount, bolts or other coupling devices. Additionally, in some embodiments, the base 10 can comprise various electrical interfaces such as plugs, sockets, or attachment ports. In some embodiments, attachment ports can comprise connectability between the PCMM 1 and a USB interface for connection to a processor such as a general purpose computer, an AC power interface for connection with a power supply, or a video interface for connection to a monitor. Other data and power connections are also possible, such as Gigabit Ethernet, Camera Link, Firewire, and DC power interfaces. In some embodiments, the PCMM 1 can be configured to have a wireless connection with an external processor or general purpose computer such as by a WiFi connection, Bluetooth connection, RF connection, infrared connection, or other wireless communications protocol. In some embodiments, the various electrical interfaces or attachment ports can be combined and specifically configured to meet the requirements of a specific PCMM 1.

With continued reference to FIG. 1, the transfer members 20 are preferably constructed of hollow generally cylindrical tubular members so as to provide substantial rigidity to the members 20. The transfer members 20 can be made of any suitable material which will provide a substantially rigid extension for the PCMM 1. The transfer members 20 preferably define a double tube assembly so as to provide additional rigidity to the transfer members 20. Furthermore, it is contemplated that the transfer 20 in various other embodiments can be made of alternate shapes such as those comprising a triangular or octagonal cross-section.

In some embodiments, it can be desirable to use a composite material, such as a carbon fiber material, to construct at least a portion of the transfer members 20. In some embodiments, other components of the PCMM 1 can also comprise composite materials such as carbon fiber materials. Constructing the transfer members 20 of composites such as carbon fiber can be particularly advantageous in that the carbon fiber can react less to thermal influences as compared to metallic materials such as steel or aluminum. Thus, coordinate measuring can be accurately and consistently performed at various temperatures. In other embodiments, the transfer members 20 can comprise metallic materials, or can comprise combinations of materials such as metallic materials, ceramics, thermoplastics, or composite materials. Also, as will be appreciated by one skilled in the art, many of the other components of the PCMM 1 can also be made of composites such as carbon fiber. Presently, as the manufacturing capabilities for composites are generally not as precise when compared to manufacturing capabilities for metals, the components of the PCMM 1 that require a greater degree of dimensional precision are generally made of a metals such as aluminum. It is foreseeable that as the manufacturing capabilities of composites improved that a greater number of components of the PCMM 1 can be also made of composites.

With continued reference to FIG. 1, some embodiments of the PCMM 1 may also comprise a counterbalance system 110 that can assist an operator by mitigating the effects of the weight of the transfer members 20 and the articulating members 30-36. In some orientations, when the transfer members 20 are extended away from the base 10, the weight of the transfer members 20 can create difficulties for an operator. Thus, a counterbalance system 110 can be particularly advantageous to reduce the amount of effort that an operator needs to position the PCMM 1 for convenient measuring. In some embodiments, the counterbalance system 110 can comprise resistance units (not shown) which are configured to ease the motion of the transfer members 20 without the need for heavy weights to cantilever the transfer members 20. It will be appreciated by one skilled in the art that in other embodiments simple cantilevered counterweights can be used in place or in combination with resistance units. Further, although as depicted there is only one counterbalance system 110 unit, in other embodiments there can be more.

In some embodiments, the resistance units can comprise hydraulic resistance units which use fluid resistance to provide assistance for motion of the transfer members 20. In other embodiments the resistance units may comprise other resistance devices such as pneumatic resistance devices, or linear or rotary spring systems.

The position of the contact sensitive member 55 in space at a given instant can be calculated by knowing the length of each rigid transfer member 20 and the specific position of each of the articulation members 30-36. Each of the articulation members 30-36 can be broken down into a singular rotational degree of motion, each of which is measured using a dedicated rotational transducer. Each transducer outputs a signal (e.g., an electrical signal), which varies according to the movement of the articulation member in its degree of motion. The signal can be carried through wires or otherwise transmitted to the base 10. From there, the signal can be processed and/or transferred to a computer for determining the position of the coordinate acquisition member 50 and its various parts in space.

In one embodiment, the transducer can comprise an optical encoder. In general, each encoder measures the rotational position of its axle by coupling is movement to a pair of internal wheels having successive transparent and opaque bands. In such embodiments, light can be shined through the wheels onto optical sensors which feed a pair of electrical outputs. As the axle sweeps through an arc, the output of the analog encoder can be substantially two sinusoidal signals which are 90 degrees out of phase. Coarse positioning can occur through monitoring the change in polarity of the two signals. Fine positioning can be determined by measuring the actual value of the two signals at the instant in question. In certain embodiments, maximum accuracy can be obtained by measuring the output precisely before it is corrupted by electronic noise. Additional details and embodiments of the illustrated embodiment of the PCMM 1 can be found in U.S. Pat. No. 5,829,148, the entirety of which is hereby incorporated by reference herein.

With reference to FIGS. 1, 1A, and 1B, in some embodiments, the PCMM 1 can comprise one or more rotatable grip assemblies 122, 124. In the illustrated embodiment, the PCMM 1 can comprise a lower rotatable grip assembly 122 and an upper rotatable grip assembly 124. Advantageously, having a lower rotatable grip assembly 122 and an upper rotatable grip assembly 124 disposed on a last transfer member 21, allows the operator to easily use both hands in positioning the PCMM 1. In other embodiments, the PCMM 1 can comprise one, or more than two rotatable grips. Additional details of the grip assemblies can be found in Applicant's co-pending U.S. patent application Ser. No. 12/057,966, filed Mar. 28, 2008, the entirety of which is hereby incorporated by reference herein While several embodiments and related features of a PCMM 1 have been generally discussed herein, additional details and embodiments of PCMM 1 can be found in U.S. Pat. Nos. 5,829,148 and 7,174,651, the entirety of these patents being incorporated by reference herein. While certain features below are discussed with reference to the embodiments of a PCMM 1 described above, it is contemplated that they can be applied in other embodiments of a PCMM such as those described in U.S. patent application Ser. No. 12/748,169, filed 26 Mar. 2010, entitled "IMPROVED ARTICULATED ARM;" Ser. No. 12/748,243, filed 26 Mar. 2010, entitled "SYSTEMS AND METHODS FOR CONTROL AND CALIBRATION OF A CMM;" Ser. No. 12/748,278, filed 26 Mar. 2010, entitled "CMM WITH IMPROVED SENSORS;" Ser. No. 12/748,206, filed 26 Mar. 2010, entitled "CMM WITH MODULAR FUNCTIONALITY;" and Ser. No. 12/746,267, filed 26 Mar. 2010, entitled "ENHANCED POSITION DETECTION FOR A CMM," the entire contents of these patent applications being incorporated herein by reference.

As depicted in FIG. 1, the PCMM can include a coordinate acquisition member 50 at an end of its arm. FIGS. 2-3 depict the coordinate acquisition member 50 in more detail. As shown, the coordinate acquisition member 50 can include a contact sensitive member 55 and a laser coordinate detection device 60 facing a front end 54. The coordinate acquisition member 50 can further attach to a handle 40 at a lower end 51 and the PCMM 1 at a rear end 52. The coordinate acquisition member 50 can further include a top end 53. At the rear end 52, the coordinate acquisition member 50 can further include a data connection (not shown) with the hinge 31, such as a slip ring connection, a direct wire, or some other connection. This can allow data transfer between the coordinate acquisition member 50 and the PCMM 1. The PCMM 1 can include similar data transfer elements along its arm, allowing data transmission between the coordinate acquisition member 50 and the base 10, or any peripheral computing medium external to the PCMM arm.

The laser coordinate detection device 60 can include a light source 65 (depicted as a laser) and an optical sensor 70 (depicted as a camera), and can acquire positional data by a method of triangulation. The laser or light source 65 can create an illuminated laser plane including a laser line L4. The camera 70 can be displaced from the laser plane and further be non-parallel to the laser plane. Accordingly, the camera 70 will view points as higher or lower, depending on their position further or closer to the laser 65. Similarly, the camera 70 will view points illuminated by the laser as being either further to the left or the right, according to their actual position relative to the laser 65. Comparing the geometric relationship between the position and orientation of the laser 65 and the camera 70 will allow one of skill in the art to appropriately translate the position of the image of the laser-illuminated point in the image captured by the camera 70 to an actual position in space in conjunction with the position of the coordinate acquisition member 50 itself.

Figure 2C:
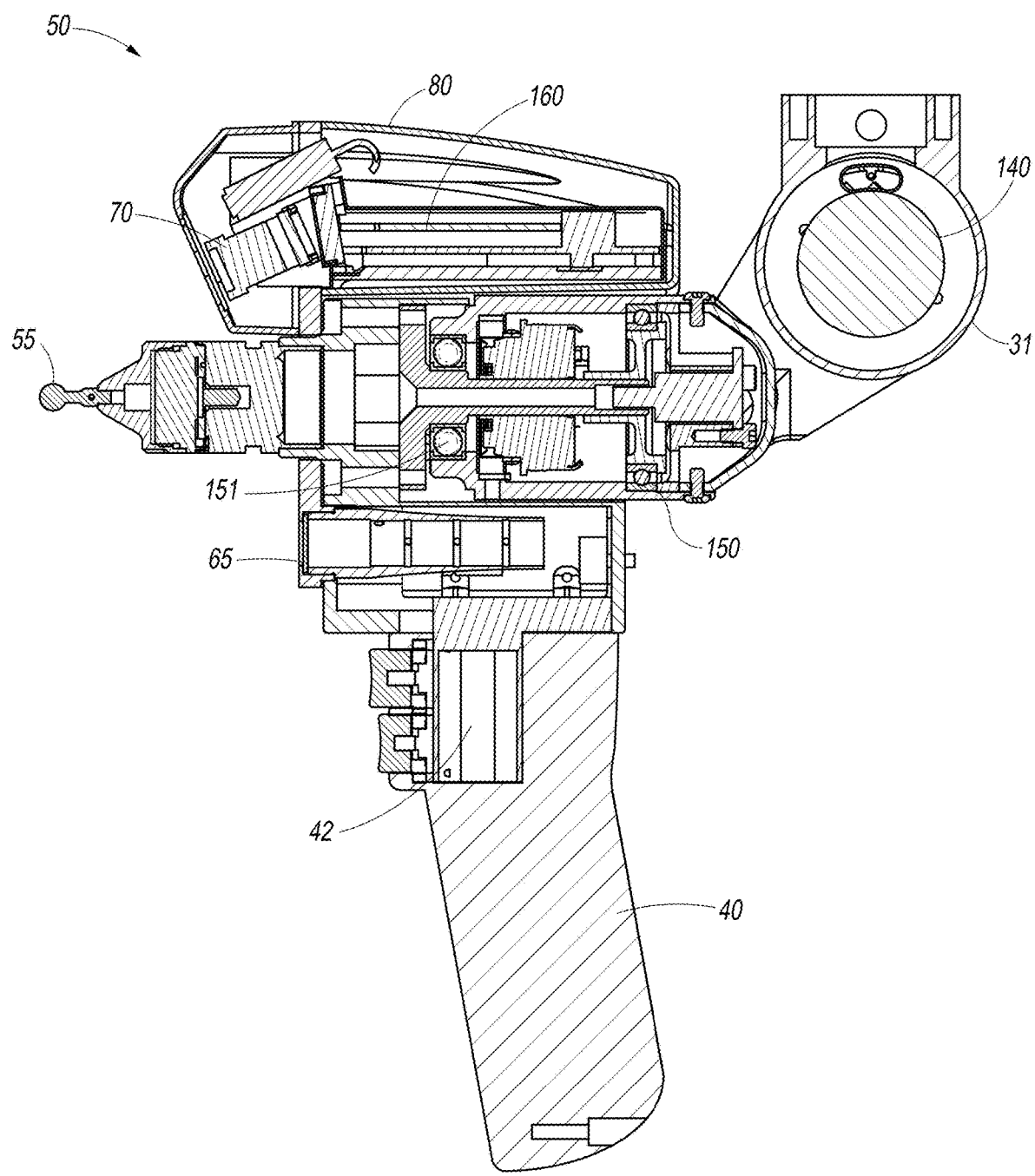
FIG. 2C is a side cross-sectional view of the coordinate acquisition member of FIG. 2, at 2C-2C.

In FIG. 1, a plurality of the axes of movement are marked according to their proximity to the coordinate acquisition member 50. As depicted, the coordinate acquisition member 50 can pivot about a last axis of rotation L1 on a swivel 30. The last axis of rotation L1 and the swivel 30 are more clearly depicted in FIG. 2C. As shown, the laser coordinate detection device 60 mounts bearings 150, 151 at an end of the PCMM arm 1. The orientation and position of the bearings 150, 151 can substantially define the last axis L1. Thus, the laser coordinate detection device 60 can rotate about the last axis L1, independent of the contact sensitive member (depicted as a probe) 55. In some embodiments, the contact sensitive member 55 is not rotatable, reducing potential error from any eccentricity between the contact sensitive member 55 and the last axis L1. The swivel 30 can rotate about a second to last axis of rotation L2 at the end of the last rigid transfer member 21 on a hinge joint 31. Like the bearings 150, 151 and the last axis L1, the second to last axis L2 can be substantially defined by a hinge shaft 140. As depicted, the last axis L1 can also be considered a roll axis, and the second to last axis can also be considered a pitch axis. Similarly, rotation about a third to last axis L3 can be considered a yaw axis.

The handle 40 can also generally comprise a pistol-grip style, which can further include ergonomic grooves corresponding to human fingers (not shown). The handle can also have a generally central axis L5. Optionally, within the handle 40, a battery 42 can be held. In some embodiments the handle 40 can include a sealed battery, as described in U.S. Publication No. 2007/0256311A1, published Nov. 8, 2007, which is incorporated by reference herein in its entirety. Further, the battery 42 can insert through the bottom of the handle 40. In other embodiments, the battery 42 can insert through the top of the handle 40, and the handle 40 can release from the coordinate acquisition member 50 to expose an opening for battery insertion and removal. The battery can be provided to power the laser scanner, rotational motors about one of the articulation members 30-36, and/or other types of probes or devices. This can reduce current draw through the arm, decrease overall power requirements, and/or reduce heat generated in various parts of the arm.

In one embodiment, data can be transmitted wirelessly to and from either the coordinate acquisition member 50 or the non-contact coordinate detection device 60 and the base of the PCMM 1 or to an external device such as a computer. This can reduce the number of internal wires through the PCMM 1. It can also reduce the number of wires between the PCMM 1 and the computer. Further, the handle can optionally include a wired connection, through the PCMM 1, to an external device, and/or a wired connection outside the PCMM 1 to an external device. When the handle can potentially connect directly to the external device, outside the PCMM 1, the handle can optionally include a data port that can connect both to a wired connection through the arm and to a wired connection outside, or independent of, the arm. Wires outside the arm are not limited by space constraints and constraints related to rotation of the wires inside the arm, and thus can potentially provide a higher data bandwidth (and also potentially a higher power output when used as a power cable).

The handle can also optionally include a memory. The memory can optionally store various types of data, such as data recorded by a non-contact coordinate detection device, instructions or software to operate components of a coordinate acquisition member, or other data. This data can be uploaded or downloaded when the handle is in communication with an external device, either by wire or wirelessly. Thus, large amounts of data can be transferred even if only a low bandwidth (or no bandwidth) is available during measurement. Further, data processing can be performed by a processor on the handle, such that file sizes that need to be transmitted can be reduced. Similar concepts are further described, below.

Above the handle 40, the coordinate acquisition member 50 can include a main body 90, best depicted in FIG. 3. The main body 90 can connect directly to the hinge 31 at the rear end 52 of the coordinate acquisition member 50. The main body 90 can further hold the contact sensitive member 55. In preferred embodiments, the main body 90 can even further hold the contact sensitive member 55 in near alignment with the swivel 30, such that an axis of the contact sensitive member 55 extends near the last axis L1 of the swivel 30. In some embodiments, the axis of the contact sensitive member 55 can pass through the last axis L1 of the swivel 30. In other embodiments the axis of the contact sensitive member 55 can pass within 10 mm of the last axis L1, this distance corresponding to D3 (depicted in FIG. 2D).

Figure 3B:
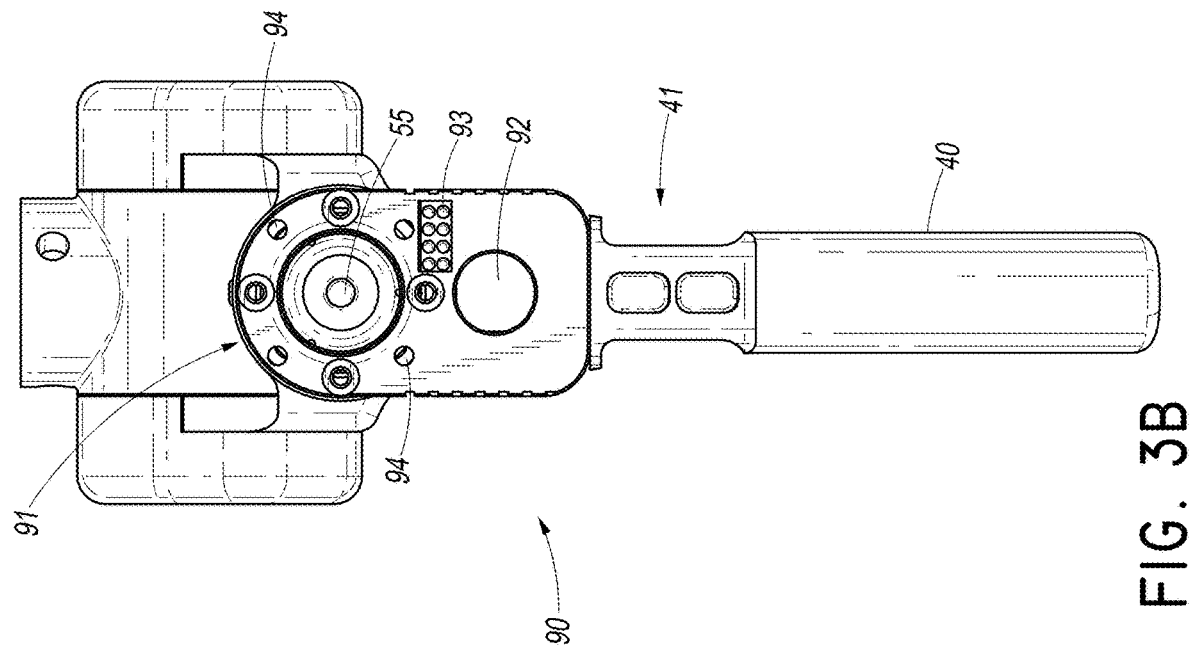
FIG. 3B is a front view of a main body of a coordinate acquisition member of FIG. 3, at 3B-3B.
Figure 3A:
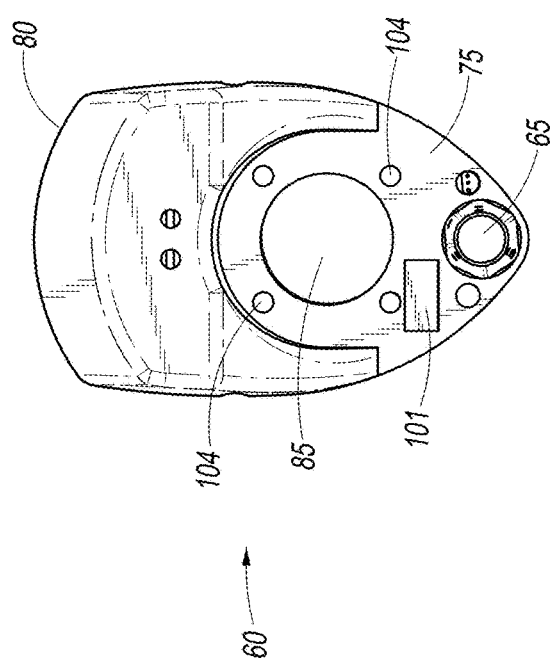
FIG. 3A is a back view of a non-contact coordinate detection device of FIG. 3, at 3A-3A.
Figure 4A:
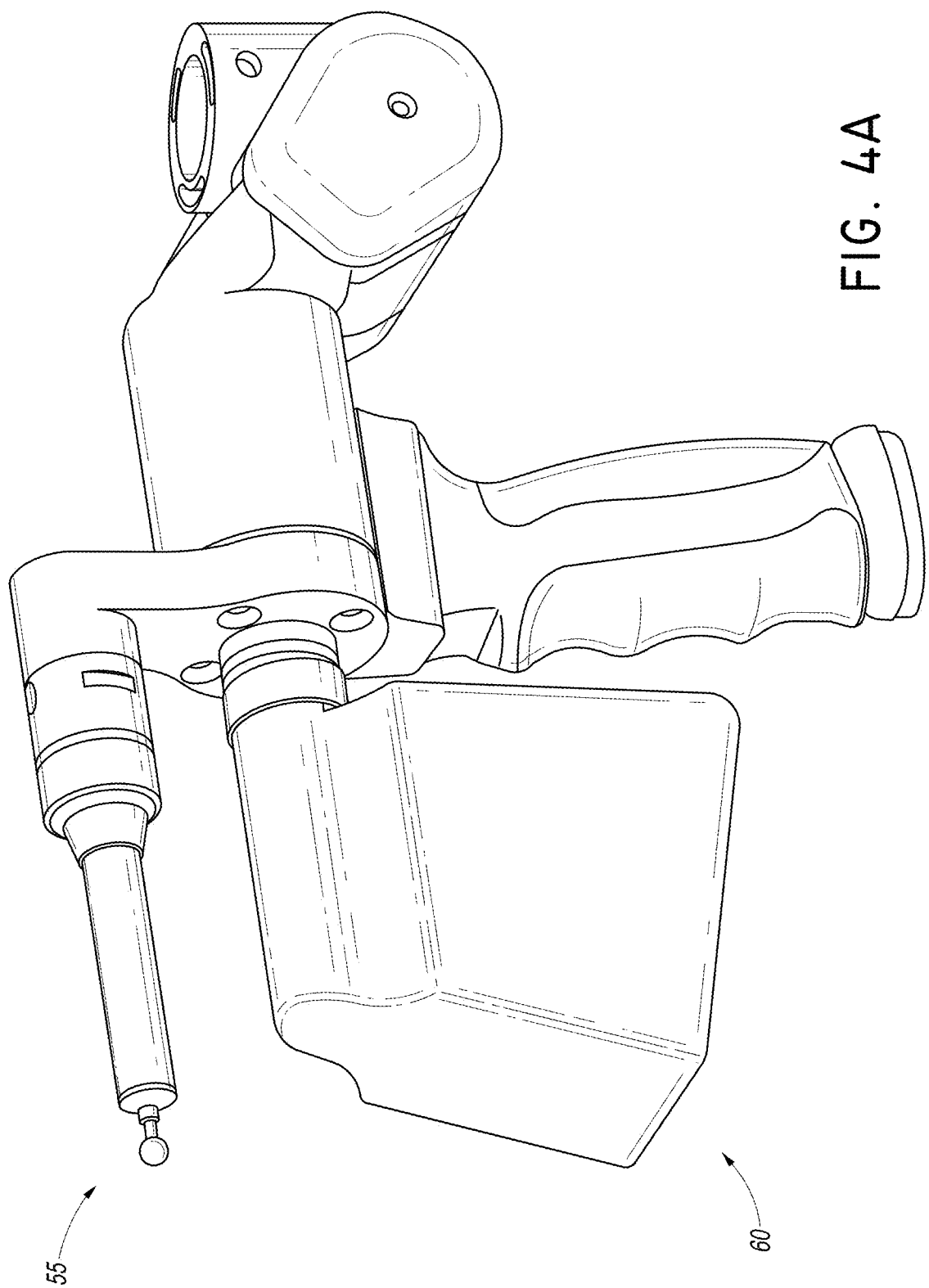
FIG. 4A depicts an alternative coordinate acquisition member.
Figure 4B:
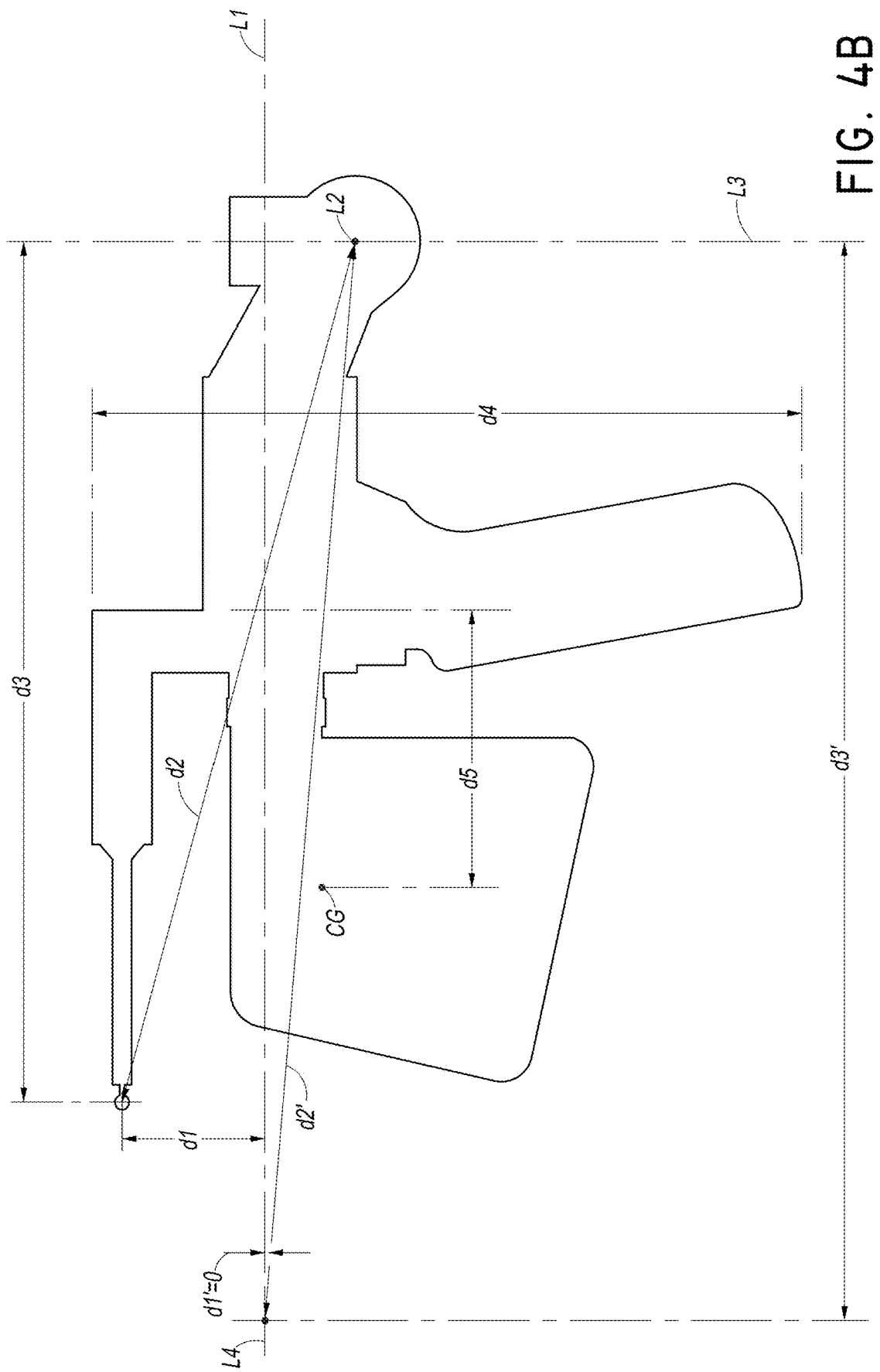
FIG. 4B depicts a side outline view of the coordinate acquisition member of FIG. 4A, indicating various dimensions.

As best depicted in FIG. 3B, the main body 90 can further include a mounting portion 91, a recess 92, and a data port 93, configured to interact with a laser coordinate detection device (depicted as a laser scanner) 60. The laser scanner 60, as best depicted in FIG. 3A, can include an upper housing 80, a laser 65, and a data port 101. As shown in FIG. 3, the laser scanner 60 can be configured to mount on the main body 90 as an auxiliary body (which can include different devices in other embodiments). The upper housing 80 can be shaped to match the mounting portion 91, and can accordingly be received by that portion. The recess 92 can be shaped to receive the laser 65 when the mounting portion 91 receives the upper housing 80. Upon these interactions, the data ports 93, 101 can interact to pass information between the main body 90 and the laser scanner 60 (and accordingly further along the PCMM arm 1 as described above). The laser coordinate detection device 60 can further include a base-plate 75. The base-plate 75 can include a port 85 configured to receive the contact sensitive member 55 when the laser scanner 60 mounts to the main body 90. Additionally, the base-plate 75 can include assembly holes 104 that can interact with assembly holes 94 on the main body 90, along with fasteners (not shown), to secure the main body 90 and laser scanner 60 together. It will be clear that a variety of screws and other fasteners can be used to attach the main body 90 and the laser scanner 60. For example, in some embodiments they can be attached by a snap-lock mechanism, allowing easy attachment and removal. Further, in some embodiments a repeatable kinematic mount can be used, where the laser scanner 60 can be removed and remounted to the main body 90 without tools. It can be remounted with a high level of repeatability through the use of a 3-point kinematic seat as is known in the industry.

Figure 2D:
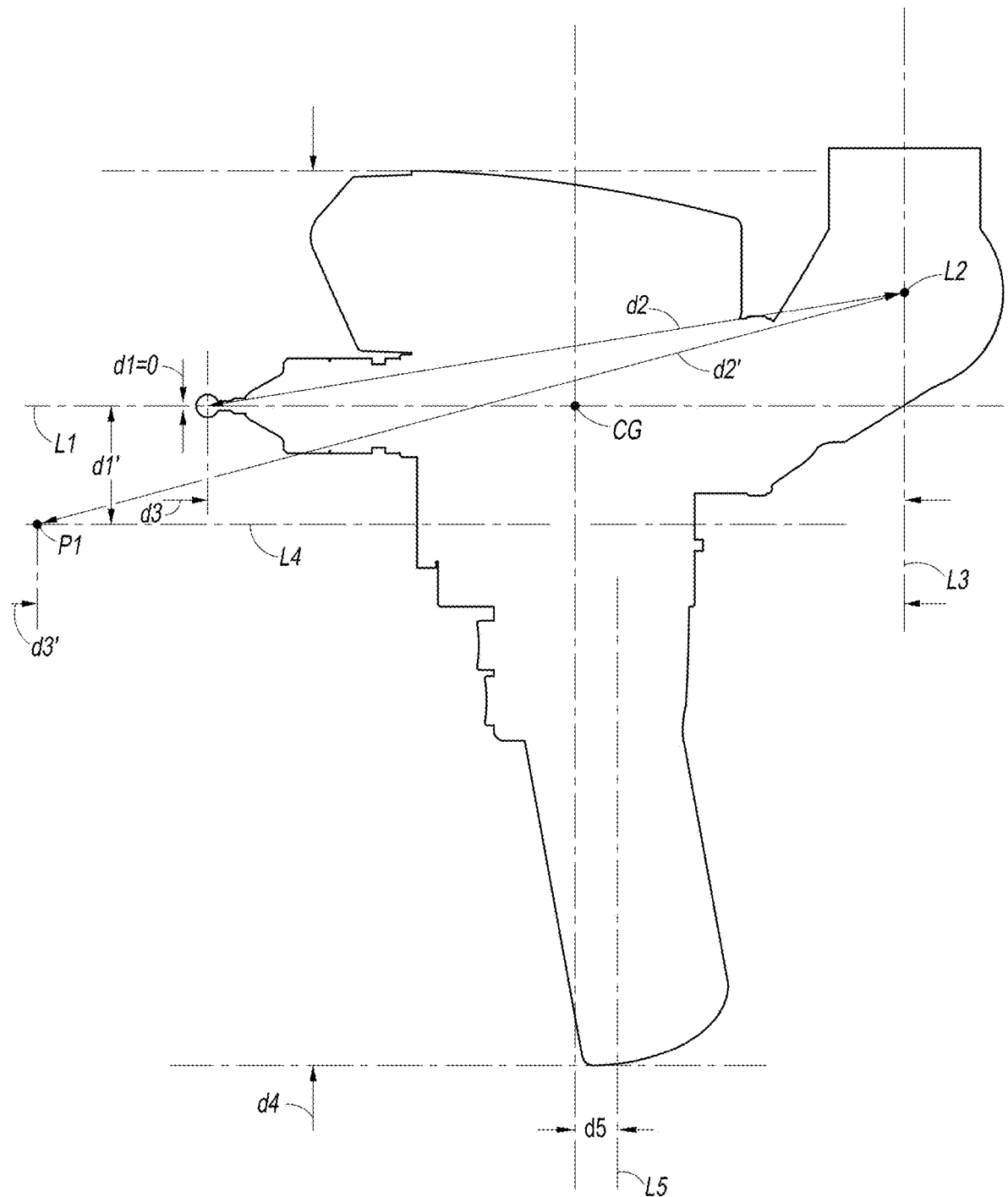
FIG. 2D is a side outline view of the coordinate acquisition member of FIG. 2, indicating various dimensions.

When the PCMM 1 is intended to provide accurate position data, the PCMM can be designed to minimize the errors at both the contact sensitive member 55 and at the non-contact coordinate detection device 60. The error of the coordinate acquisition member 50 can be reduced by minimizing the effect of the errors of the last three axes on both the contact sensitive member 55 and the non-contact coordinate detection device 60. The maximum error of the contact sensitive member 55 can be represented in the following equations as Ep, which is primarily a function of the errors of each of the last three axes (L1-L3) and the distances from the probe center to the axes. Likewise, the error of the non-contact coordinate detection device 60 can be represented as Es and is primarily a function of the errors of each of the last three axes (L1-L3) and the distances from the optical center point P1 to the axes.

$$Ep=(d1*e1)+(d2*e2)+(d3*e3)$$

$$Es=(d1'*e1)+(d2'*e2)+(d3'*e3)$$

Where e1, e2, and e3 represent the absolute value of the angular error at each of the three last axes of rotation at the articulation members 30, 31, and 32 respectively; and d1, d2, d3, d1', d2', and d3' represent the distance from the respective axes to either the probe center or the optical center point (or laser focus) P1. As will be explained in further detail to follow, the PCMM 1 can enhance the accuracy of the coordinate acquisition member 50 by supplying a superior geometry to reduce both errors Ep and Es while at the same time balancing the Center of Gravity (CG) of the coordinate acquisition member 50 over the handle 40 and reducing the overall height of the coordinate acquisition member 50 (d4) as shown in FIG. 2D.

When the laser scanner 60 mounts the main body 90, a variety of geometric properties can arise between coordinate acquisition elements. For example, as depicted the camera 70, the contact sensitive member 55, and the laser 65 can be directly integrated with the last axis L1. For example, as depicted the camera 70, contact sensitive member 55, and laser 65 can be generally collinear when viewing from the front (e.g. along axis L1), with the contact sensitive member 55 in the middle and aligned with the last axis L1 (i.e. d1=0). Further, as depicted the upper housing 80, contact sensitive member 55, and the laser 65 can be arranged generally parallel to the last axis L1. However, the camera 70 can be oriented at an angle relative to the last axis L1 so as to view the laser plane.

Such arrangements can be advantageous in a number of ways. For example, in this arrangement the angular position of the elements about L1 can be approximately equal (with the exception of a 180 degree offset when on different sides of the last axis L1), simplifying data processing requirements. As another example, providing these elements aligned with the last axis L1 can facilitate counterbalancing the weight of these elements about the last axis, reducing error from possible deflection and easing movement about the axis. As depicted in FIG. 2D, the center of gravity (CG) of the coordinate acquisition member 50 can lie along L1. Even further, the error associated with the angle of rotation about the last axis L1 is amplified by the perpendicular distance from the axis to the center of the laser plane emitted by the laser 65 (depicted as d1' in FIG. 2D). In this orientation, the perpendicular distance is minimized. In some embodiments, the perpendicular distance from the center of the laser plane to the last axis can be no greater than 35 mm. Notably, in other embodiments it may be desirable to move the laser 65 even closer to the last axis L1, such as by aligning directly therewith. However, the accuracy of the contact sensitive member 55 is also partially dependent on its proximity to the last axis L1; and, as described below, some other advantages can arise from separating the laser 65 from the camera 70.

As further depicted, when the laser scanner 60 mounts the main body 90, the contact sensitive member 55 and the laser coordinate detection device 60 can form a compact design. For example, the laser 65 and/or the camera 70 can extend past the one or both of the bearings 150, 151. As depicted, the laser 65 extends, at least partially, beyond the bearings 151 but not the bearings 150; and the camera 70 extends beyond both bearings. In other embodiments, these elements can extend to the bearings, and not pass them. Generally, causing these elements to overlap reduces the necessary length of the coordinate acquisition member 50.

In some embodiments such compact designs can allow the coordinate acquisition elements to be closer to the second to last axis L2, as well as the last axis L1. Accordingly, the distance between the second to last axis L2 and the points of measurement (e.g. at the tip of the contact sensitive member 55 and/or at the focus P1 of the camera 70) can be reduced. As the error in the angular position of the coordinate acquisition member 50 along the second to last axis L2 is amplified by these distances, this also reduces the error of the PCMM 1 in other ways. For example, the compact design can also reduce error related to the distance from the focus P1 to the third to last axis L3, represented as d3'. Additionally, providing the elements of the coordinate acquisition member 50 closer to the second and third to last axes L2, L3 can reduce deflection, reducing error even further. In some embodiments the contact sensitive member 55 can be within 185 mm of the second and/or third to last axis L2, L3, and the focus P1 of the camera 70 can be within 285 mm of the third to last axis. As best depicted in FIG. 2D, the compact design can further bring a center of gravity (CG) of the coordinate acquisition member 50 closer to a central axis L5 of the handle 40. In some embodiments, the distance between the center of gravity and the central axis of the handle 40 can be no greater than 20 mm. As yet another advantage to the compact design, the vertical height d4 of the coordinate acquisition member 50 can be reduced, allowing measurement in tighter spots. In some embodiments the height can be no greater than 260 mm. Notably, as the coordinate acquisition member 50 in the depicted embodiment rotates about the last axis L1, the height d4 can also represent a maximum length of the coordinate acquisition member 50.

In some embodiments, the laser scanner 60 can include additional advantages. For example, the laser scanner 60 can isolate the laser 65 from heat generated by the other parts of the PCMM arm 1. For example, as depicted in FIG. 3, a base plate 75 holds the laser 65 at one end and the camera 70 at the other, separated by the contact sensitive member 55. In some embodiments the base plate 75 can include a material with a low coefficient of thermal expansion such as Invar, Ceramic, or Carbon Fiber. Reducing thermal expansion can reduce changes in the position and orientation of the laser 65 and/or the camera 70, which could create problems such as introducing additional error into the measurements. Similarly, the base plate 75 can also include a material with a low thermal conductivity, hindering transmission of heat, for example, from the camera 70 to the laser 65 or PCMM 1.

Figure 2E:
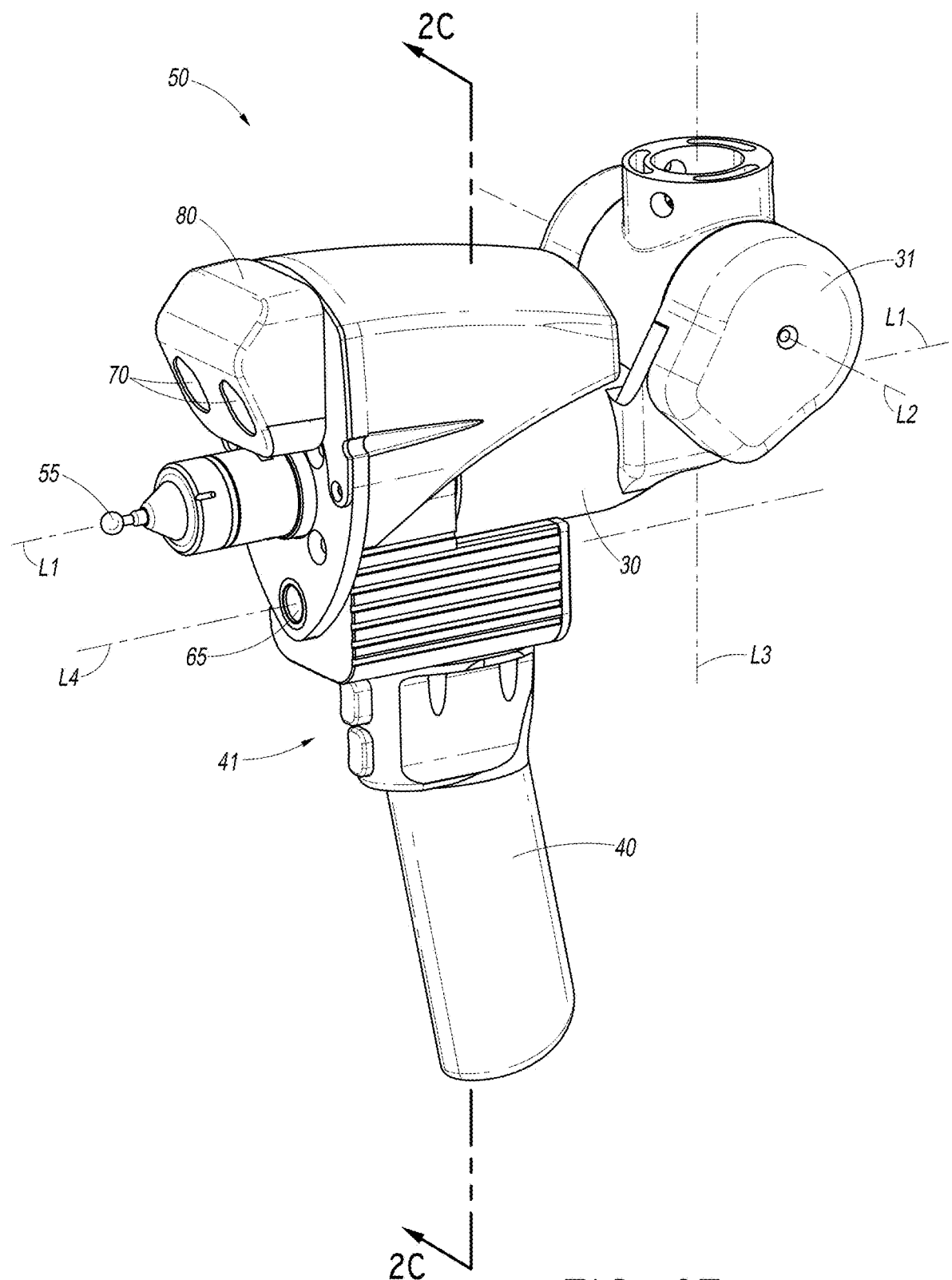
FIG. 2E is a perspective view of another coordinate acquisition member of the CMM arm of FIG. 1.

As depicted, the camera 70 can be held in an upper housing 80 of the laser scanner 60, and in some embodiments the upper housing can include multiple cameras as shown in FIG. 2E. The upper housing 80 can include materials such as aluminum or plastic. Additionally, the upper housing 80 can protect the camera 70 from atmospheric contaminants such as dust, liquids, ambient light, etc. Similarly, the laser 65 can be protected by the recess 92 of the main body 90. In some embodiments, the recess 92 can include a thermal isolation disc or plate with a low coefficient of thermal expansion and/or conductivity, protecting the laser from external heat and substantially preserving its alignment.

In many embodiments, the electronics 160 associated with the laser coordinate detection device 60 can create a substantial amount of heat. As discussed above, various components can be protected from this heat with materials having low coefficients of thermal expansion and conductivity for example. As depicted, the electronics 160 can be positioned in the upper housing 80 of the laser scanner 60.

However, in other embodiments the electronics 160 can be positioned further from the sensors 55, 60, such as in a completely separate housing. For example, in some embodiments the electronics 160 can be held by the laser scanner 60 in a separate housing, also attached to the base plate 75. In other embodiments, the electronics 160 can be located further down the PCMM 1, such as in a rigid transfer member 20 or in the base 10. Moving the electronics 160 further down the PCMM 1 can reduce weight at the end of the arm, minimizing deflection of the arm. Similarly, in some embodiments the electronics 160 can be completely outside the PCMM 1, such as in a separate computer. Data from the sensors 55, 70 can be transmitted through the PCMM 1 on an internal cable in the arm, wirelessly, or by other data transmission methods. In some embodiments, data ports 93, 101 can include spring loaded pins such that no cables are externally exposed.

As another advantage of the depicted embodiment, the depicted layout of the system can use a smaller volume. The laser coordinate detection device 60 can sometimes operate on a theory of triangulation. Accordingly, it may be desirable to leave some distance between the laser 65 and the camera 70. The depicted embodiment advantageously places the contact sensitive member 55 within this space, reducing the volume of the coordinate acquisition member 50. Additionally, the last axis L1 also passes through this space, balancing the system and reducing the coordinate acquisition member's 50 rotational volume. In this configuration, the combination of axis and laser scanner can further be uniquely optimized to reduce weight, as the more compact design reduces deflection, and accordingly reduces the need for heavy-load bearing materials.

To further illustrate the advantages of the above-described embodiments, FIGS. 4-7 depict modified configurations in which the laser scanner and or image sensor is positioned in different locations. In FIGS. 4A, 4B, the scanner is centered on the last axis, displacing the contact sensitive member, and is further forward. Accordingly, d1' has been reduced to zero, but d1 has increased, essentially transferring error from the non-contact measuring device to the contact measuring device. Additionally, in this embodiment, both the measuring devices 55, 60 are further from the second and third to last axes L2, L3, increasing d2, d2', d3, and d3'. Even further, as the center of gravity CG is displaced forward, away from the handle's axis L5, the coordinate acquisition member can be more difficult to maneuver as d5 is larger, and can further suffer greater deflection.

Figure 5A:
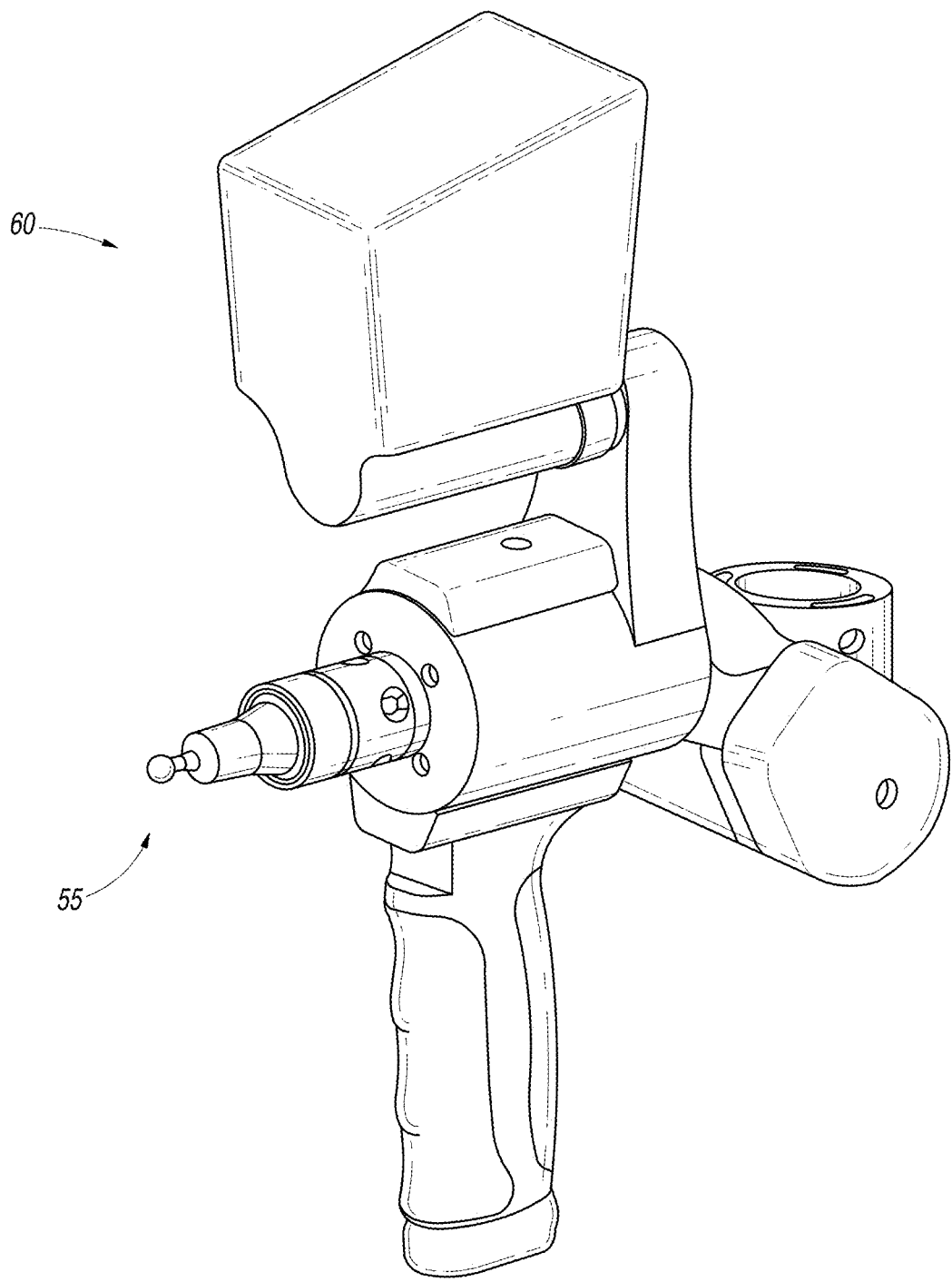
FIG. 5A depicts an alternative coordinate acquisition member.
Figure 5B:
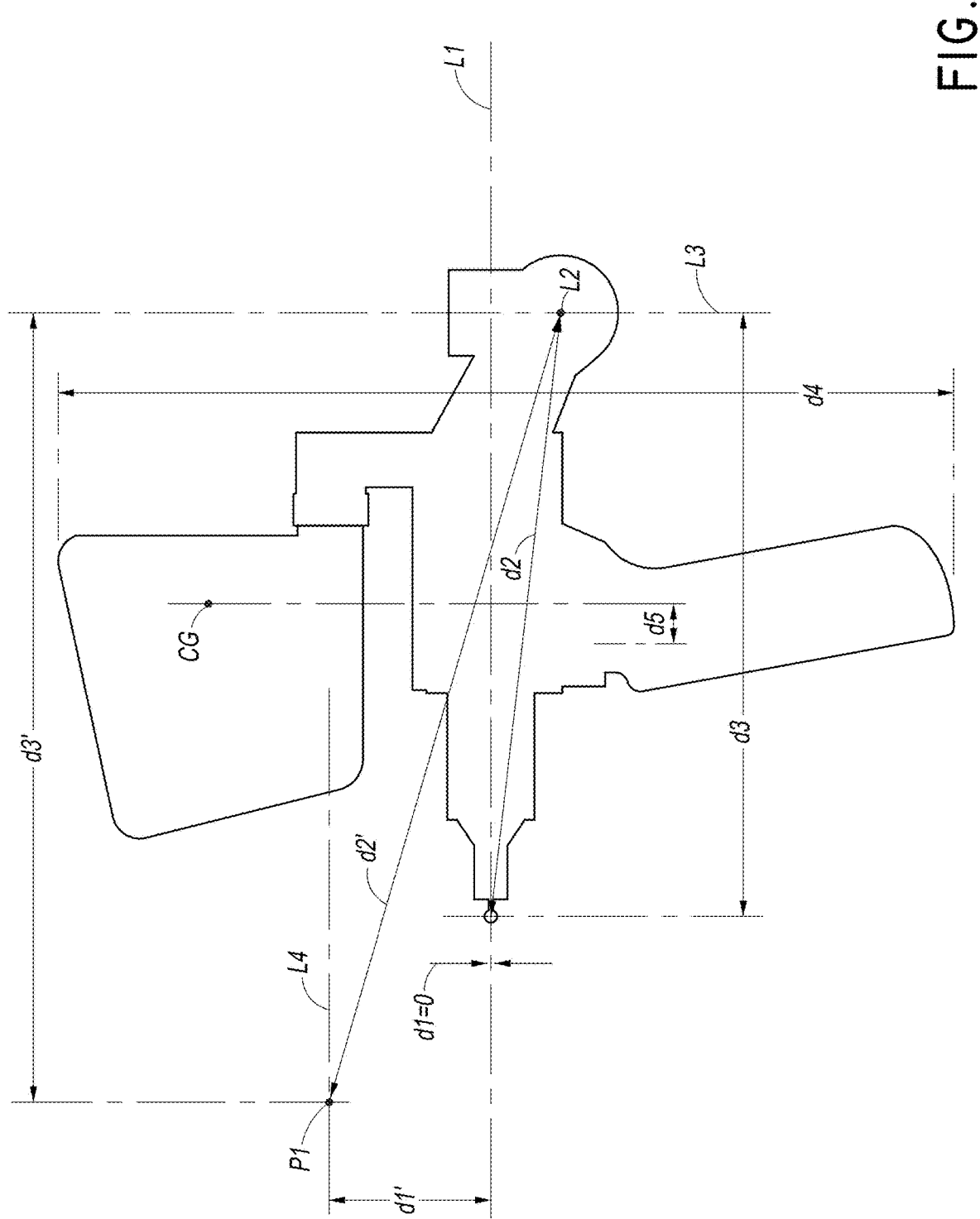
FIG. 5B depicts a side outline view of the coordinate acquisition member of FIG. 5A, indicating various dimensions.

In FIGS. 5A, 5B, the scanner is above the last axis. Accordingly, there is a large distance between the last axis and the laser area (d1') as well as a larger maximum length d4 of the coordinate acquisition member 50. Further, displacing the center of gravity CG from the last axis L1 can hinder the maneuverability of the coordinate acquisition member 50. Additionally, the scanner is slightly more forward, increasing the distance from the focus P1 to the second and third to last axes (d3').

Figure 6A:
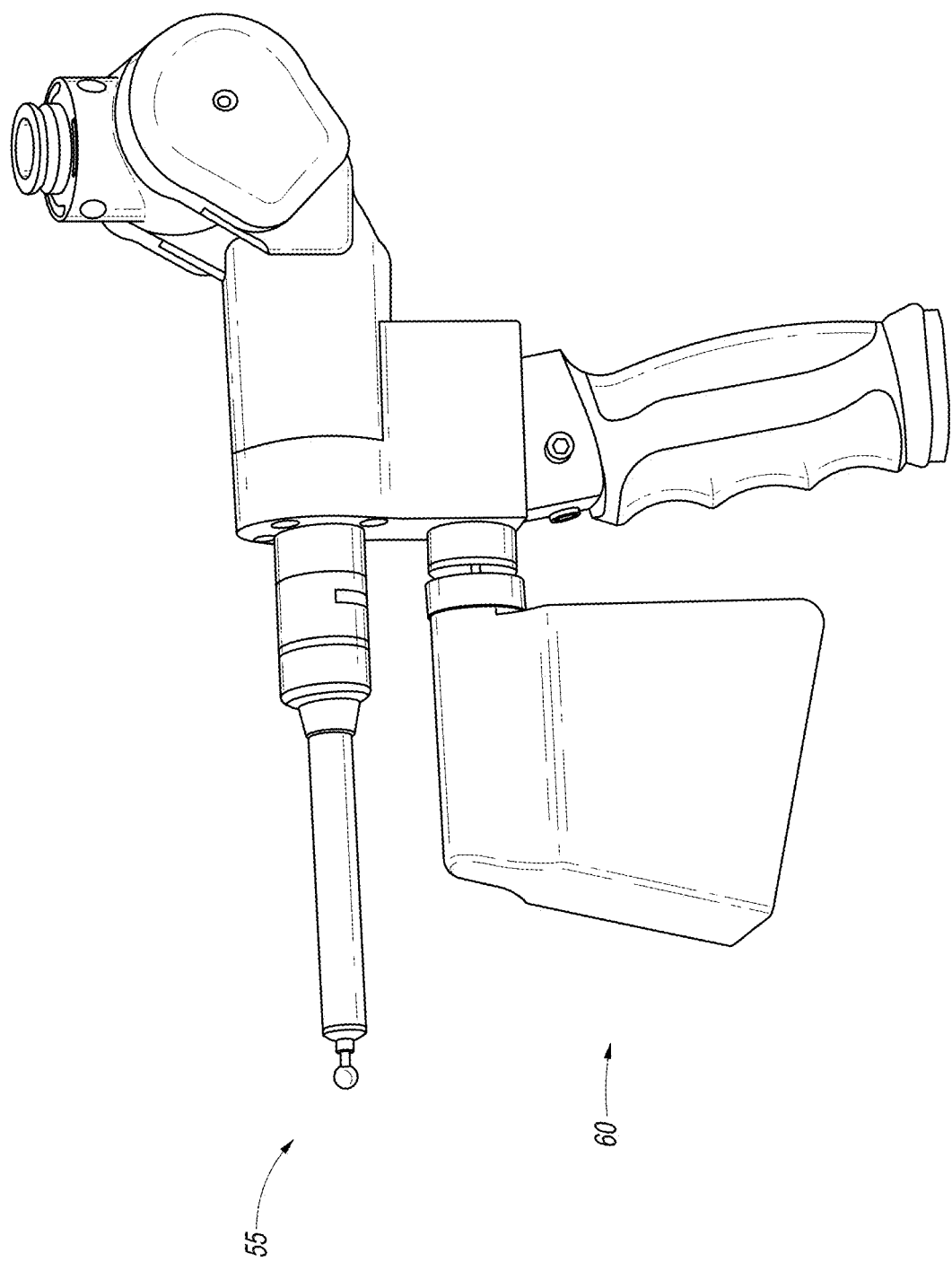
FIG. 6A depicts an alternative coordinate acquisition member.
Figure 6B:
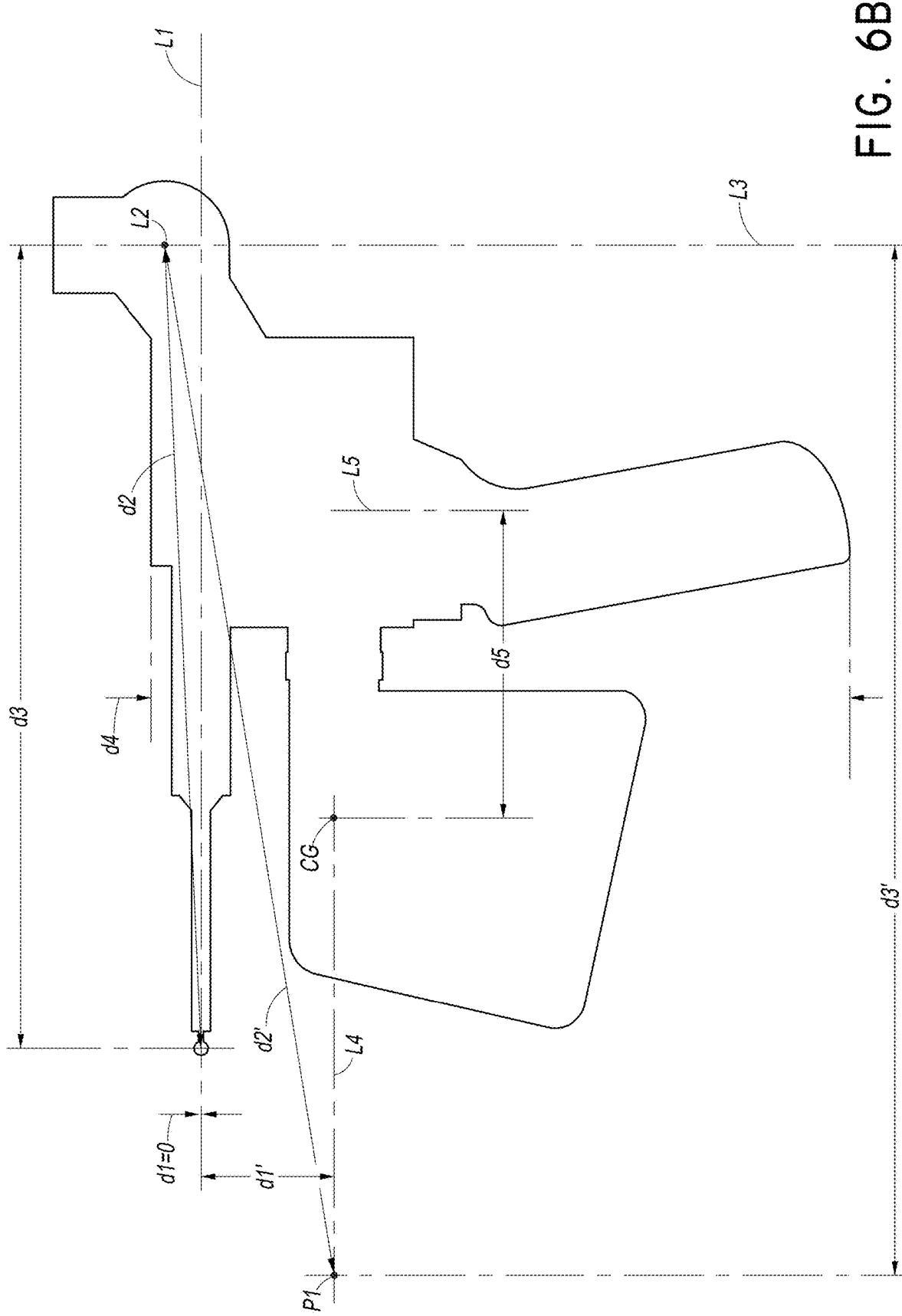
FIG. 6B depicts a side outline view of the coordinate acquisition member of FIG. 6A, indicating various dimensions.

In FIGS. 6A, 6B, the scanner is further forward and below the last axis. Accordingly, there is a large distance between the last axis and the laser area (d1') and a similarly large distance between the second and third to last axes and the scanner's focus P1 (d3'). Further, the center of gravity CG is displaced from the last axis L1 and the handle (d5), hindering the maneuverability of the coordinate acquisition member 50.

Figure 7A:
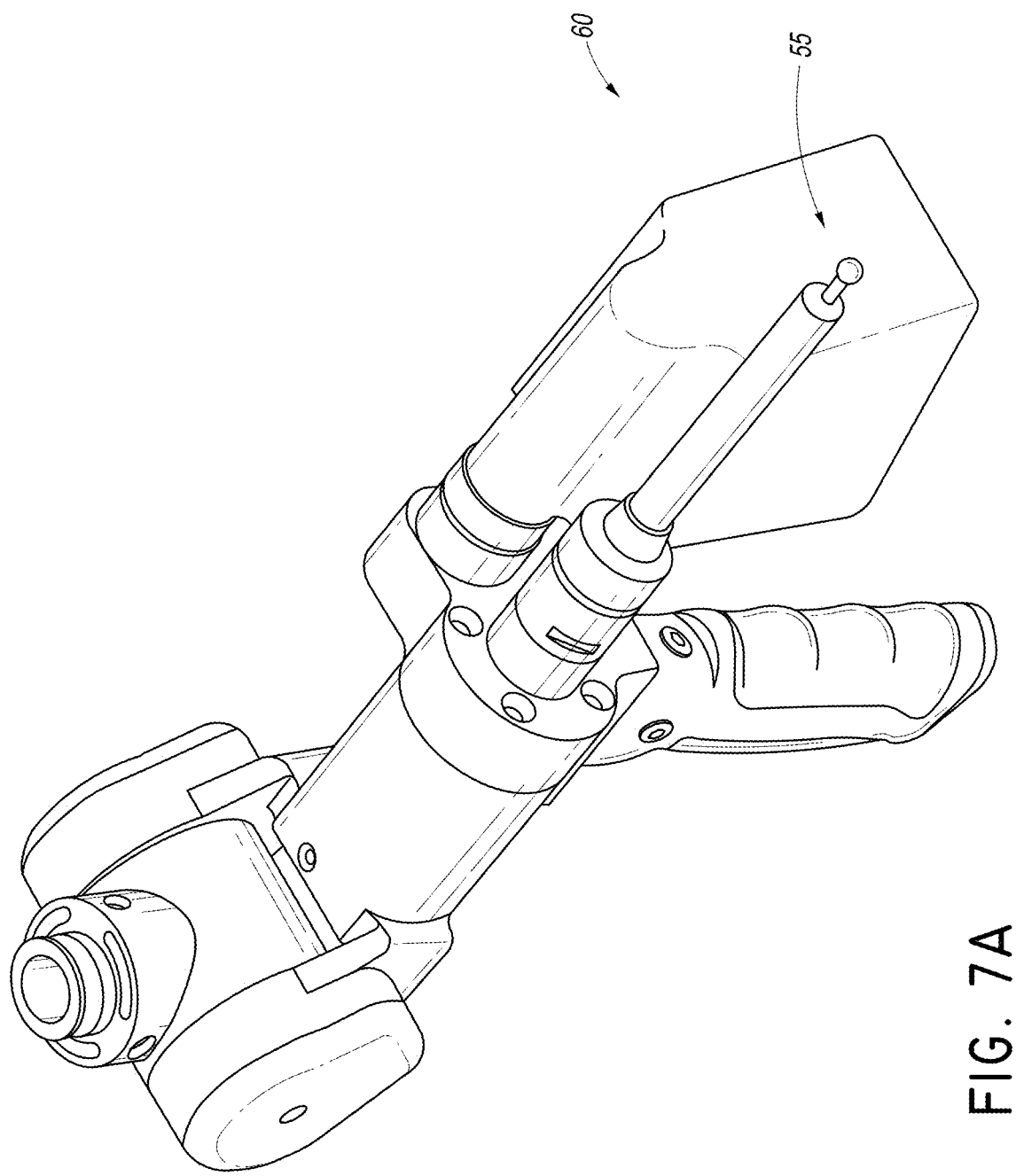
FIG. 7A depicts an alternative coordinate acquisition member.
Figure 7B:
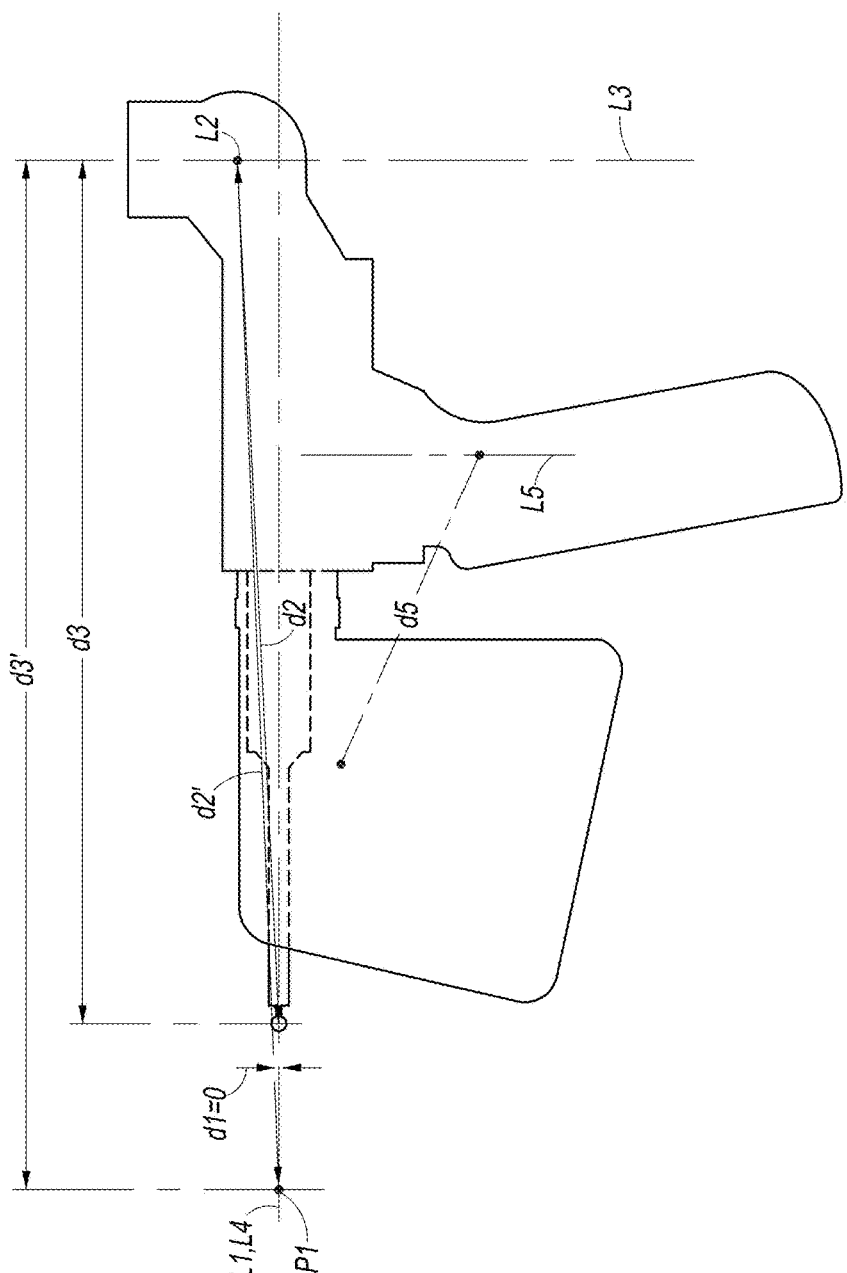
FIG. 7B depicts a side outline view of the coordinate acquisition member of FIG. 7A, indicating various dimensions.
Figure 7C:
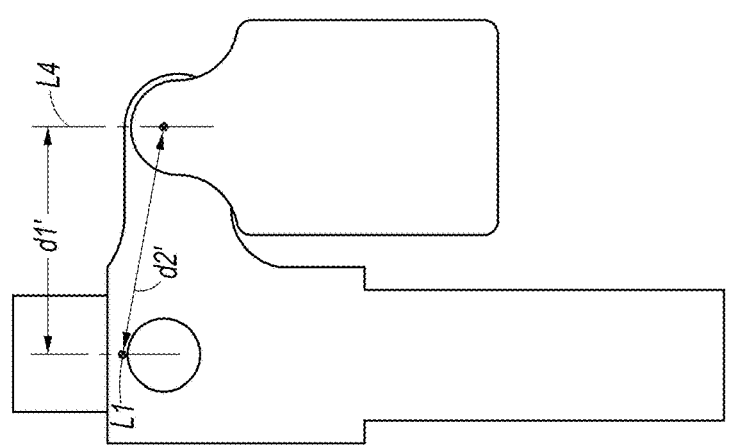
FIG. 7C depicts a front outline view of the coordinate acquisition member of FIG. 7A, indicating various dimensions.

In FIG. 7A, 7B, 7C, with the scanner off to the side of the last axis, there is a large distance between the last axis and the laser area (d1'), and a large distance between the second and third to last axes and the scanner's focus P1 (d3'). Further, displacing the center of gravity CG from the last axis L1 and the handle's axis L5 can hinder the maneuverability of the coordinate acquisition member 50.

Figure 8:
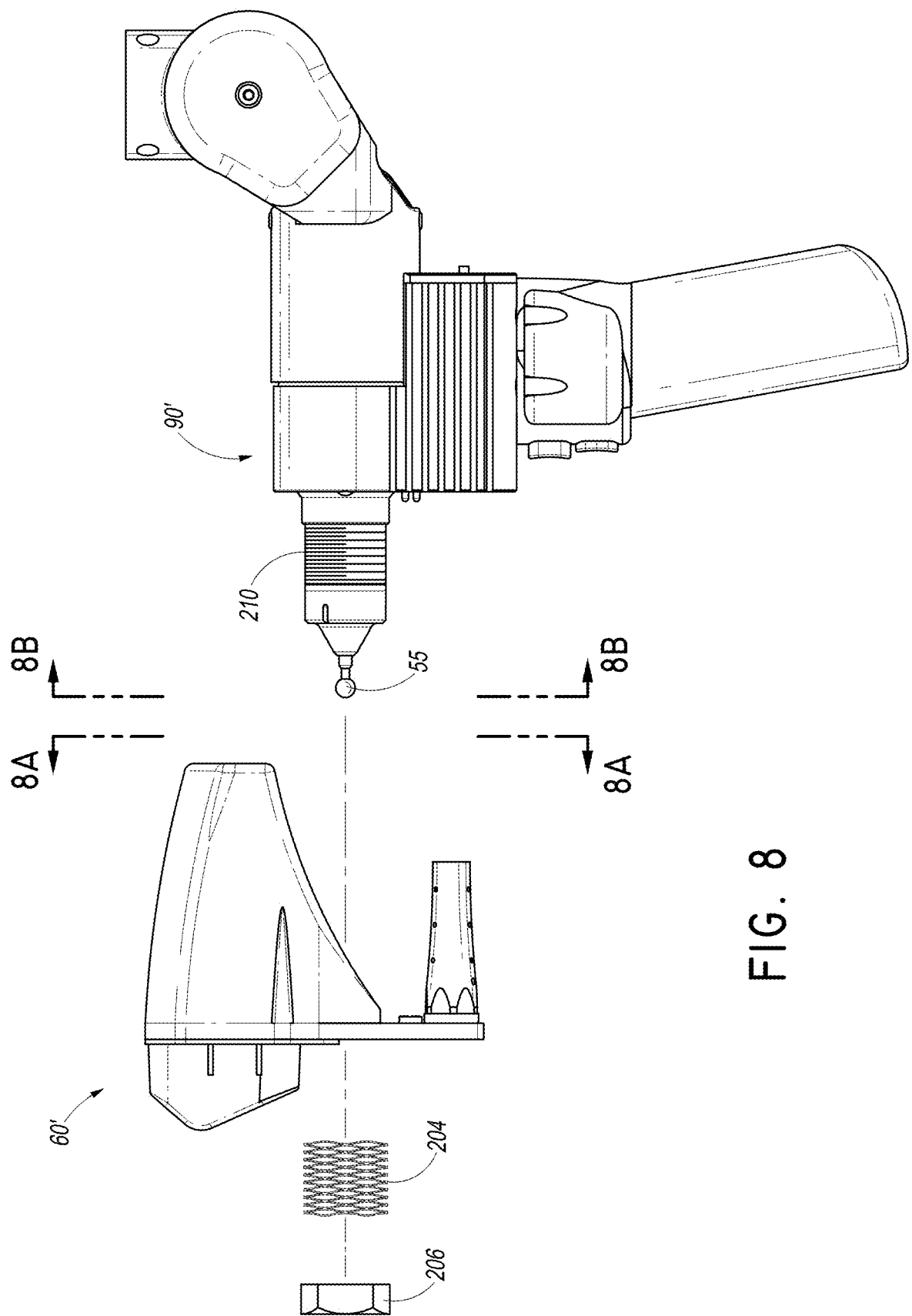
FIG. 8 is an exploded view of another embodiment of a coordinate acquisition member.
Figure 10:
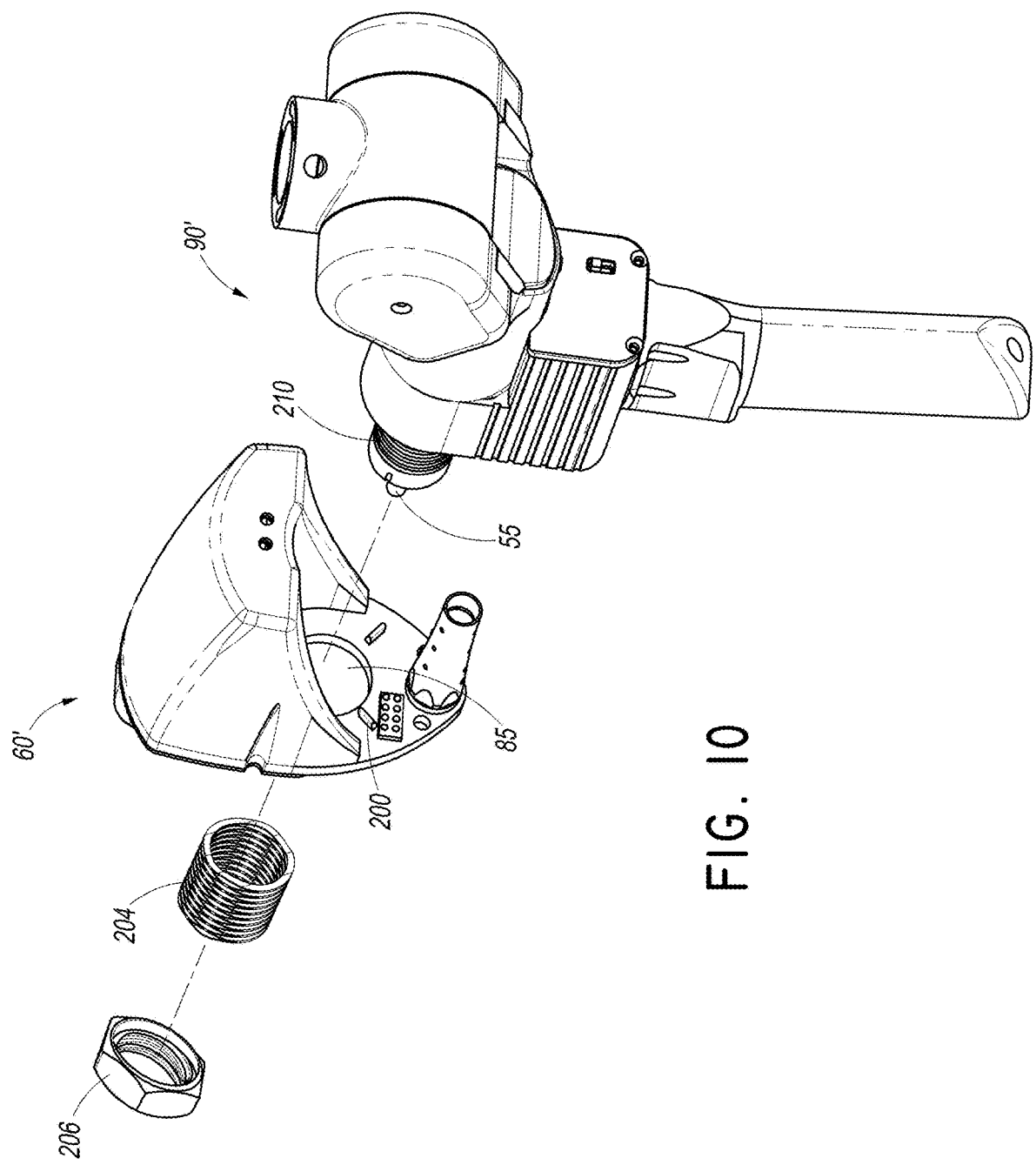
FIG. 10 is a rear exploded perspective view of the coordinate acquisition member of FIG. 8.

FIGS. 8-10 depict an alternative mechanism for mounting a laser scanner 60' to a main body 90'. As shown, the laser scanner 60' can comprise 3 pins 200 equally radially spaced about the port 85. These pins 200 can interact with 3 similarly sized slots 202 formed on the main body 90', and equally radially spaced about the contact sensitive member 55'. Thus, when the laser scanner 60' is applied to the main body 90' such that the contact sensitive member 55' passes through the port 85, the pins 200 can enter the slots 202. The pins 200 and slots 202 can be precisely-shaped to match each other, such that when the laser scanner 60' and the main body 90' are urged against each other the pin-slot combination can form a kinematic mounting that holds their relative angular position constant.

In some embodiments, the mounting mechanism can be varied. For example, in some embodiments the pins 200 and slots 202 can be spaced differently about the port 85 and/or the contact sensitive member 55'. In further embodiments, additional pins and slots can be included. In other embodiments each of the pins 200 can interact with 2 spheres on the main body 90' instead of slots 202. In additional embodiments, spherical balls can insert into tetrahedral holes. Further, combinations of various interacting shapes can be used in other embodiments to form a kinematic mounting.

As depicted, the scanner 60' can be urged against the main body 90' by a wave spring 204 in combination with a nut 206. The nut 206 can mount the contact sensitive member 55' after the scanner 60' and the wave spring 204. As depicted, a cylindrical extension of the main body 90' that receives the contact sensitive member 55' can include external threading 210 that threadably receive the nut 206. Rotation of the nut 206 about the threading 210 can then urge the wave spring 204 against the scanner 60' (and more particularly in this embodiment the base plate 75 of the scanner 60') into the main body 90'.

Variations are also possible. For example, in some embodiments a standard coil spring can be used instead of a wave spring, such as where there is ample axial space for a larger spring. Further, in some embodiments the wave spring can be a wave washer, while in other embodiments the wave spring can have multiple coils. Further structures can also be used to mechanically isolate the scanner 60' from the main body 90' of the CMM arm 1, such as a padding member between the scanner 60' and the nut 206 that can resiliently deform. Such mechanical isolation of the scanner 60' from the main body 90', the CMM arm 1, and the contact sensitive member 55' can reduce deflections in one or more of those components from causing similar deflections on the scanner 60'. Thus, for example, if the contact sensitive member 55' contacts a measured item causing it and the main body 90' to deflect, the mechanical isolation will reduce any coinciding deflection in the scanner 60'. A further advantage of the wave spring or of a compressible padded interface member is that it can thermally isolate the scanner from the arm and vice versa by separating the scanner from the bolt. Even further, in some embodiments a wave spring or a compressible padded interface member can be added on the other side of the scanner 60', between the scanner and the main body 90', more fully isolating the scanner from the main body mechanically and thermally.

As another variation, in some embodiments the width of a cylindrical portion of the main body/contact sensitive member can be graded, reducing the probability of interference between the laser scanner 60' and the threaded portion 210. Even further, in some embodiments additional components can be included on the cylindrical portion such as a washer or the like. It will also be noted that in some embodiments at least a portion of the extension can have a non-cylindrical shape. Even further, in some embodiments the external threading 210 can be disposed on the contact sensitive member 55' (or another form of probe in a similar position), potentially providing more space for the wave spring 204.

Figure 16B:
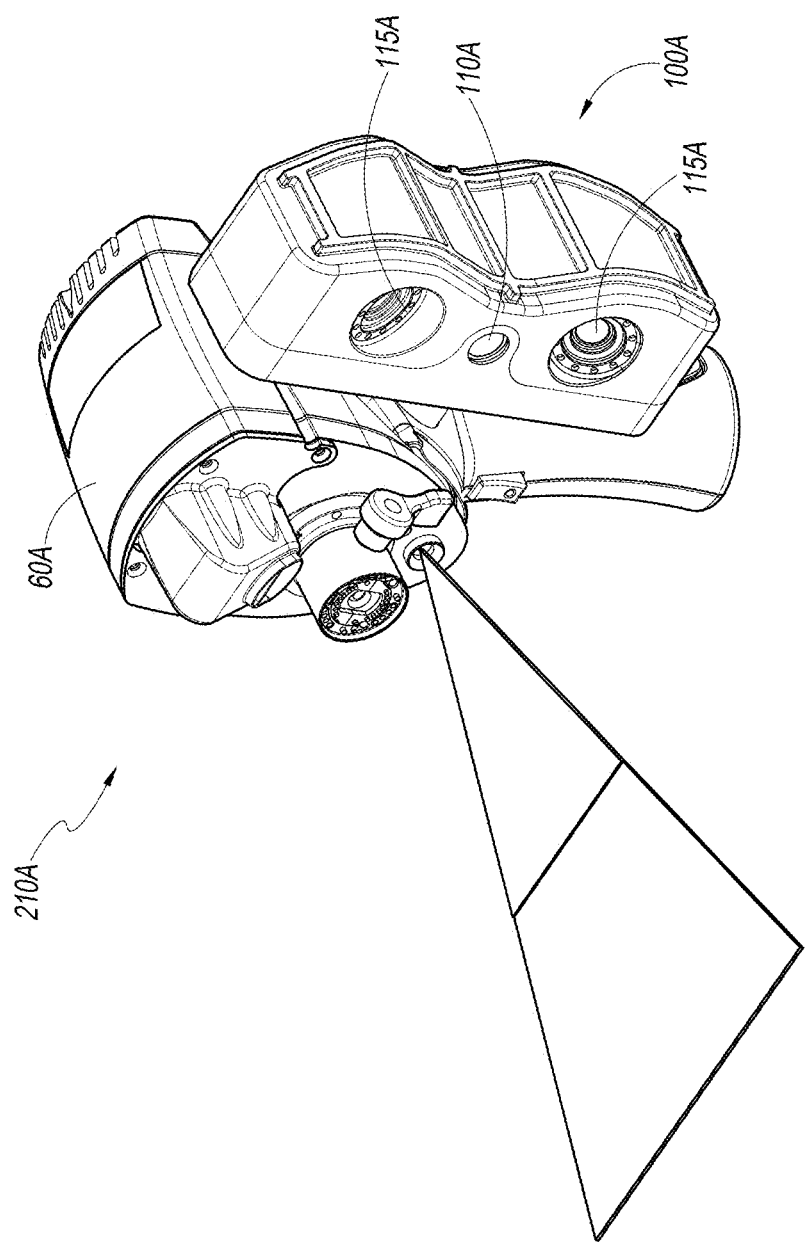
FIG. 16B is a perspective view of the portable measuring unit of FIG. 16A.
Figure 16C:
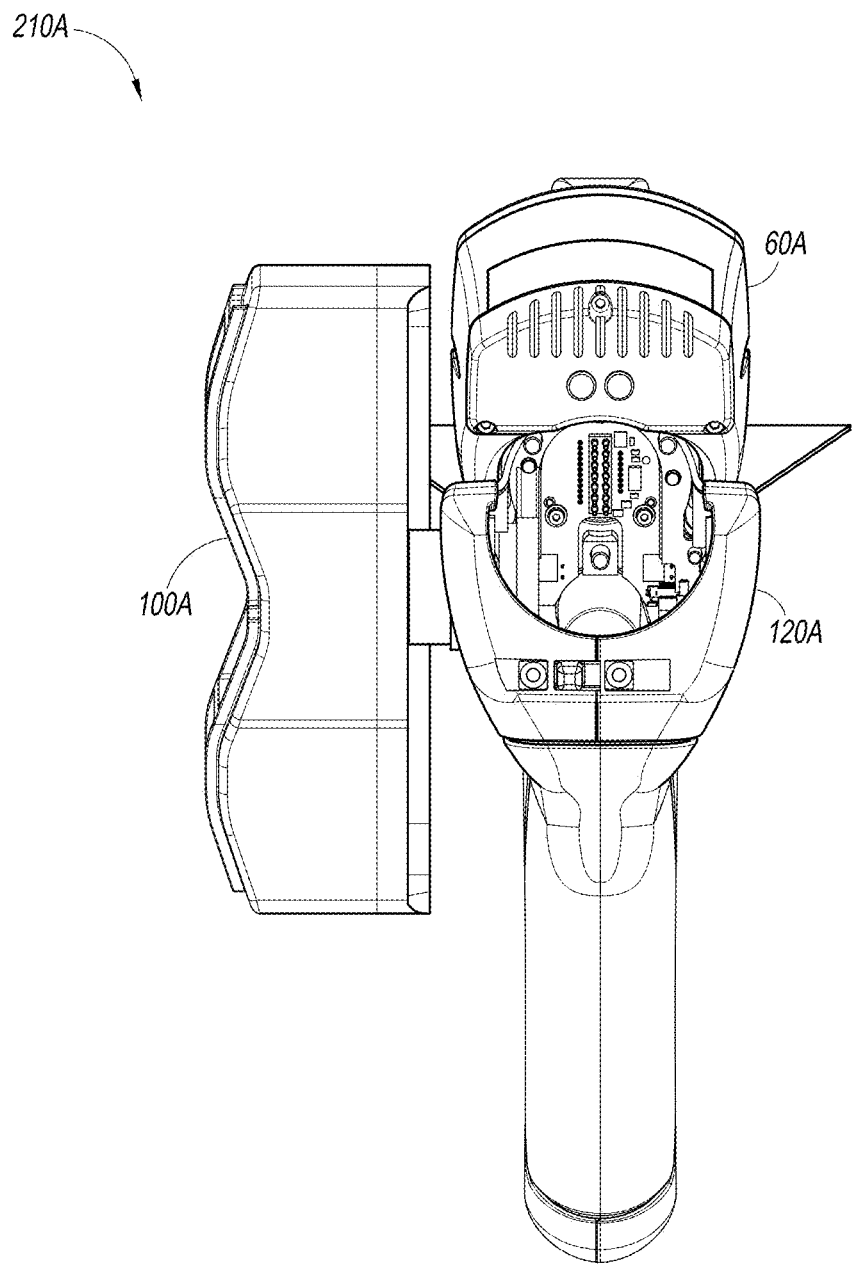
FIG. 16C is a rear view of the portable measuring unit of FIG. 16A.
Figure 16E:
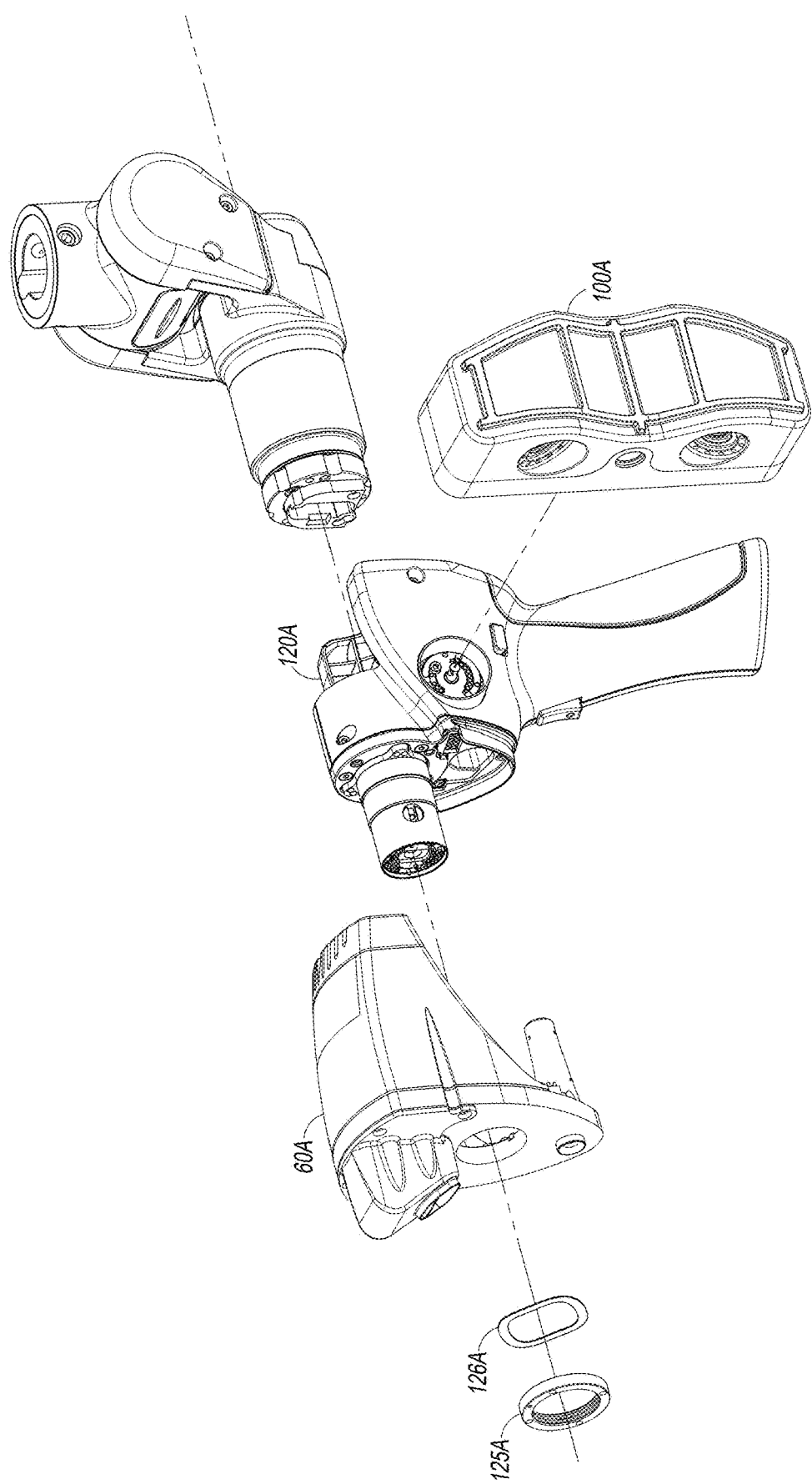
FIG. 16E is an exploded view of the portable measuring unit of FIG. 16A.
Figure 16F:
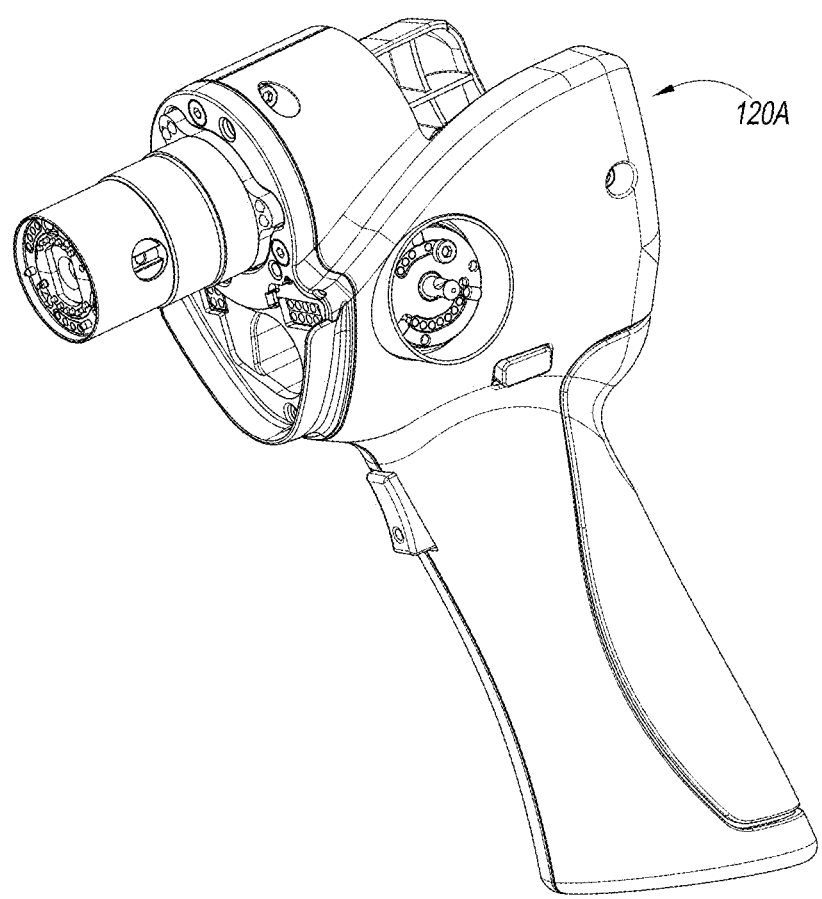
FIG. 16F is a perspective view of a main body of the portable measuring unit of FIG. 16A.
Figure 16G:
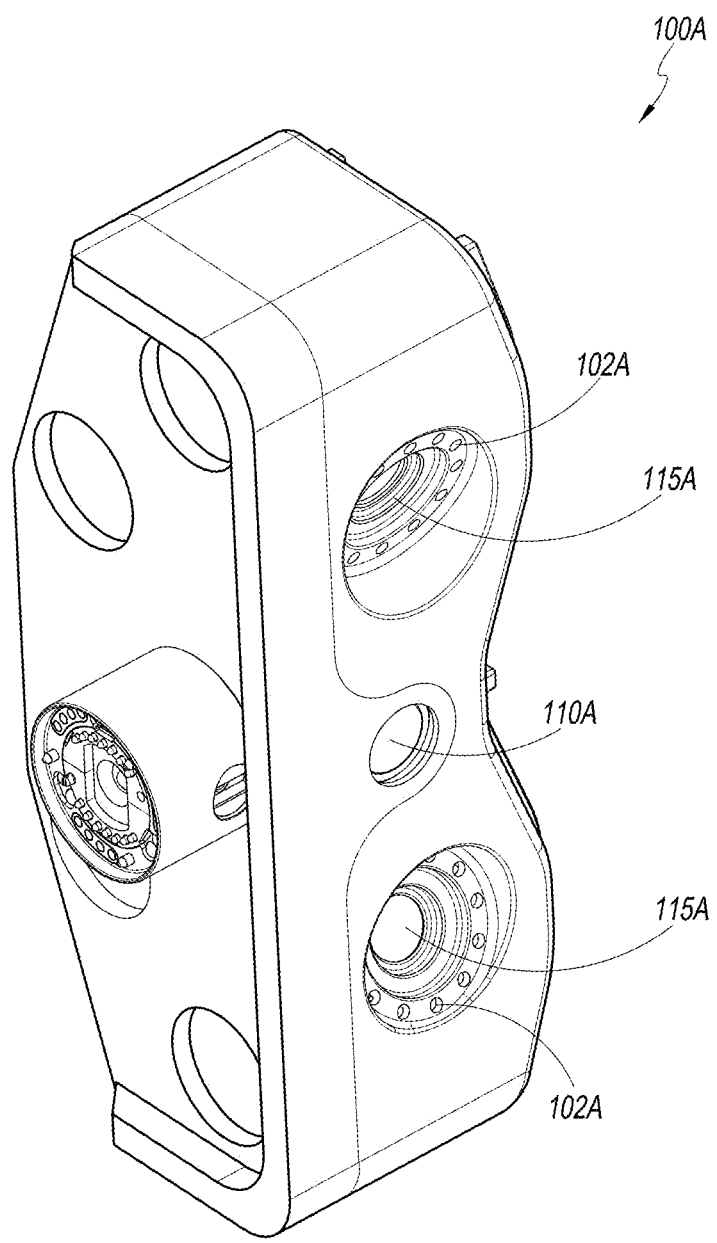
FIG. 16G is a perspective view of an area scanner configured to attach to the main body of FIG. 16F.
Figure 16H:
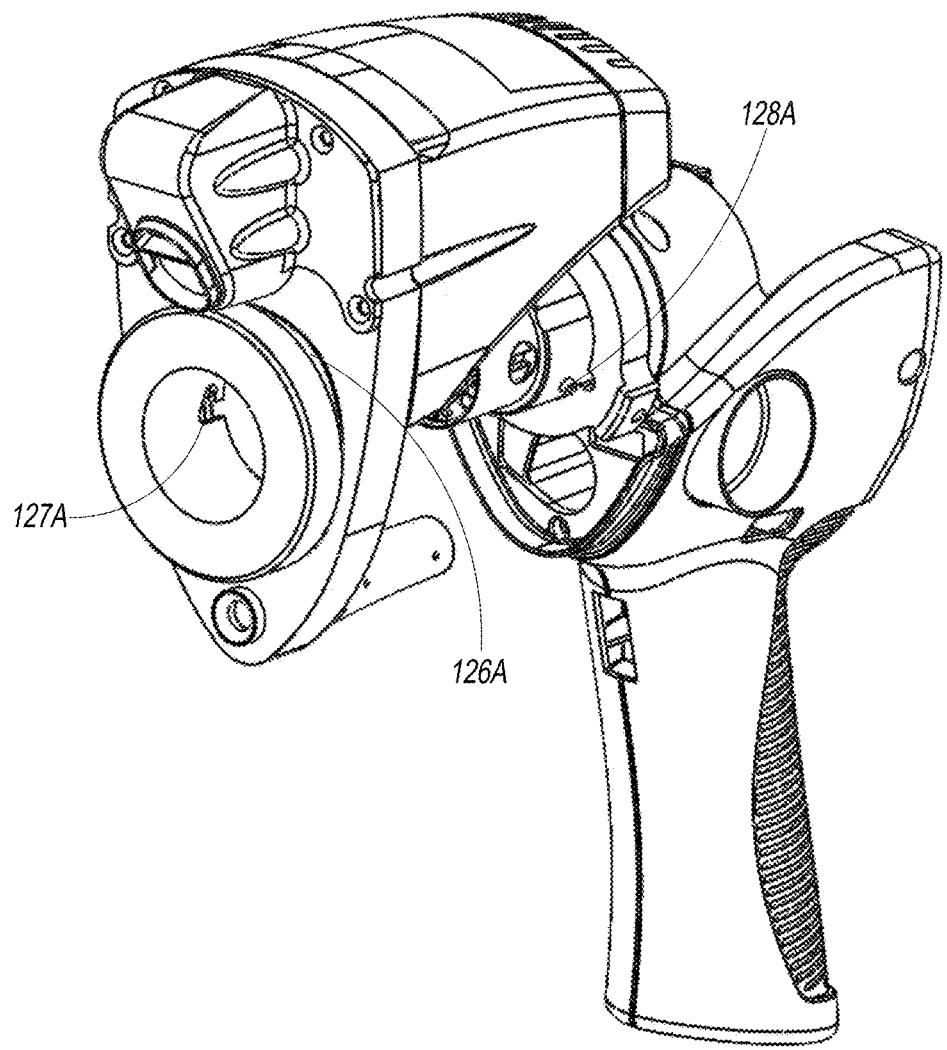
FIG. 16H is a perspective exploded view of portions of the portable measuring unit of FIG. 16A, indicating certain locking features.

In further embodiments, a bayonet connector can be used to attach the contact sensitive member 55' or the scanner 60' to the main body 90', as shown in FIG. 16H. In such embodiments, the bayonet connector can include, for example, a male portion 128A with a radial protrusion and a female receiving portion 127A with a hooked slot. The male portion 128A can enter the female portion 127A and enter the hooked portion to substantially lock the connection. A spring 126A, such as those discussed herein, can hold the male portion within the hooked portion. In another embodiment the male portion 128A with radial protrusions can interact with the female receiving portion 127A that has mating radial protrusions such as to form an axial lock when one is rotated relative to the other. In some embodiments this rotation could be between 10 and 30 degrees. In some embodiments the mating of the male and female portions 127A, 128A forms a repeatable kinematic mount. In another embodiment the bayonet connector can be used to apply axial force to the scanner which causes kinematic registration into slot and pin nests (or other shapes for kinematic mounts, as described above).

Even further, in some embodiments the contact sensitive member 55' can also be mounted with a wave spring or another structure (as discussed above) mechanically isolating it from the CMM arm 1. Thus, in a similar manner, a deflection of the contact sensitive member 55' can be prevented from causing similar deflections on the CMM arm 1.

Advantageously, in some embodiments the CMM arm 1 can be assembled in stages. For example, the contact sensitive member 55' can be mounted to the CMM arm 1, in some embodiments with a wave spring between it and the arm. Next, the scanner 60' can be mounted to the CMM arm 1, over the contact sensitive member 55'. In some embodiments, this mounting can include a kinematic mount setting a rotational position of the scanner 60' on the arm 1 (e.g. on an articulating member 30 or on the contact sensitive member 55'). Notably, in some embodiments the scanner 60' can still rotate relative to the contact sensitive member 55' and some components of the arm 1, as discussed above in relation to bearings 150, 151 in FIG. 2C.

After the scanner 60' has been mounted, a wave spring 204 can be mounted in a similar manner. A nut 206 can then be threadably mounted onto the CMM arm 1, over the contact sensitive member 55'. As the nut 206 advances onto the CMM arm 1, it can urge the wave spring 204 onto the laser scanner 60', firming its position on the kinematic mount. In some embodiments, the nut 206 can be advanced using a torque wrench to prevent an excessive tightening that might cause a deflection on the scanner 60'.

In further embodiments, a multi-mode coordinate measuring machine can be configured to take measurements in a plurality of modes with unique equipment and functionality in each mode. For example, the multi-mode coordinate measuring machine can be a CMM arm 1A, as depicted in FIGS. 11-17. As shown, the CMM arm 1A can be similar to the CMM arms described herein and in U.S. Pat. No. 8,112,896 and U.S. patent application Ser. No. 14/133,365, each of which incorporated by reference in their entireties. Various features from these CMM arms can be optionally included to produce a machine capable of measuring a plurality of positions. For example, in some embodiments the measuring devices can be used with other articulated arms, or the articulated arm can be used with other measuring devices.

In the embodiment CMM arm 1A, a measuring device structure of the arm can be optionally removed to provide improved versatility, as further described herein. Further, a plurality of different measuring devices can be included on the CMM arm 1A, facilitating coordinate measurement in a variety of ways. Although certain specific embodiments are described herein, other additional features or subsets of features can also be used.

Figure 11:
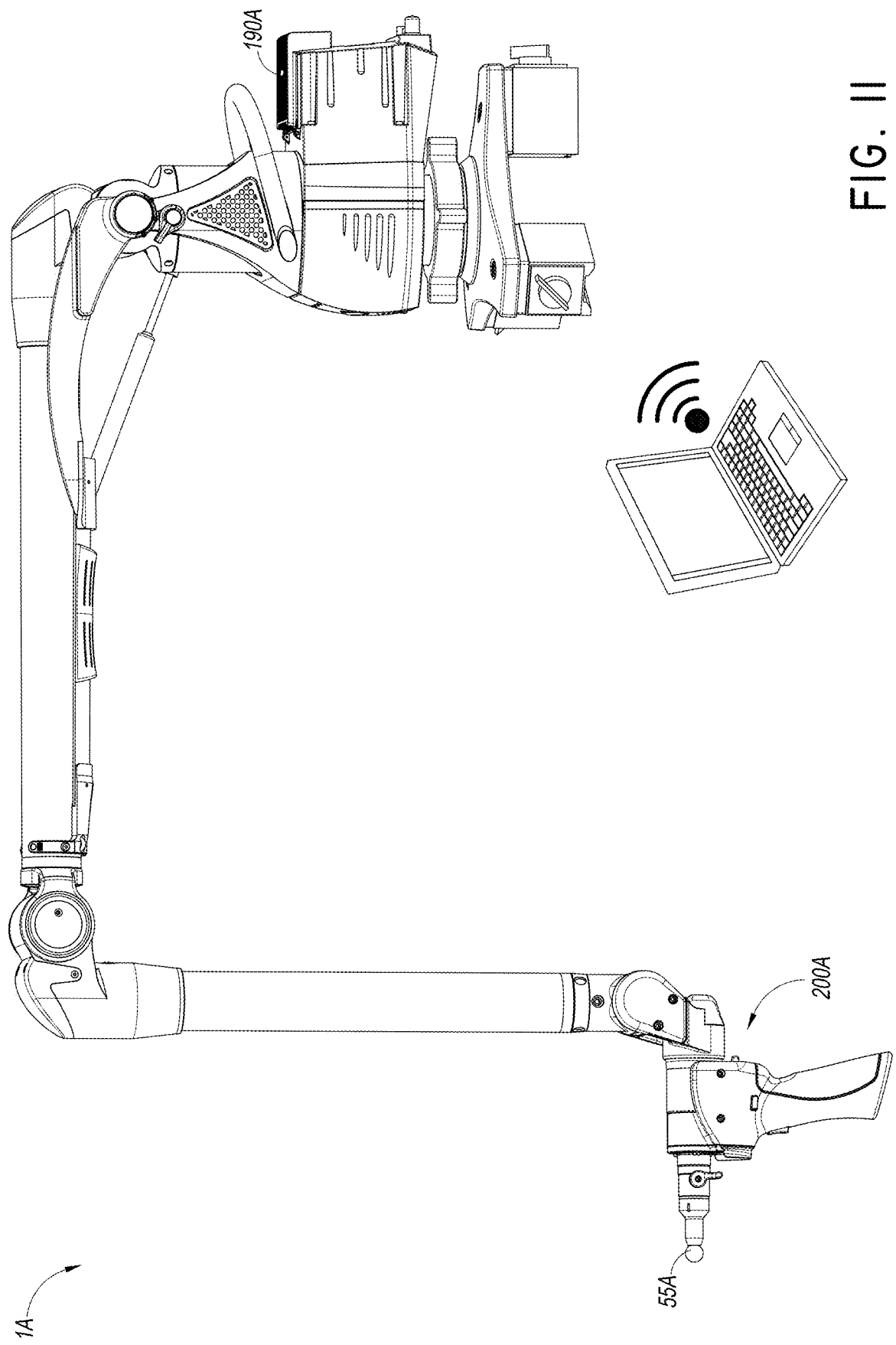
FIG. 11 is a side view of an embodiment multi-mode CMM in a first mode.

As shown in FIG. 11, the CMM arm 1A can be used in a first mode configured to measure coordinates with a contact probe. A measuring device structure 200A of the arm 1A is depicted as being mounted to an end of the arm 1A, such as just distal of or over a last axis of the arm. Further, the measuring device structure 200A is shown in FIG. 11 as having a contact probe 55A, which can be any kind of contact probe described herein or otherwise. Additional measuring devices are not depicted on the arm 1A and the measuring device structure 200A, but they can optionally be mounted on the arm 1A while taking measurements in the first mode, with the contact probe 55A. Advantageously, without the additional measuring devices, the measuring device structure 200A can have a smaller size, such that the contact probe 55A can more easily reach positions in small spaces. The contact probe 55A can be optionally removed and replaced, such that different types, shapes, and sizes of contact probes can be used with the CMM arm 1A. More generally, the CMM arm 1A can include a mounting portion (such as on the measuring device structure 200A) that can receive the contact probe 55A, and other coordinate measuring devices as described further herein.

Figure 12:
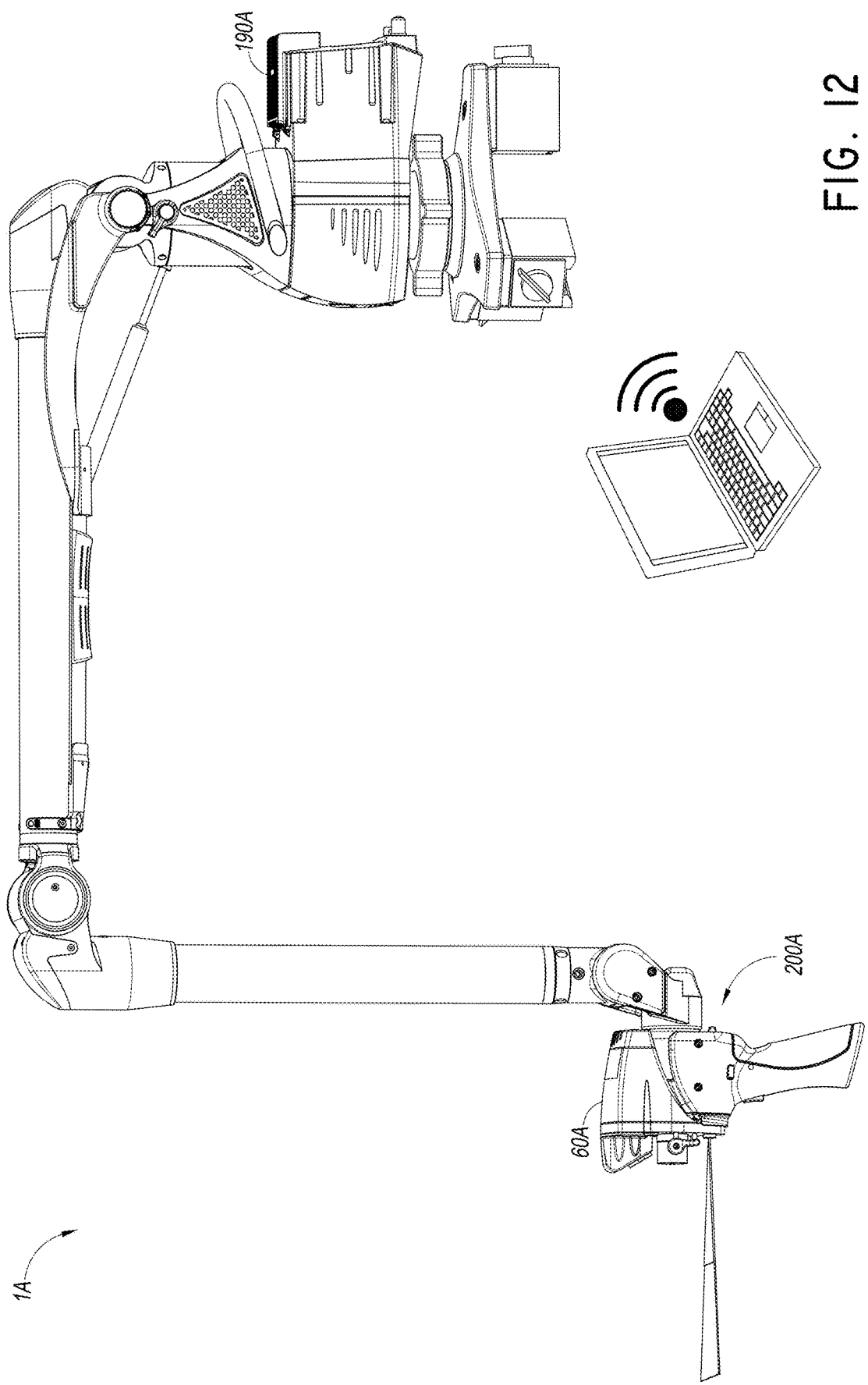
FIG. 12 is a side view of the multi-mode CMM of FIG. 11 in a second mode.

As shown in FIG. 12, the CMM arm 1A can also be used in a second mode configured to measure coordinates with a non-contact coordinate measuring device such as a laser scanner 60A (similar to the non-contact coordinate detection devices 60, 60', described herein). The laser scanner 60A can optionally mount to the device in a way similar to that described above for the laser scanner 60' (e.g., on the measuring device structure 200A). The laser scanner 60A can then take a large number of points quickly, along a line, for example. Prior to measurement, the contact probe 55A can optionally be used to facilitate alignment between measurements made by the contact probe 55A and the laser scanner 60A, e.g. by measuring the same unique feature with each measuring device.

Figure 13:
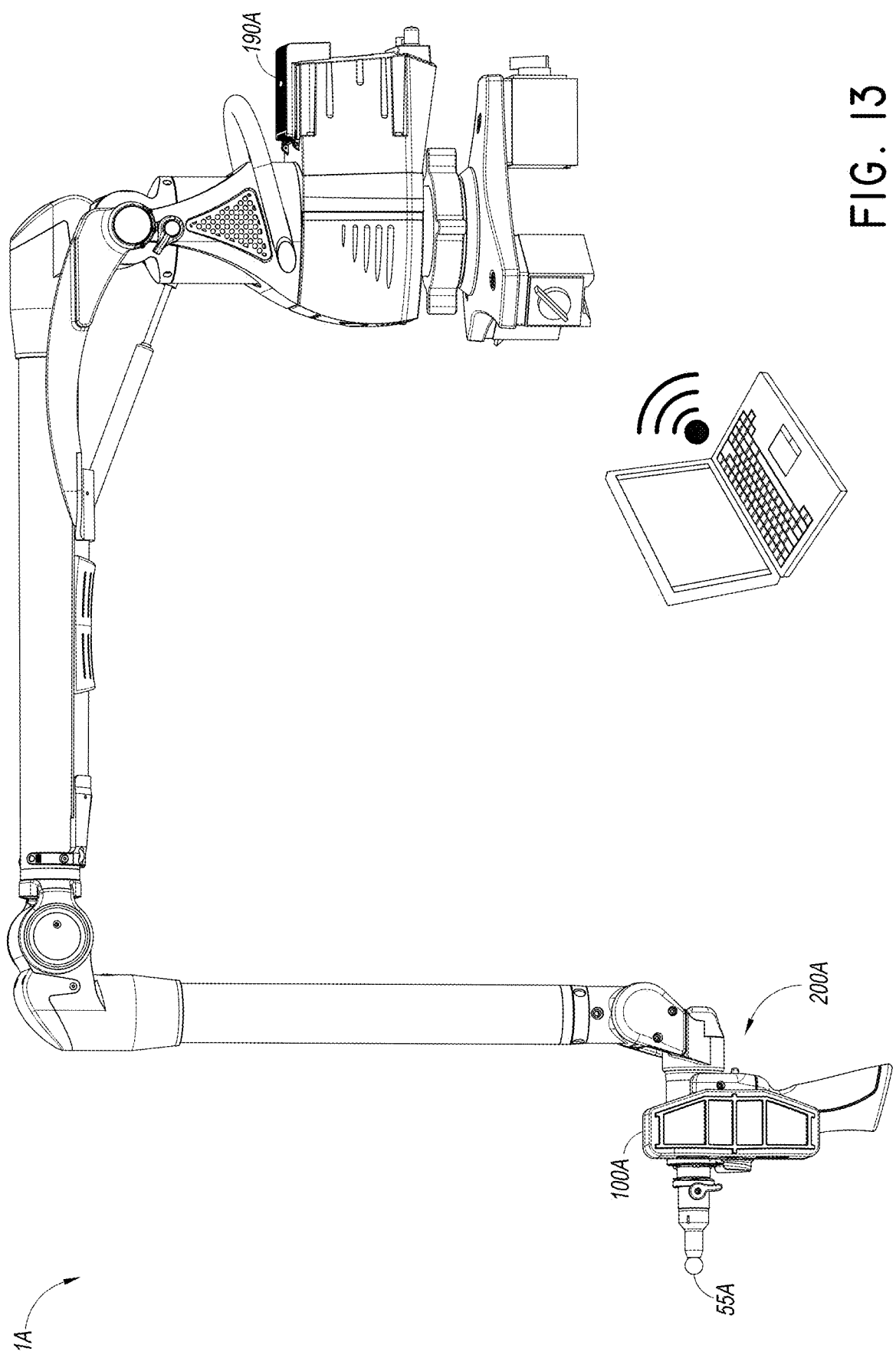
FIG. 13 is a side view of the multi-mode CMM of FIG. 11 in a third mode.

As shown in FIG. 13, the CMM arm 1A can also be used in a third mode configured to measure coordinates with a different non-contact coordinate measuring device, such as an area scanner 100A. The area scanner 100A can optionally mount to the device in ways similar to that described above for the laser scanner 60A (e.g., on the measuring device structure 200A). The area scanner 100A can then measure a large number of points quickly, such as a point cloud within a two-dimensional image. In some embodiments, the area scanner 100A can use stereo vision (e.g., with two or more cameras) to measure the coordinates. Further, in some embodiments the area scanner 100A can also optionally include a projector configured to project a light pattern on an object to be measured, facilitating point detection by one or more cameras on the area scanner. When the object being measured has identifiable features or otherwise has a sufficient texture, the area scanner 100A can measure coordinates without a projector more easily. Prior to measurement with the area scanner 100A, the contact probe 55A can optionally be used to facilitate alignment between measurements made by the contact probe 55A and the area scanner 100A, e.g., by measuring the same unique feature with each measuring devices. In a similar manner, the area scanner 100A and the laser scanner 60A can also be optionally aligned by measuring the same features with both measuring devices. In some embodiments, it may be advantageous to align measurements of two or more non-contact coordinate measuring devices with a contact probe 55A. A processor in communication with the measuring devices can then align measurements between the non-contact measuring devices, using their alignment with the contact probe 55A.

Figure 14:
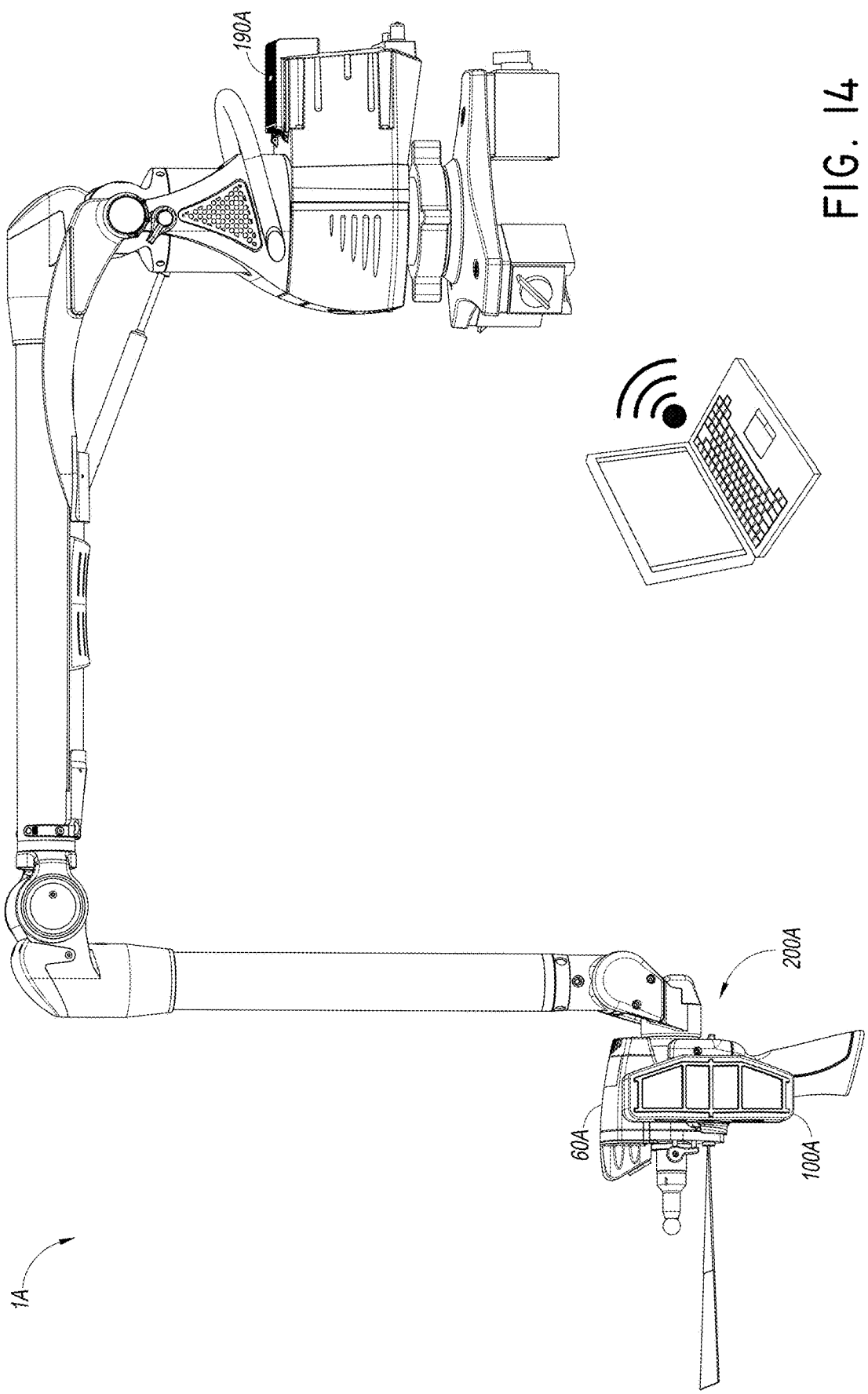
FIG. 14 is a side view of the multi-mode CMM of FIG. 11 in a fourth mode.

As shown in FIG. 14, the CMM arm 1A can also be used in a fourth mode configured to measure coordinates with two or more non-contact coordinate measuring devices, such as an area scanner 100A and a laser scanner 60A. As shown, both can optionally be mounted to a distal end of the CMM arm 1A at the same time, e.g., on the measuring device structure 200A. In some embodiments each of the non-contact measuring devices (e.g., area scanner 100A and laser scanner 60A) can be independently mounted to the CMM arm 1A. In other embodiments, two or more non-contact measuring devices can together mount to the CMM arm 1A as a single part, or a single unit. The non-contact measuring devices can optionally be aligned with the contact probe 55A in ways similar to those discussed above. Optionally, the two or more non-contact measuring devices can both take measurements of an object simultaneously. Thus, measurements can be made faster than when using only one non-contact measuring device.

Further, the laser scanner 60A and the area scanner 100A can optionally share processors, a common physical frame, covers, and a single mounting interface for mounting to the CMM arm 1A (as discussed further herein). This sharing of electronic and physical components can be used when the two non-contact measuring devices 60A, 100A form a single part or a single unit. In other embodiments, when they do not form a single unit, their components can still optionally be shared when attached or mounted to the same device. For example, processors, power sources, wireless communication devices, and other components can be shared when attached or mounted to the same device. Thus, a common measuring device structure 200A or portion of a measuring device structure such as a handle can provide these shared components.

Notably, the various measuring devices can be configured to synchronize with measurements taken by the CMM arm 1A. Thus, a position of the arm can be associated with a synchronous or substantially synchronous measurement taken by a contact or non-contact measuring device. This can be done in a variety of ways, such as using trigger signals as discussed in U.S. Pat. No. 8,112,896, which is incorporated by reference in its entirety.

Figure 15:
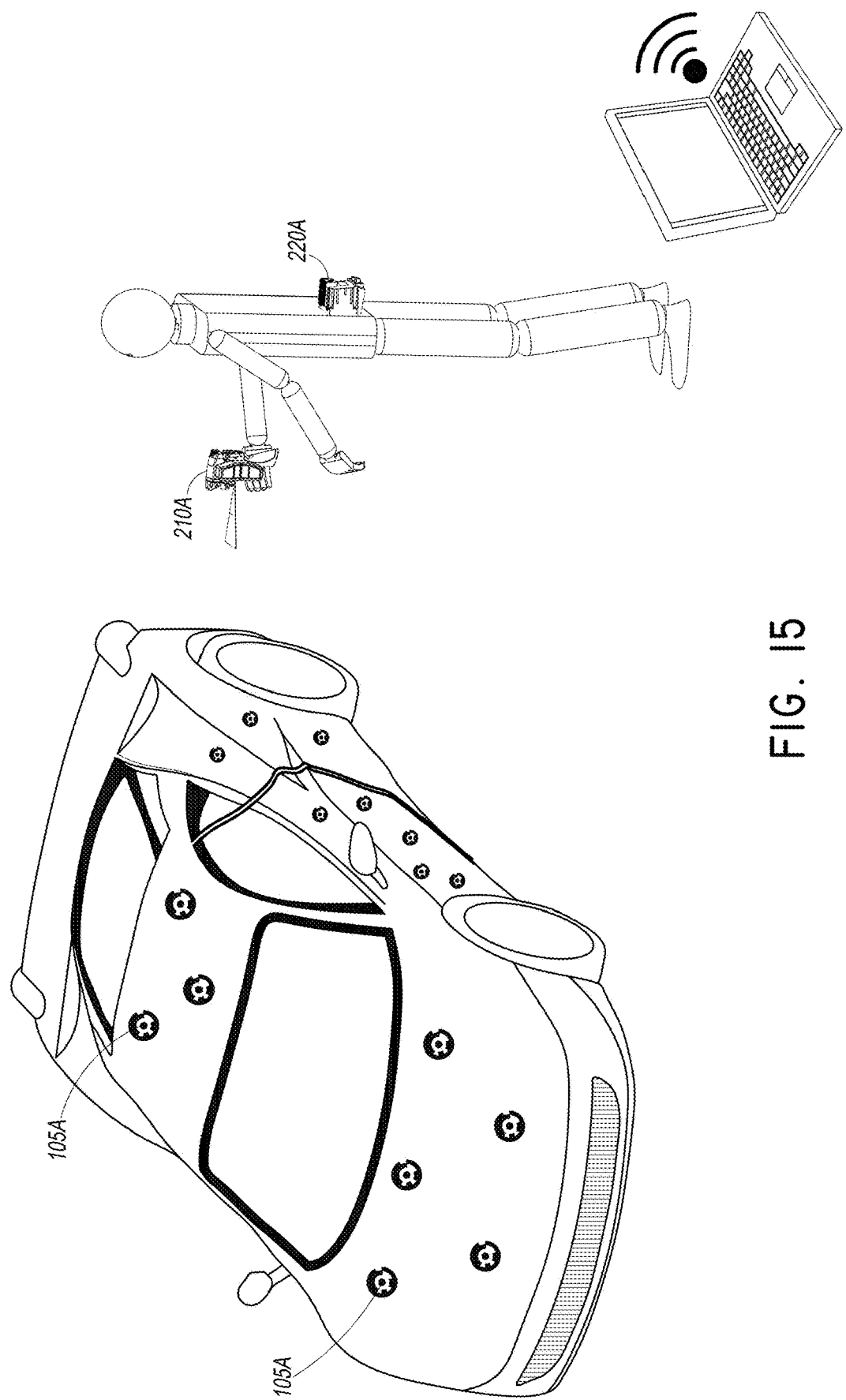
FIG. 15 is a perspective view of the multi-mode CMM of FIG. 11 in a fifth mode.

As shown in FIG. 15, one or more measuring devices described above can optionally be removed from the CMM arm 1A to take measurements in a fifth, more portable mode. The measuring devices can optionally be mounted and removed by the operator by hand or with tools. For example, in some embodiments the measuring devices can attach to the measuring device structure 200A using snap-fits, threaded mounts, hand-operated locks, and other attachments that can be made by hand, without tools. The measuring devices can further include kinematic nests providing repeatable alignment with the measuring device structure 200A (or, in reverse, the CMM arm can include kinematic nests) as described herein. Similarly, the measuring device structure 200A can also optionally be mounted and removed from the CMM arm 1A with similar attachment features. Additionally, an electrical interface can exist between the measuring devices and the measuring device structure 200A. Further, the measuring device structure 200A can have an electrical interface with the CMM arm 1A, such that when the measuring device structure 200A is connected to the arm, power and/or data can be communicated through the electrical interface between the CMM arm 1A and the measuring devices such as the laser scanner 60A or the area scanner 100A.

As shown, one or more measuring devices (such as an area scanner 100A and a laser scanner 60A) can be removed from the CMM arm 1A as a single portable measuring unit 210A which can be used to take coordinate measurements. In the depicted embodiment, the portable measuring unit 210A includes two measuring devices, although more than two are also possible. Similarly, the portable measuring unit 210A might only include one measuring device, such as only an area scanner 100A or only a laser scanner 60A, as further discussed herein. In some embodiments, the entire measuring device structure 200A of the CMM arm 1A can be removed to form the portable measuring unit 210A, such that the portable measuring unit and the measuring device structure are the same. In other embodiments, the portable measuring unit 210A can be removable as part of but not all of the measuring device structure 200A, such as when the contact probe 55A is left attached to the CMM arm 1A. In other embodiments, the portable measuring unit 210A can be removable with parts of the CMM arm 1A that are not part of the measuring device structure 200A. For example, the portable measuring unit 210A can optionally include a pistol grip portion of the CMM arm 1A that is not necessarily part of the measuring device structure 200A. Further, the portable measuring unit 210A can attach to the CMM arm 1A with a kinematic mount, such that the measuring unit can be reattached in substantially the same position and can continue to take measurements without recalibration, powering on/off the devices, or other disruptions to the measurement process.

In some embodiments, electronics to operate the non-contact measuring device(s) can be included within the measuring device structure 200a, such as in the handle. For example, as discussed above, shared batteries, memory, processors, wireless communication devices, and other features can be included in the handle. Thus, a user can substitute different measuring devices, and each measuring device can have access to the features included in the handle. In further embodiments, the portable measuring unit 210A can communicate wirelessly or through a wired connection to the CMM arm 1A or an auxiliary computing device, to send measured coordinates and other data, and receive commands or other information. Optionally, the portable measuring unit 210A can be associated with a wearable pack 220A that can optionally be connected by a cable to the portable measuring unit, and can be carried by a user also carrying the portable measuring unit. The wearable pack 220A can optionally include a power source, memory, wireless communication modules, microprocessors, Graphical Processor Units, or other features and functionalities, such as in a feature pack 190A. Similar features can also, or alternatively, be included in the measuring device structure, such as in the handle.

One or more feature packs 190A can connect with the base 10 of the CMM arm 1A via a docking portion. The docking portion 12 can form an electronic connection between the CMM arm 1A and the feature pack 190A. In some embodiments the docking portion can provide connectivity for high-speed data transfer, power transmission, mechanical support, and the like. Thus, when connected to a docking portion, a feature pack 190A can provide a modular electronic, mechanical, or thermal component to the CMM arm 1A, allowing a variety of different features and functionality such as increased battery life, wireless capability, data storage, improved data processing, processing of scanner data signals, temperature control, mechanical support or ballast, or other features. In some embodiments this modular functionality can complement or replace some modular features of other portions of a multi-mode coordinate measuring machine. The modular feature packs can contain connectors for enhanced functionality, batteries, electronic circuit boards, switches, buttons, lights, wireless or wired communication electronics, speakers, microphones, or any other type of extended functionality that might not be included on a base level product. Further, in some embodiments the feature packs 190A can be positioned at different portions of the CMM arm 1A, such as along a transfer member, an articulation member, or as an add-on to the handle 40. In some embodiments it may be possible to remove the feature pack from the base portion of the CMM arm 1A and then mount it directly to the portable measuring unit 210A.

In some embodiments, the feature pack 190A can be converted into a wearable pack 220A. For example, the feature pack 190A can be removed from the CMM arm 1A and then be connected to the portable measuring unit 210A with a wire or a wireless connection to provide functionality directly to the portable measuring unit 210A. For ease of description, the wearable feature pack 220A will be considered to be the same as the feature pack 190A, but it can also be an independent unit not meant for attachment to the CMM arm 1A. The wearable feature pack 220A can be carried by the user by hand, on a belt clip, in a pocket, on a wrist strap, on a backpack, physically mounted to the portable measuring unit 210A, or in some other way can be attached to the user. In some embodiments, the feature pack 190A can attach to a portable measuring unit 210A as a handle to the portable measuring unit.

As one example of feature pack 190A functionality, a feature pack can include a battery, such as a primary battery or an auxiliary battery. Advantageously, in embodiments where the pack 190A is an auxiliary battery the CMM can include an internal, primary battery that can sustain operation of the CMM while the auxiliary battery is absent or being replaced. Thus, by circulating auxiliary batteries a CMM can be sustained indefinitely with no direct power connection. Similar functionality can be provided to the portable measuring unit 210A, optionally with the same pack 190A.

As another example, a feature pack 190A can include a data storage device. The available data storage on the feature pack 190A can be arbitrarily large, such that the CMM arm 1A and/or the portable measuring device 210A can measure and retain a large amount of data without requiring a connection to a larger and/or less convenient data storage device such as a desktop computer. Further, in some embodiments the data storage device can transfer data to the arm 1A and/or the portable measuring device 210A, including instructions for arm operation such as a path of movement for a motorized arm, new commands for the arm or device upon pressing of particular buttons or upon particular motions or positions of the arm or device, or other customizable settings.

In examples where the feature pack 190A includes wireless capability, similar functionality can be provided as with a data storage device. With wireless capability, data can be transferred between the arm 1A and/or the portable measuring device 210A and an external device, such as a desktop or laptop computer, continuously without a wired connection. In some embodiments, the measuring devices (e.g., the arm 1A and/or the portable measuring device 210A) can then continuously receive commands from the external device. Further, in some embodiments the external device can continuously display data from the measuring devices, such as their position or data points that have been acquired. In some embodiments the external device can be a personal computer ("PC") and the feature pack can transmit data wirelessly to the PC. Said feature pack can combine the measured data from various measuring devices in the feature pack before wireless transmission or transmit them as separate data streams.

In further embodiments, the feature packs 190A can also include data processing devices. These can advantageously perform various operations that can improve the operation of the measuring devices, data storage, or other functionalities. For example, in some embodiments commands to the measuring devices based on their position can be processed through the feature pack. In additional embodiments, the feature pack can compress or otherwise process data from the measuring devices prior to storage or transmission to reduce the volume of data that must be transmitted.

Similarly, the feature packs 190A can potentially include a light source such as a light emitting diode or laser. The light source can be attached, by a fiber optic cable, to the projector or other sources of light in the non-contact coordinate detection devices described herein. Notably, the act of generating the light can create a substantial amount of heat. Placing these components on a feature pack or other displaced component can reduce heat accumulation near temperature-sensitive elements of the device.

In another example, the feature pack 190A can also provide mechanical support to the CMM arm 1A. For example, the feature pack can connect to the base 10 and have a substantial weight, thus stabilizing the CMM. In other embodiments, the feature pack may provide for a mechanical connection between the CMM and a support on which the CMM is mounted.

In yet another example, the feature pack 190A can include thermal functionality. For example, the feature pack can include a heat sink, cooling fans, or the like. A connection between the docking portion and the feature pack can also connect by thermally conductive members to electronics in the base 10 and the remainder of the relevant measuring device, allowing substantial heat transfer between the measuring device and the feature pack.

Further, in some embodiments the feature packs 190A can have a size and shape substantially matching a side of the base 10 or the portable measuring device 210A to which they connect. Thus, the feature pack 190A can be used without substantially increasing the size of the measuring device, reducing its possible portability, or limiting its location relative to other devices. Similar feature packs and other modular features such as a modular handle are described in U.S. Pat. No. 8,112,896, which is incorporated by reference in its entirety.

In use, the portable measuring unit 210A can include two non-contact measuring devices that are used for different purposes. For example, in some embodiments a laser scanner 60A can be used to measure coordinates, and an area scanner 100A can be used to determine a position of the portable measuring unit 210A in space. In other words, the laser scanner 60A can optionally be used to generate points indicative of the shape of the object being measured, and the area scanner 100A can be used to determine the movement of the portable measuring unit 210A. In some embodiments, identifiable markers 105A can be placed on or near the object being measured to facilitate the location of a particular point that can be viewed by the area scanner 100A to determine the position of the portable measuring unit 210A. In other embodiments, the object being measured can intrinsically include identifiable features that can serve the same purpose as the markers. In further embodiments, the position of the portable measuring unit 210A can be determined using other means, such as a laser tracker (and associated retroreflectors or other features on the portable measuring unit) and triangulation methods (e.g., multiple sensors at different locations measuring a distance to the portable measuring unit). Further, in some embodiments the area scanner 100A can also be used to measure coordinates of the object being measured. Optionally, an additional pattern can be projected onto the object to be measured by one or more additional stationary projectors. The additional projected pattern can be used by the area scanner 100A to sense its movement by the change of position of the additional pattern in the camera image. The area scanner 100A could also use the additional projected pattern to aid in the point cloud determination as it would apply additional texture to the object, in addition to or in replacement of that provided by a projector that is mounted to (and thus moves with) the area scanner 100A and the portable measuring unit 210A. The additional projected pattern can optionally provide a rougher texture, used to assist in measurements of the position of the area scanner, while a finer texture can be used for measurements of the object.

To facilitate accuracy of measurements taken by the portable measuring unit 210A, the devices measuring coordinates on the object being measured can be synchronized with the devices measuring the position of the portable measuring unit 210A, such that the position of the measuring unit and the coordinates on the object can be measured at the same time. Measuring the position of the portable measuring unit 210A at the same time as measuring coordinates on the object being measured can reduce errors in the measurements caused by movement of the portable measuring unit. In some embodiments, the devices measuring the position of the portable measuring unit 210A (such as the area scanner 100A) can be configured to run at a frequency equal to or faster than the laser scanner 60A (or other devices measuring coordinates on the object. Further, the devices can be synchronized using trigger signals, such as those discussed in U.S. Pat. No. 8,112,896, which is incorporated by reference in its entirety.

In further embodiments, the portable measuring unit 210A can optionally include (or use) only an area scanner 100A. In such embodiments, the area scanner 100A can optionally take measurements that both identify the position of the portable measuring unit 210A and measure coordinates on the object. When identifiable markers 105A (such as retroreflective markers) or other identifiable features on the object are used, the area scanner 100A can optionally take sets of 3 measurement images. A first image can be used to identify the 3 or more markers, and thus also identify the position of the portable measuring unit 210A. A second image can be used to measure coordinates on the object, such as a point cloud, optionally with a projector outputting a structured light pattern. A third image can, like the first image, be used to identify the markers and the position of the portable measuring unit 210A. Identifying the position of the portable measuring unit 210A twice can allow the device to detect if the portable measuring unit was moving while the images were taken. If significant movement occurred, the system can interpolate between the two positions to estimate a position of the unit when the coordinates on the object were measured. In a similar manner, measurements can be taken continuously, with the scanner 100A alternating between taking images to measure a position of the portable measuring unit 210A and images to measure the object. In a further embodiment the location of the identifiable markers and the measured coordinates can be acquired with the same images.

When identifiable markers 105A or other identifiable features are not available or otherwise not used, coordinates on the object to be measured can be taken in every image. Each image can yield a point cloud of coordinates that can overlap with other images taken by the area scanner 100A. The point clouds in each image can then be stitched together using best fit algorithms to align them together into a single set of measured coordinates in a common coordinate system, such as with an ICP (Iterative closest point) algorithm. The position of the portable measuring unit 210A can then be estimated relative to the object using the same images.

FIGS. 16A-16E depict various views of an embodiment portable measuring unit 210A. As shown, the portable measuring unit 210A can include a main body 120A that can include a handle portion, and can be configured for attachment to a CMM arm 1A. In the depicted embodiment, a contact probe is not attached, but a contact probe can be attached for use while on the CMM arm 1A or otherwise, as a mounting portion for a contact probe is included on the portable measuring unit 210A. The main body 120A can also be configured to have multiple measuring devices mounted to it (including a contact probe). For example, the laser scanner 60A can be mounted to the portable measuring unit 210A with a laser and camera on opposite sides of a contact probe, portion for receiving a contact probe, or an axis of rotation of the last axis of a CMM arm 1A, when attached to the CMM arm, similar to the mountings described above. The area scanner 100A is depicted as being mounted to the side, and includes two cameras 115A mounted on opposite sides of a projector 110A. In other embodiments, the arrangement of these features can be changed. For example, in some embodiments the laser scanner 60A can be on one lateral side of the device, and the area scanner 100A can be on another lateral side or be disposed about the center. When the area scanner 100A is disposed about the center, it can optionally have a configuration of two cameras above the axis L1 and the projector below such that it could be received into recess 92 (depicted in FIG. 3B). As best depicted in FIG. 16E, the laser scanner 60A and the area scanner 100A can mount to a main body 120A of the portable measuring unit 210A independent of one another, such that either can be removed while the other is still attached.

The area scanner 100A can optionally include two high resolution cameras, such as a CMOS camera with 1.0-5.0 megapixels, although higher or lower resolutions are also possible. CCD cameras can also be used. Alternatively, the cameras can be image sensors which interface with scanner electronics. Each camera can include a lens such that they focus at a specific distance and field of view, such as a 200 mm×200 mm area at a distance of 200 mm. This can set an optimum distance from the object to take measurements, and similarly affect the accuracy and area that can be measured at a single time. In other embodiments, the lenses and cameras can be varied to include a wider or smaller field of view, allow viewing from a further or closer distance, use higher or lower resolution cameras, etc. Further, in some embodiments one camera or more than two cameras can be used. Further, LEDs or other light sources can optionally be disposed around or near each camera and be configured to illuminate a region imaged by the cameras. The LEDs can optionally emit light at a particular wavelength and the cameras can optionally include lenses configured to filter light to remove undesirable wavelengths. Thus, the cameras can potentially capture substantially only light originating from the LEDs.

Further, the area scanner can optionally include a projector 110A. The projector 110A (or a plurality of projectors) can be configured to output a structured light pattern onto the object to be measured, within the field of view of the cameras. For example, the structured light pattern can be a random, semi-regular, or regular dot pattern. The light can be provided by a laser light source, and the structured pattern can be provided using a diffractive optic of etched glass. However, other features can be used to create the pattern. For example, in some embodiments LEDs can be used, with blue light, red light, infrared light, etc. In other embodiments the projector can be a Digital Light Processing (DLP) Projector. The structured light can be used to create a texture on the object to be measured. In some embodiments the projected pattern can be a series of random, or non-repeating or repeating unique shapes such that a specific region in one camera can be identified in another camera. On objects where a texture is already present, it might be preferable to not use a projector 110A. Further, the projector(s) can optionally be separated from the cameras, such as when the projector is disposed on a stationary mount. The cameras can continue to utilize the pattern from the projector as long as they measure surfaces adequately illuminated by the projector.

Various algorithms can be used by the non-contact measuring devices to convert detected images into measured coordinates. For example, triangulation can be used to detect coordinates, particularly with a laser line scanner. Stereo vision can also be used, particularly with area scanners including two or more cameras. Other techniques, such as Structure from Motion and Simultaneous Localization and Mapping are also possible.

Further, the different measuring devices can mount together to a portable measuring unit 210A and the CMM arm 1A through a variety of ways. For example, as shown best in FIGS. 16A-16C, the laser scanner 60A and the area scanner 100A can mount to a main body 120A. The main body 120A can then optionally mount to structures that can include a handle, electronic connections, and kinematic connections, facilitating use with the CMM arm 1A. The portable measuring unit 210A can include a portion for receiving a contact probe. Further, as discussed herein, the portable measuring unit 210A can be configured to mount to a CMM arm 1A, such as with a kinematic mount. In other embodiments, the portable measuring unit can be a separate and independent device from the CMM arm 1A, such that it does not mount to the CMM arm. For example, the laser scanner 60A and/or the area scanner 100A can optionally attach to a handle or other device that is not designed to be used with the arm, as further discussed below.

FIGS. 16F, 16G show that the portable measuring unit 210A can also include special connectors for the area scanner 100A to attach to a side of the main body 120A. As shown in FIG. 16F, the main body 120A can include a side mounting portion configured to receive the area scanner 100A depicted in FIG. 16G. The side mounting portion can include both electrical and physical connections, such that the area scanner 100A can mount easily and directly at that portion. Mounting in this side position can also allow the area scanner 100A to mount/dismount without the need to remove a laser scanner 60A that is mounted over a front-facing portion of the main body 120A. Similarly, the laser scanner 60A can also optionally mount/dismount without the need to remove the area scanner 100A. The mounting portion for the area scanner 100A is shown on the side, but could be located elsewhere on the portable measuring unit such as on the top, bottom, front, handle or elsewhere.

Figure 17:
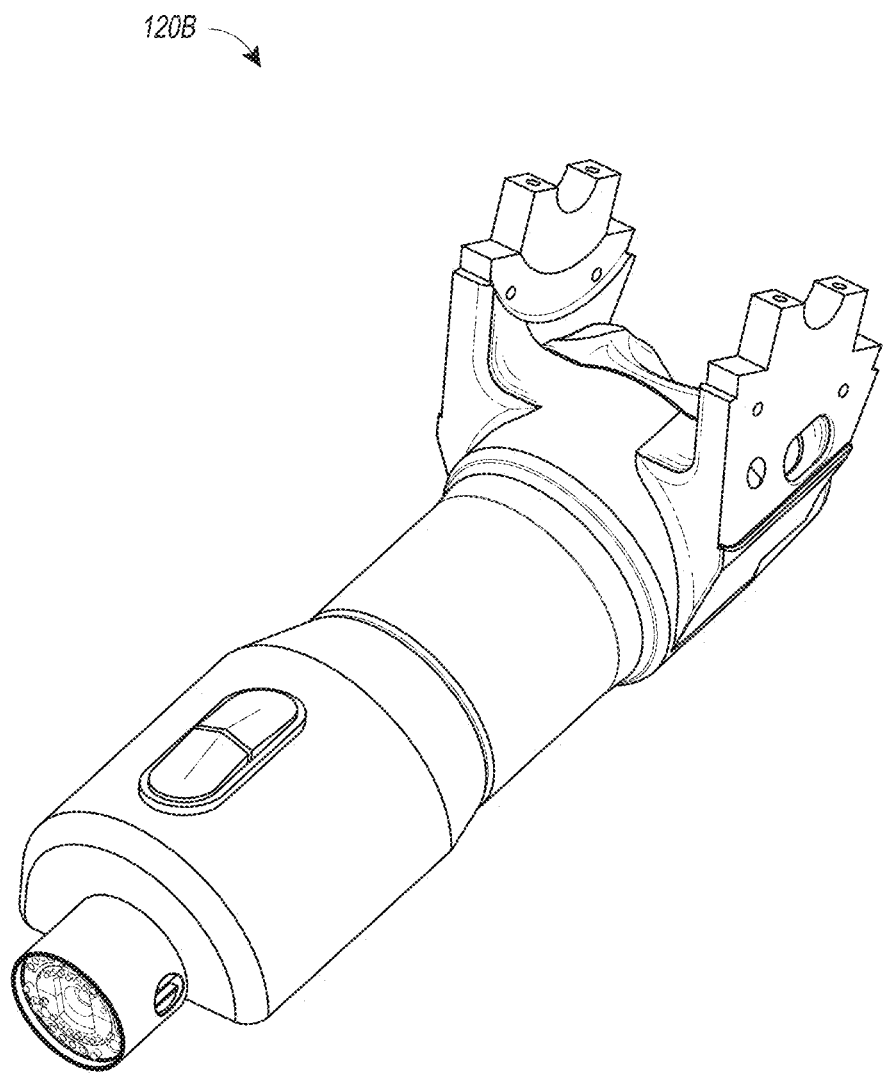
FIG. 17 is a perspective view of another embodiment of a portable measuring unit.

FIG. 17 depicts another embodiment of main body 120B of a portable measuring unit. As shown, the portable measuring unit in FIG. 17 can have a substantially smaller main body 120B than the portable measuring unit 210A depicted in FIGS. 16A-16F, not including a pistol grip. Thus, the main body 120B could allow a user to maneuver a portable measuring unit into smaller spaces. Further, in some embodiments the main body 120B can be configured to optionally receive a pistol-grip handle or other features that can be attached and removed without tools. Additionally, as shown, the main body 120B can include a connection portion for measuring devices and various buttons or other user inputs, as discussed herein.

Figure 18A:
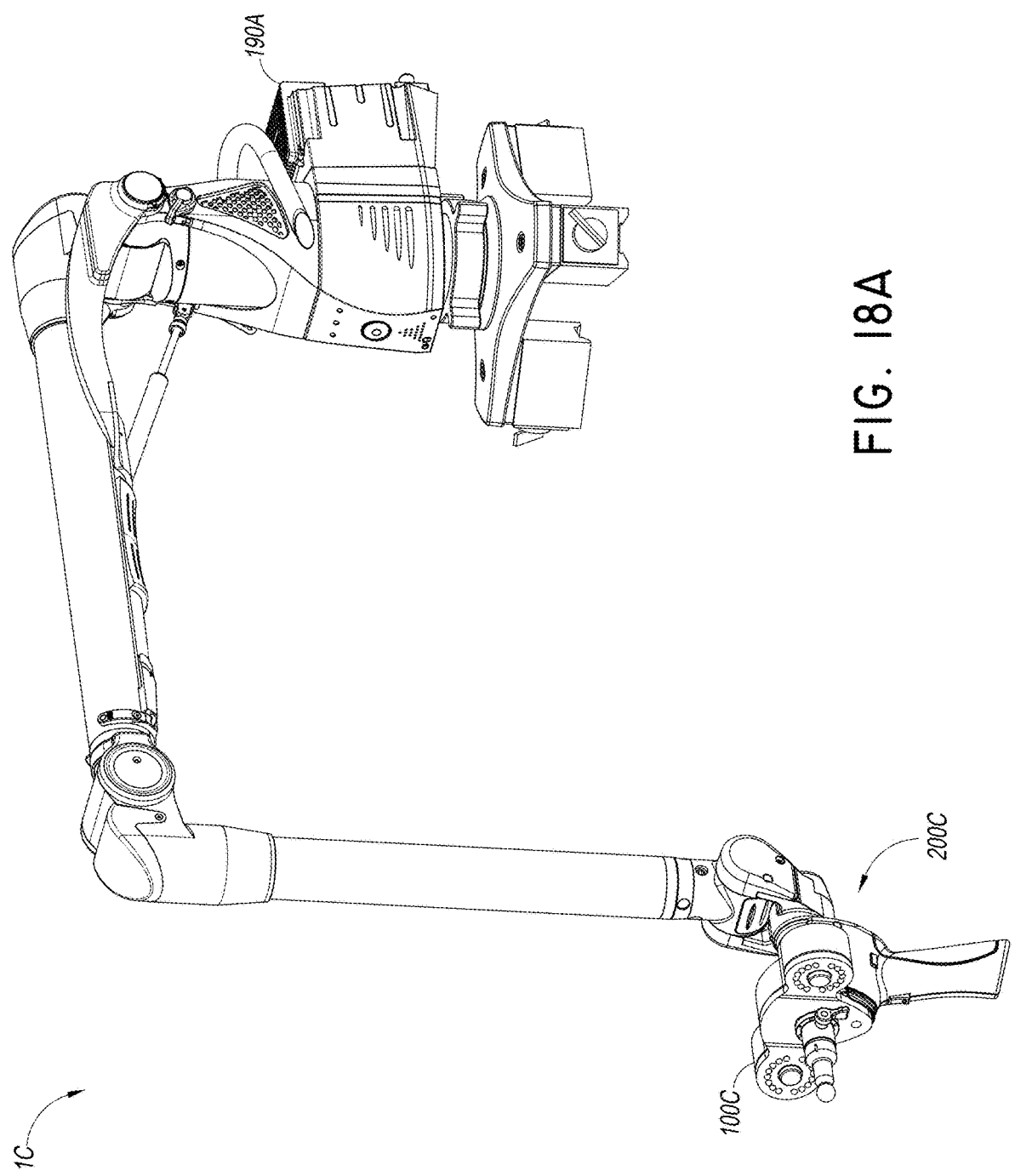
FIG. 18A is a perspective view of a multi-mode CMM including an area scanner.
Figure 18B:
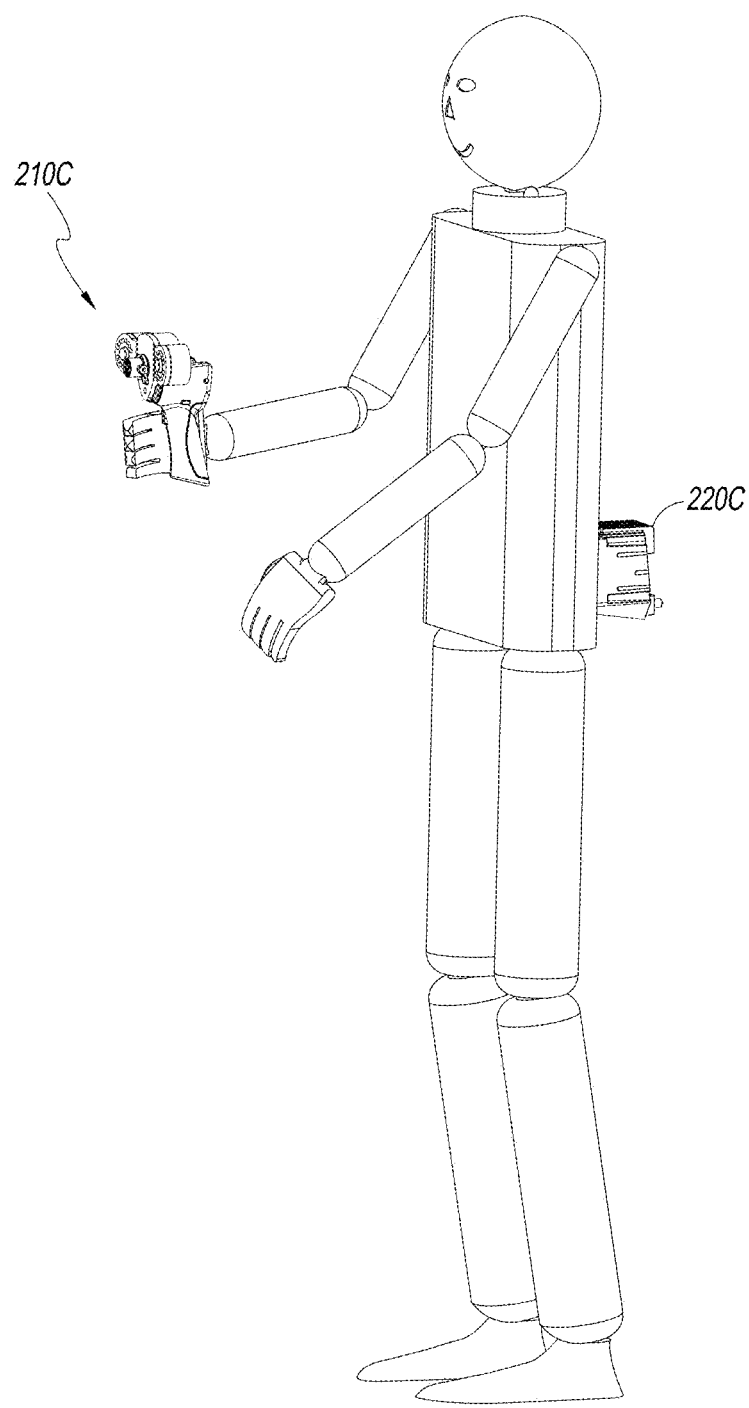
FIG. 18B is a perspective view of a user using a portable measuring unit including the area scanner of FIG. 18A.
Figure 18C:
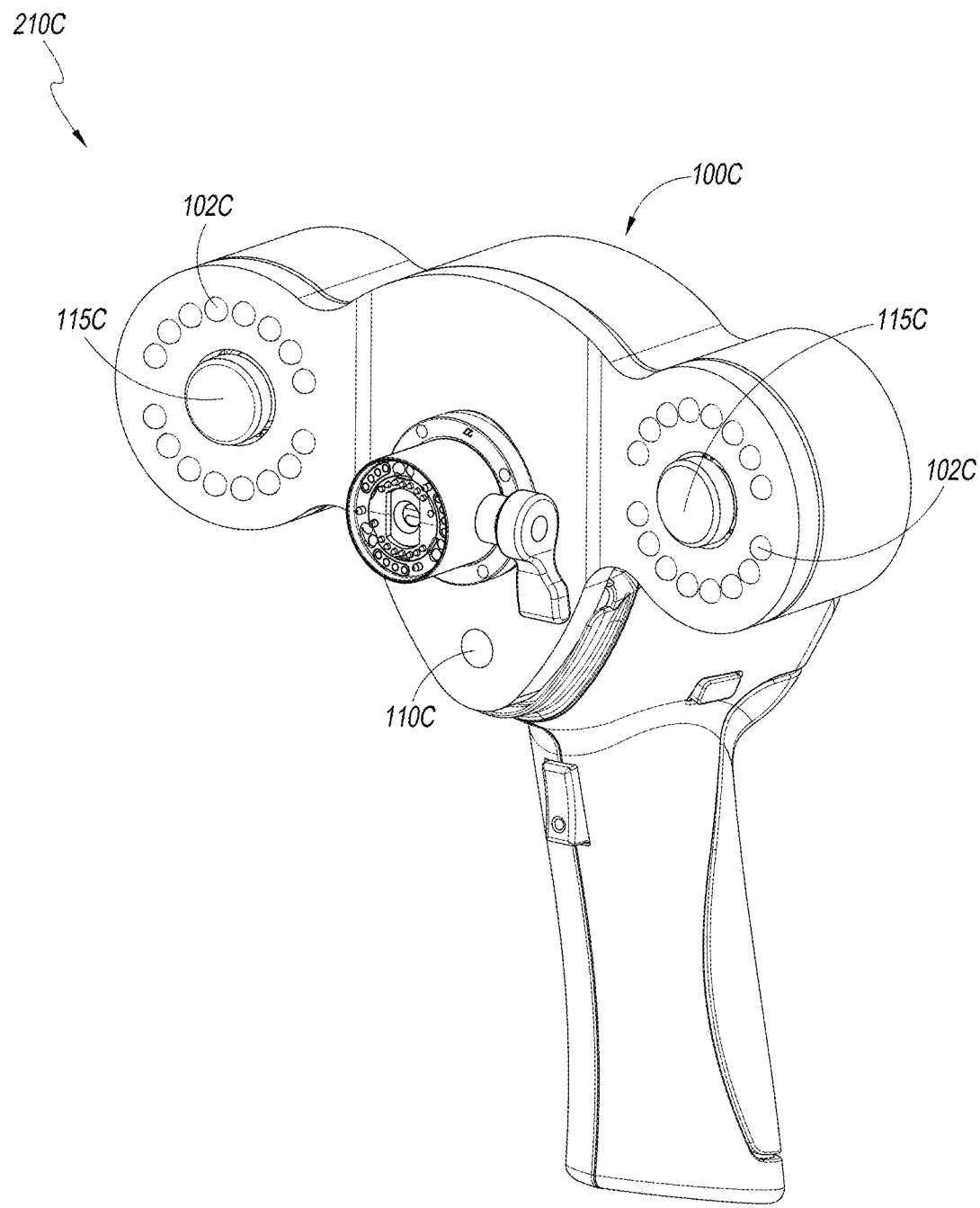
FIG. 18C is a perspective view of the portable measuring unit of FIG. 18B.

FIGS. 18A-18C depict another embodiment portable measuring unit similar to previous embodiments. FIG. 18A depicts the portable measuring unit 210C mounted to a CMM arm 1C. FIGS. 18B and 18C show the portable measuring unit 210C in use while detached from the CMM arm 1C. The portable measuring unit 210C can include an area scanner 100C mounted about a contact probe mounting portion, as discussed herein regarding mounting of a laser scanner about the contact probe (or a portion for receiving a contact probe, or about a last axis of rotation of a CMM arm to which it can be attached, otherwise referred to here as the center). The area scanner 100C can include two cameras 115C on opposite sides of the center. Further, the area scanner can include a projector 110C directly below the center. In other embodiments, the location of the cameras 115C and projector 110C can vary, such as with the projector located between the two cameras and above the probe portion. The area scanner depicted in FIGS. 18A-18C can be mounted using the electrical and mechanical kinematic mounting techniques described herein, including those described for laser scanners such as the laser scanner 60' depicted in FIGS. 8-10. For example, the area scanner can be configured to mount in a location similar to the laser scanner, such that they cannot both be used on the arm at the same time. Additionally, an advantage of this design is that the laser scanners and area scanners can be mounted and removed easily by a user, interchangeably converting the system from a contact probe measuring system to a laser scanning system to an area scanning system to a portable measuring unit with the same functionalities.

Figure 19:
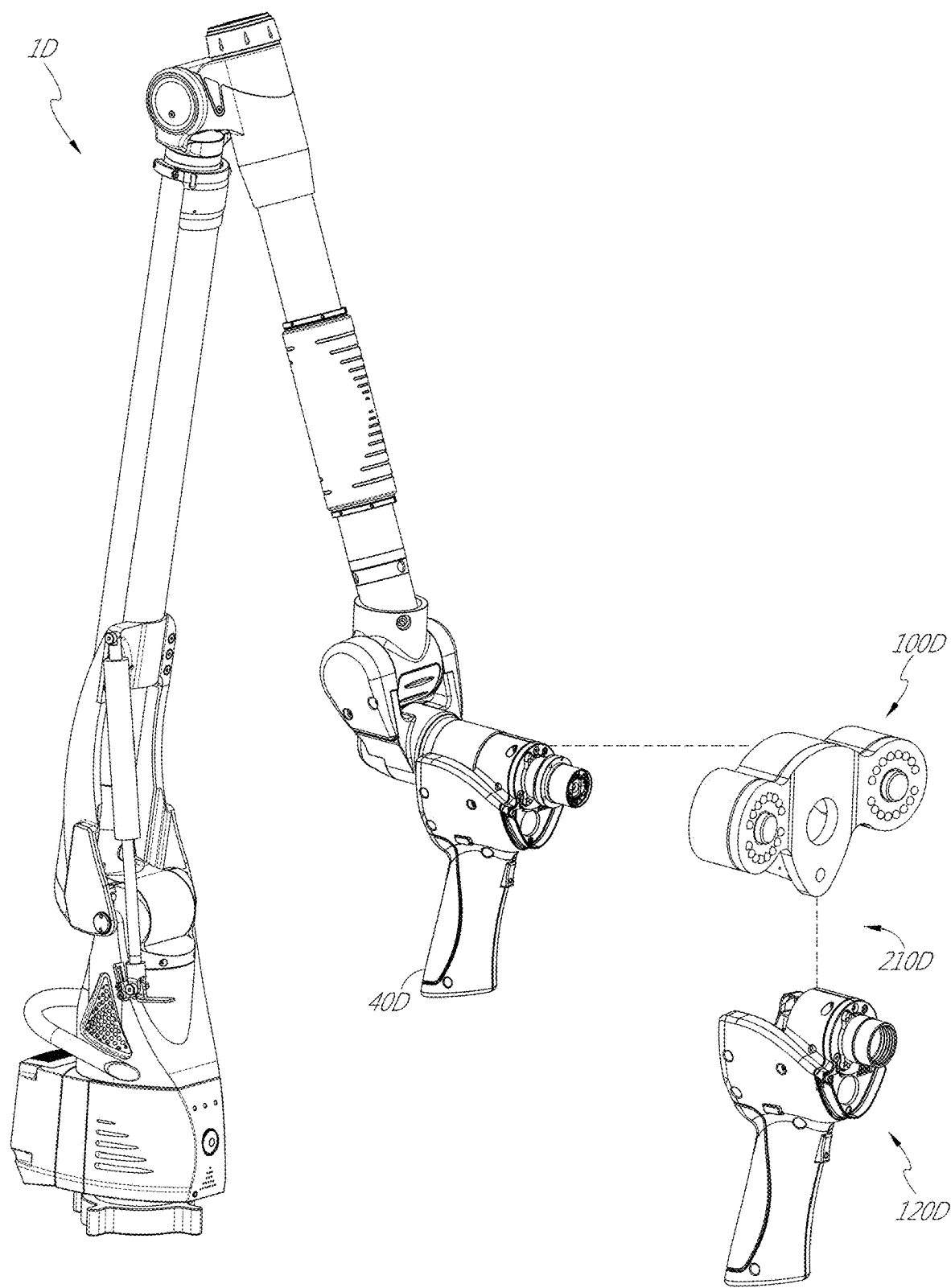
FIG. 19 depicts an exploded view of a CMM arm, scanner, and handle system.

FIG. 19 depicts another embodiment portable measuring unit 210D that can be used as part of a system with a CMM arm 1D, similar to those discussed above. The portable measuring unit 210D can be substantially similar to the portable measuring unit 210C depicted in FIGS. 18A-18C and can operate in a substantially similar manner. However, as shown, the handle 40D on the CMM arm 1D can be separate from the portable measuring unit 210D. More particularly, the portable measuring unit 210D can include its own portable handle, having similar features and functionality but still distinct from the handle 40D used with the CMM arm 1D. Even further, the portable handle can optionally form substantially all of the main body 120D of the portable measuring unit 210D, such that the portable measuring unit is physically substantially just a handle and one or more scanners attached to it. Thus, the handle 40D on the CMM arm 1D could optionally be configured to be substantially irremovable from the arm while the scanners are removable.

The area scanner 100D can thus mount to the CMM arm 1D, in ways similar to those discussed above, and it can also mount to the portable measuring unit 210D in ways similar to those discussed above. Similar to that shown in FIG. 16E, the main body 120D of the portable measuring unit 210D can include an attachment portion for receiving a contact probe, and the area scanner 100D (or other scanners) can mount over this attachment portion. However, in other embodiments, the main body 120D can optionally not include an attachment portion for a contact probe, while an attachment portion is still provided on the CMM arm 1D and it's handle 40D. Removing the attachment portion for the contact probe from the main body 120D can simplify the design for mounting the area scanner 100D.

Separating the main body 120D from the handle 40D on the CMM arm 1D can allow each to be optimized for their specific functions. For example, the handle 40D on the CMM arm 1D is part of a last axis of rotation of the CMM arm, located between rotational encoders on the arm and the coordinate detection devices. Thus, the handle 40D and its associated components need to be substantially rigid to prevent undesirable deflections that add error to any measurements. These design considerations often call for stronger, bulkier, and heavier materials. Meanwhile, the main body 120D can be substantially light, such that it is easy to carry. Thus, the main body 120D does not need to be as strong. For example, it may be desirable for the handle on a CMM arm to be heavier than the handle of a portable measuring unit, or stronger than the handle of a portable measuring unit. If more components are included in the portable measuring unit, as further discussed below, then the same can be said for just the physical load-bearing portions of the handles.

Further, the main body 120D can include different electronics than those desired in a handle 40D or other components on the CMM arm 1D. While attached to the arm 1D, the coordinate detection devices can be potentially connected by wire, through the arm, to power sources, data transfer wires, and other resources. The main body 120D can carry its own power source, memory, processors, wireless data transceivers, and other components for mobile use. It is also possible for the portable measuring unit 210D to still have a wired connection (e.g., to a feature pack 220C carried by the user, or to another accessory device). However, even in this situation, it can be desirable to have separate structures given the physical requirements of a wired connection.

However the CMM arm 1D and associated portable components can be designed and arranged, it is often desirable to eventually direct the data to another device such as a broader data network that can include, for example, a computer. The network can optionally communicate with the arm by wire or wirelessly. The network can also optionally communicate directly with a portable measuring unit by wire or wirelessly. Even further, the portable measuring unit can optionally communicate with the associated arm by wire or wirelessly (for example, if the data is to be transmitted from the portable measuring unit to the arm, and then to the network from the arm). Thus, for example, a portable measuring unit might communicate wirelessly with an arm, which then communicates by a wired connection with the network.

Even further, in some embodiments, various feature packs can be included in the chain of communication. For example, in some embodiments a feature pack might provide wireless communication capability to a CMM arm. While scanners from the portable measuring unit are connected to the CMM arm, the feature pack might also provide wireless capability to them (and by association, to the portable measuring unit). Then, the feature pack can be configured to also attach by wire directly to a portable measuring unit or otherwise communicate wirelessly and directly with the portable measuring unit, such as with the feature packs 220A (described above).

Particularly with scanners, large amounts of data can be generated during measurement. Further, this large amount of data can require a large amount of processing power to determine measured coordinates. A user might want to have a real-time indication of what has been measured (for example, to avoid redundant measurements or unmeasured areas). However, processing capabilities on the portable measuring unit or CMM arm might be limited due to size/weight constraints, energy constraints, or thermal constraints. Thus, one might prefer to process the data on another device such as the CMM arm or a separate network. However, this separation of data processing can add delay to the user's feedback. Additionally, bandwidth for data transmission might limit the speed at which the data can be passed between devices. Thus, it may be desirable to simultaneously reduce the processing requirements for user feedback on the measuring devices, while also reducing the amount of data that must be transmitted.

For feedback, a user might want to know what places have been measured, without needing to know the specific values of the coordinates that were measured, or without needing to know the values with full precision. Thus, in some embodiments, a processor on the CMM arm or the portable measuring unit can be configured to process the data sufficiently to indicate what coordinates have been measured, without actually determining the values of those coordinates, or determining the values to full precision. In some embodiments, this may be accomplished by measuring the coordinates at a lower level of precision than the full precision available. For example, the processor might only process lower resolution versions of images captured by a scanner. The lower resolution versions can be produced, for example, by ignoring a certain portion of the pixels, such as every N out of every M pixels, such as 9 out of 10, 8 out of 10, or other ratios. The lower resolution versions can also use a lower resolution in certain portions of each image, and higher resolution versions in other areas. For example, the image can be processed at high resolutions along the edges of the image, and lower resolution in the center, such that an area of points measured can be determined by its borders. Similarly, instead of using a low resolution version of the image, a processor can instead skip (or ignore) pixels in the image (such as 1 out of every 10 pixels, 2 out of every 10 pixels, or other ratios). The skipping of pixels can also be done to varying degrees, in different regions, as discussed above with low resolution versions of the images.

The measuring device can indicate to a user what points have been measured, such that the user can avoid redundant measurements, ensure that desired areas have been measured, or otherwise consider what has and has not been measured. Further, the processor on the device can optionally provide additional information to the user, such as an image of the object according to the measured coordinates, numerical values of the measured coordinates, the expected accuracy of particular measurements, the existence of overlapping measurements that appear to be inconsistent, edges of measured objects, or other information.

Figure 20:
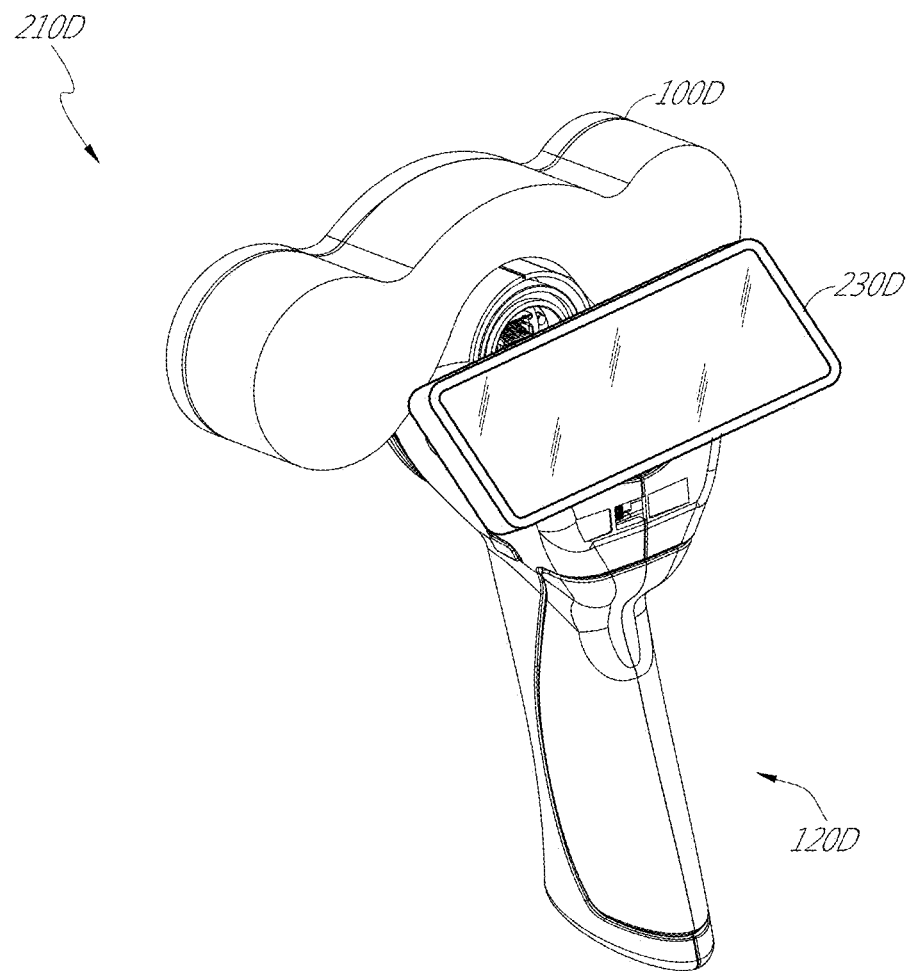
FIG. 20 depicts a scanner and handle system including a display.

This information can be provided to the user in a variety of ways. For example, the information can be provided on a display mounted on the CMM arm, such as at a base, on a transfer member, or at a distal end of the arm near the coordinate measurement device(s). Similarly, a display 230D can be mounted on a portable measuring unit (as depicted in FIG. 20), such as on a rear side of the portable measuring unit, facing the user while being held as a pistol grip. Even further, in some embodiments the display can allow instructions to be inputted to the device, such as by including a touchscreen similar to those provided on a mobile phone or tablet computing device. In some embodiments, the display can be a user's mobile phone or tablet computing device, and this can serve as a feature pack to the portable measuring unit similar to other feature packs described herein. Further, the phone can be used for transporting data from the portable measuring unit to other devices. The information provided by the display can similarly be provided by audio speakers or haptic feedback devices mounted on either of the portable measuring unit or the CMM arm, preferably on a handle for haptic feedback. Combinations of these devices can also be used, such as a sound or haptic feedback alerting a user to look at a display for further information.

As discussed above, the data collected by the measuring devices can also be transferred (e.g., from a portable measuring unit to an arm or network, and from an arm to a network). In some embodiments, the data connection available during use might be too slow to allow all of the data to be transferred in real time. Thus, the portable measuring unit and the CMM arm can optionally include memory for storing the data until a later transfer time. This memory can optionally be kept on a feature pack, and as discussed above, the feature pack can optionally be usable with either of the CMM arm or the portable measuring unit, and can further be used by both.

Data can then optionally be transferred after measurements are completed. For example, in some embodiments the data can be transferred continuously during measurement, and the data that could not transferred during that time can be transferred later. In other embodiments, all of the data can be stored in the memory, and then transferred at a later time. When the device communicates wirelessly during use, it can optionally be attached by wire after use to allow faster transfer of the remaining data. Further, in some embodiments, low resolution images can be transferred in real-time to the network (for example, so the network can provide feedback in real-time), and high resolution images can be transferred later.

The feature pack can also optionally offload further functionality from the portable measuring unit. For example, the light source for a projector can optionally be disposed in a feature pack. The feature pack can be connected to the portable measuring unit by optical fiber, such that the light can travel from the feature pack to the projector on the portable measuring unit. Light sources can require space, weight, and power, and further can generate heat. Each of these can advantageously be removed from the portable measuring unit, facilitating measurement by a user.

Figure 21:
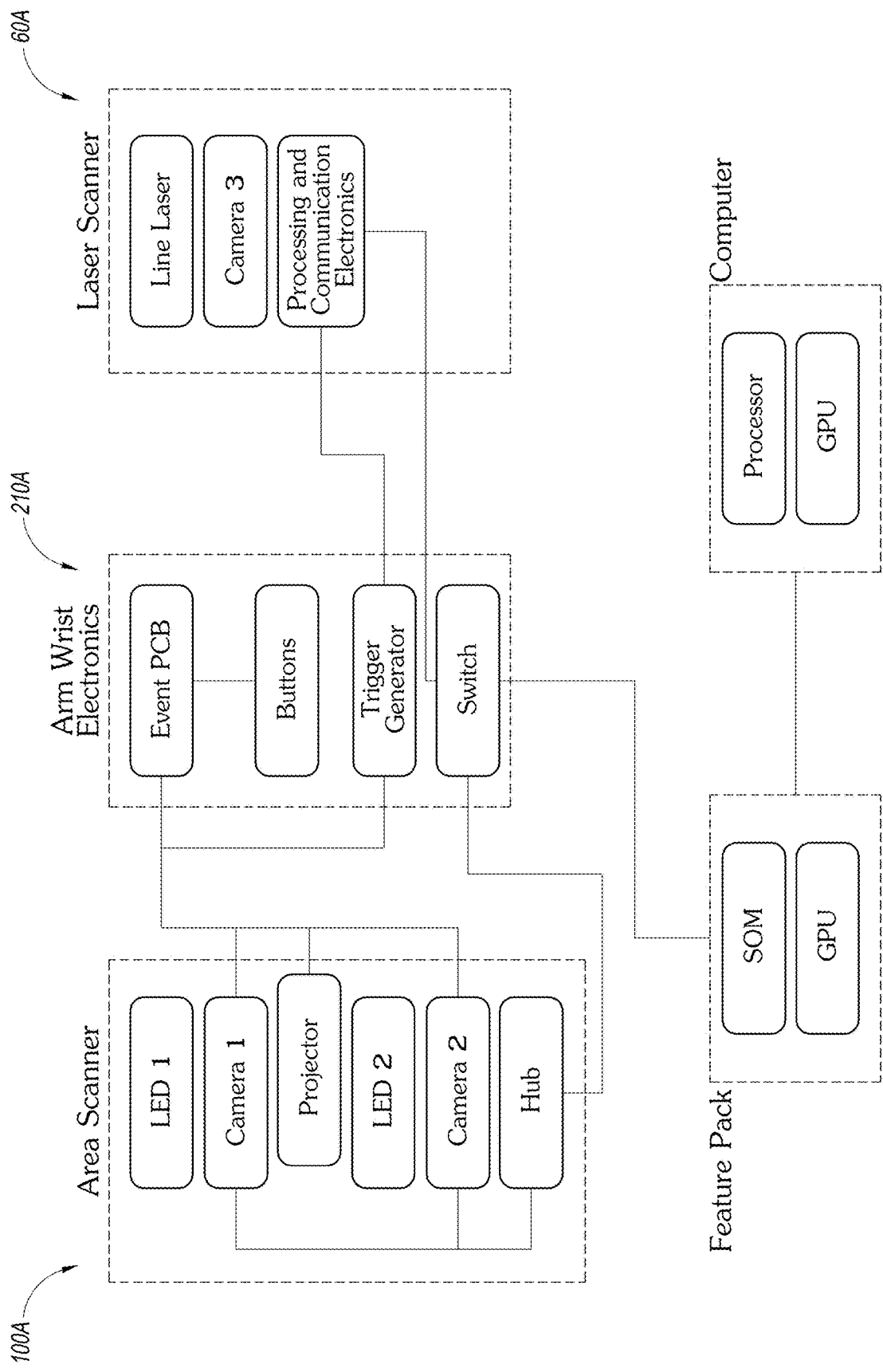
FIG. 21 depicts a coordinate measurement system.

FIG. 21 depicts a structural diagram of a coordinate measuring system. Although certain features are shown, in some embodiments additional features can be added or omitted. The measuring system can include an area scanner 100A and a laser scanner 60A that are connected to arm wrist electronics, which can be part of a portable coordinate measuring unit 210A, as discussed herein. The area scanner 100A can include two cameras, each with associated LEDs. The cameras can be sufficient to measure coordinates in some situations. However, it may be desirable to provide extra illumination with the LEDs. Further, in some situations it may be desirable to provide structured light from a projector, which can be included in the area scanner 100A. The area scanner 100A can further include a hub that can facilitate control, power, and data transmission between the area scanner 100A and the other devices.

The laser scanner 60A can include a laser configured to output a line of light onto an object, and a camera configured to image said line on the object. Data from the camera can be passed along to a processing and communication electronics module. Notably, the hub on the area scanner 100A can also include a processing and communication electronics module. These modules can be used to control the sensors, lasers, LEDs, projectors, and other features on the devices. Further, they can optionally be configured to output data from the sensors, either as received or with some amount of pre-processing.

The measuring device structure 200A (and thus, optionally also the portable measuring unit 210A) can include electronics in a wrist portion of the CMM arm 1A near a last axis of the arm. The portable measuring unit 210A can include a switch that can activate and deactivate the area scanner 100A and the laser scanner 60A. Thus, different modes as described herein can be provided by using the switch to activate or deactivate the desired measuring devices. One method of operation of the switch can be to select between modes of measuring with the contact probe, laser line scanner, or area scanner.

Further, the portable measuring unit 210A can include a trigger signal generator. The trigger signals generated can be sent to the area scanner 100A, the laser scanner 60A, the CMM arm 1A, or other measuring devices. As discussed above, the trigger signals can facilitate synchronization between the various devices, such that measurements can be taken at the same time. Thus, for example, if the portable measuring unit 210A is attached to the arm 1A, the trigger signals can synchronize the measurements of the position of the arm with measurements taken by either or both of the scanners 60A, 100A. This can be particularly useful when the devices are intended to continuously measure coordinates. Thus, the trigger generator can continuously output trigger signals, allowing continuous synchronized measurements.

Further, the portable measuring unit 210A can include an event printed circuit board (PCB). The PCB can optionally control the area scanner 100A, and particularly the cameras and projector on the area scanner 100A. Thus, for example, when a button is pressed the PCB can indicate the projector to output a structured light pattern, and the cameras can then record an image.

Data from the measuring devices 100A, 60A can be passed to the switch on the portable measuring unit 210A. This data can then be provided to other computing devices. For example, as shown the data can be passed to a feature pack. In some embodiments, the feature pack can remain on the CMM arm 1A (as shown in U.S. Pat. No. 8,112,896, which is incorporated by reference in its entirety). In other embodiments, the feature pack can be carried by the user, such as the wearable pack 220A, while the portable measuring unit 210A is detached from the CMM arm 1A. Data can be transferred from the portable measuring unit 210A either by a wired connection or a wireless connection. Further, in some embodiments the portable measuring unit 210A can include a memory to store measured data, to be transmitted to other devices at a later time. The feature pack can be connected to a computer in a similar manner (by wire, wirelessly, or including a memory for later data transfer).

Notably, given the amount of data generated by the cameras, it may be desirable to provide some data processing prior to transmission or storage in memory to reduce the volume of data. Thus, for example, any of the hub, processing and communication electronics, switch, or feature pack can be configured to process the data, either to compress images, convert images into measured point clouds or disparity maps, or other processing.

The feature pack can include a system-on-module chip and/or a graphics processing unit. The computer can similarly include a processor and a graphics processing unit. Thus, either of the feature pack or the computer can be configured to process the data and create visual displays of the data generated by the measuring devices. In further embodiments, a system-on-module and/or graphics processing unit can be physically located on the portable measuring unit 210A.

As described herein, the portable measuring units can be used in a variety of ways. Further, they can also be combined with a CMM arm to take measurements. Thus, a user can take measurements while a measuring device structure (and its component measuring devices) are attached to the CMM arm. It can then be removed or detached from the CMM arm and take additional measurements of the same object or a different object as a portable measuring unit. The portable measuring unit can then be reattached to the CMM arm, and further measurements can be taken of the same object. Additionally, one can easily add and remove various measuring devices, using features such as a kinematic mount, electrical connections, a bayonet connector, and other features. Measurements of the object taken by each device, in each mode, can be associated with each other into a single coordinate system such that one unitary set of measurements of the object can include all of said measurements.

The various devices, methods, procedures, and techniques described above provide a number of ways to carry out the invention. Of course, it is to be understood that not necessarily all objectives or advantages described may be achieved in accordance with any particular embodiment described herein. Also, although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of preferred embodiments herein.

What is claimed is:

1. A portable coordinate measuring unit configured to be carried by a user while measuring, the unit comprising:
    an area scanner comprising at least one camera, the area scanner being configured to measure a plurality of coordinates within a two-dimensional image of an object;
    at least one additional scanner configured to measure a property of the object simultaneously with the measurement by the area scanner;
    one or more processors configured to operate the area scanner and the at least one additional scanner;
    a frame configured to support the area scanner and the at least one additional scanner; and
    a handle configured to facilitate a user gripping the unit and supporting the entire weight of the unit,
    wherein the one or more processors are configured to use measurements from the area scanner to determine a position of the unit.

2. The portable coordinate measuring unit of claim 1, wherein the unit is configured to be mounted to an articulated arm coordinate measuring machine.

3. The portable coordinate measuring unit of claim 1, wherein the unit is configured to be operable as an independent unit.

4. The portable coordinate measuring unit of claim 1, wherein the area scanner comprises two or more cameras.

5. The portable coordinate measuring unit of claim 1, wherein the area scanner comprises a projector configured to provide a structured light pattern.

6. The portable coordinate measuring unit of claim 1, wherein the at least one additional scanner measures three-dimensional coordinates.

7. The portable coordinate measuring unit of claim 6, wherein the at least one additional scanner is a laser scanner.

8. The portable coordinate measuring unit of claim 1, wherein the unit further comprises a display.

9. The portable coordinate measuring unit of claim 8, wherein the unit is configured to provide immediate feedback to a user of the unit, the feedback based at least on coordinates measured by the unit.

10. A method of measuring an object comprising:
    measuring a plurality of coordinates within a two-dimensional image of an object with an area scanner at a first time;
    determining a position of the area scanner relative to the object at the first time based at least on the measured plurality of coordinates;
    measuring a property of the object with a second scanner at a fixed position relative to the area scanner at the first time; and
    determining a location of the measured property based at least on the determined position of the area scanner,
    wherein these steps are performed while the area scanner and second scanner are being carried freely by a user.

11. The method of claim 10, further performing the steps of the method at a second time, while the area scanner and the second scanner are attached to the articulated arm coordinate measuring machine.

12. The method of claim 10, further comprising outputting a structure light pattern using the area scanner.

13. The method of claim 10, further comprising outputting a structure light pattern using a stationary projector separate from the area scanner.

14. The method of claim 10, wherein the position of the area scanner is determined using at least one or more identifiable markers imaged by the area scanner.

15. The method of claim 10, wherein the property of the object is a three-dimensional coordinate on the surface of the object.

16. The method of claim 15, wherein the second scanner is a laser scanner.

17. The method of claim 10, further comprising providing immediate feedback to the user based at least on measurements made by the area scanner.

18. The method of claim 17, wherein the immediate feedback is based on measured coordinates with less precision than the full precision available from at least one of the area scanner and the second scanner.

19. The method of claim 18, wherein the immediate feedback is based on measurements determined while skipping pixels in images captured by at least one of the area scanner and the second scanner.

20. The method of claim 10, wherein the area scanner and the second scanner are synchronized.

21. The method of claim 10, further comprising performing the steps of the method at a second time, while the area scanner and the second scanner are being carried freely by the user, to generate a second set of coordinates distinct from coordinates measured at the first time, and combining the coordinates into a single set of coordinates.

* * * * *